(12) United States Patent
Joma et al.

(10) Patent No.: US 6,535,784 B2
(45) Date of Patent: Mar. 18, 2003

(54) SYSTEM AND METHOD FOR SCHEDULING THE MOVEMENT OF WAFERS IN A WAFER-PROCESSING TOOL

(75) Inventors: Kentaro Joma, San Jose, CA (US); Tatsuya Ogi, Cupertino, CA (US)

(73) Assignee: Tokyo Electron, Ltd., Tokyo (JP)

( * ) Notice: Subject to any disclaimer, the term of this patent is extended or adjusted under 35 U.S.C. 154(b) by 0 days.

(21) Appl. No.: 09/844,582

(22) Filed: Apr. 26, 2001

(65) Prior Publication Data

US 2002/0160621 A1 Oct. 31, 2002

(51) Int. Cl.$^7$ .............................................. G06F 19/00
(52) U.S. Cl. ..................... 700/121; 700/100; 700/112; 700/228
(58) Field of Search ........................... 700/121, 97, 99, 700/100, 101, 102, 112, 228; 414/935, 937

(56) References Cited

U.S. PATENT DOCUMENTS

| | | | | |
|---|---|---|---|---|
| 5,820,679 A | * | 10/1998 | Yokoyama et al. | 178/719 |
| 5,914,879 A | * | 6/1999 | Wang et al. | 364/468.18 |
| 6,243,612 B1 | * | 6/2001 | Rippenhagen et al. | 700/100 |

* cited by examiner

*Primary Examiner*—Paul P. Gordon
(74) *Attorney, Agent, or Firm*—Morrison & Foerster LLP

(57) ABSTRACT

In a system and method for scheduling the movement of wafers in a wafer-processing tool, the wafer-processing tool can include a load module, a wafer-transfer unit, a process module, and a scheduler. The scheduler can be configured to generate a schedule for the movement of wafers in the wafer-processing tool based on the duration of the operations to be performed by the wafer-transfer unit and the process module in processing the wafers.

60 Claims, 24 Drawing Sheets

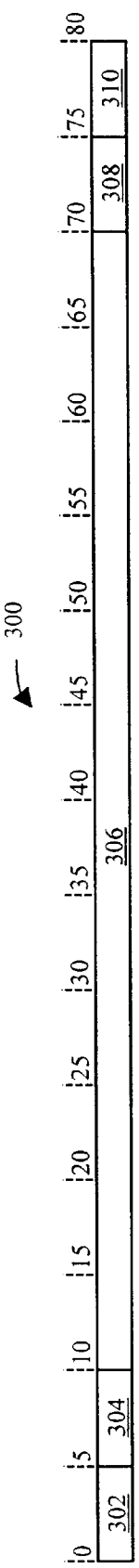
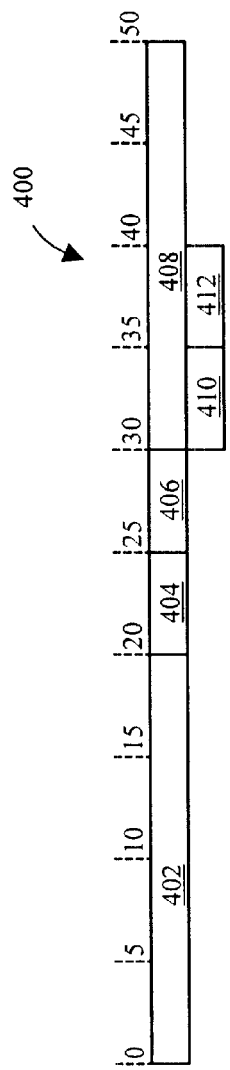
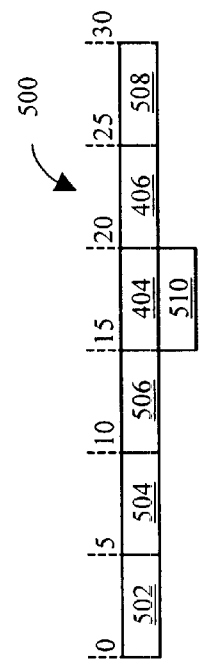
Fig. 3
Fig. 4
Fig. 5

SYSTEM AND METHOD FOR SCHEDULING THE MOVEMENT OF WAFERS IN A WAFER-PROCESSING TOOL

BACKGROUND OF THE INVENTION

1. Field of the Invention

The present invention generally relates to a system and method for processing wafers in a wafer-processing tool, and more particularly to scheduling the movement of wafers in the wafer-processing tool.

2. Description of the Related Art

Wafer-processing tools may be utilized in various stages of fabricating semiconductor devices from semiconductor wafers. Conventional wafer-processing tools typically include one or more processing stations or modules in which semiconductor wafers undergo various processing operations. For example, a wafer-processing tool can include a Chemical Vapor Deposition (CVD) module to form a film on the surface of the wafers.

Wafer-processing tools also typically include a control system to automate the processing of multiple wafers. However, conventional control systems for wafer-processing tools typically process the wafers in accordance with a predetermined program that specifies the order of operations to be performed in which the execution of one operation initiates the execution of another operation. These conventional systems, however, often need to be manually adjusted or reprogrammed to process different batches of wafers. This can be both time and cost prohibitive.

SUMMARY OF THE INVENTION

The present invention generally relates to a system and method for processing wafers in a wafer-processing tool. In one exemplary embodiment of the present invention, the wafer-processing tool includes a load module, a wafer-transfer unit, a process module, and a scheduler. In accordance with one aspect of the present invention, the scheduler is configured to generate a schedule for the movement of wafers in the wafer-processing tool based on the duration of the operations to be performed by the wafer-transfer unit and the process module in processing the wafers.

DESCRIPTION OF THE DRAWING FIGURES

The present invention can be best understood by reference to the following description taken in conjunction with the accompanying drawing figures, in which like parts may be referred to by like numerals:

FIGS. 3 through 17 are block diagrams of exemplary schedules;

DETAILED DESCRIPTION OF EXEMPLARY EMBODIMENTS

The following description sets forth numerous specific details, such as specific configurations, parameters, and the like. It should be recognized, however, that such description is not intended as a limitation on the scope of the present invention.

Figure 1:
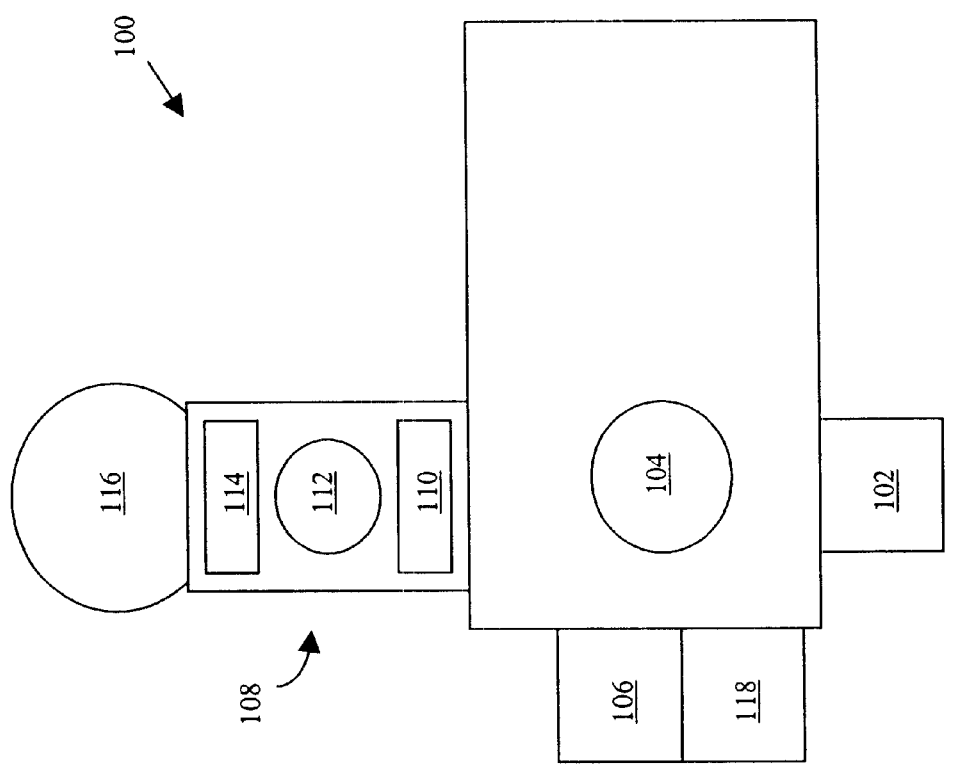
FIG. 1 is a top view of a wafer-processing tool.

With reference to FIG. 1, a wafer-processing tool 100 is depicted. In accordance with one exemplary embodiment of the present invention, tool 100 includes a load module 102, a wafer-transfer unit 104, a wafer orienter 106, a load-lock module 108, a process module 116, and a control module 118.

In the present embodiment, load module 102 can be configured to receive wafer cassettes that hold multiple wafers. It should be recognized that load module 102 can be configured to receive various types of wafer cassettes. Additionally, for the sake of clarity, tool 100 is depicted in FIG. 1 as having one load module 102. It should be recognized, however, that tool 100 can include any number of load modules 102.

In the present embodiment, wafer-transfer unit 104 can be configured to pick-up and place wafers. Additionally, as will be described in greater detail below, wafer-transfer unit 104 can be configured to transport wafers between load module 102, wafer orienter 106, load-lock module 108, and process module 116. In one configuration of the present embodiment, wafer-transfer unit 104 can be configured as a two-arm robot. It should be recognized, however, that wafer-transfer unit 104 can include any suitable mechanism or device suitable for transporting wafers. Additionally, it should be recognized that tool 100 can include any number of wafer-transfer units 104.

In the present embodiment, wafer orienter 106 can be configured to orient wafers. More particularly, in some applications, it can be desirable to orient the wafers before processing the wafers in process module 116. For example, in one application, asymmetric wafers, such as slotted wafers, can be oriented by wafer orienter 106 such that they enter process module 116 with the same orientation. However, in some applications, the wafers may not need to be oriented. As such, tool 100 can be configured without a wafer orienter 106 or wafer orienter 106 may not be used. However, it should be recognized that tool 100 can also be configured with more than one wafer orienter 106.

In the present embodiment, load-lock module 108 can be configured to transport wafers to and from process module 116. In one configuration of the present embodiment, load-lock module 108 includes a first buffer 110, a second buffer 114, and a wafer-transfer unit 112 configured to transfer a wafer into and out of process module 116. More particularly, in the present configuration, wafer-transfer unit 104 places a wafer to be processed onto first buffer 110. Wafer-transfer unit 112 then transfers the wafer to be processed from first buffer 110 onto second buffer 114. When process module 116 is ready, wafer-transfer unit 112 transfers the wafer to be processed from second buffer 114 into process module 116. After the wafer is processed, wafer-transfer unit 112 transfers the wafer from process module 116 onto first buffer 110. Wafer-transfer unit 104 then picks-up the processed wafer from first buffer 110. It should be recognized, however, that tool 100 can be configured without a load-lock module 108. Instead, wafer-transfer unit 104 can be configured to transport wafers directly to and from process module 116.

In the present embodiment, process module 116 can be maintained at a pressure lower than the pressure within the remaining areas of tool 100. In one preferred embodiment, process module 116 is maintained at a pressure below atmospheric pressure, while the remaining areas of tool 100 are maintained at atmospheric pressure. One advantage of maintaining process module 116 at a lower pressure relative to the other areas of tool 100 is that the flow of contaminants from process module 116 into tool 100 can be reduced or eliminated.

As such, in the present embodiment, load-lock module 108 can be configured to operate as an air lock between process module 116 and the remaining areas of tool 100. More particularly, load-lock module 108 can be configured to be sealed, evacuated, and vented. In one configuration of the present embodiment, before transferring a wafer into or out of process module 116, load-lock module 108 is sealed and evacuated such that the pressure within load-lock module 108 is equal to the pressure within process module 116. Additionally, before wafer-transfer unit 104 places a wafer to be processed on first buffer 110 or picks-up a processed wafer from first buffer 110, load-lock module 108 is vented such that the pressure within load-lock module 108 is equal to the pressure within the remaining areas of tool 100.

In the present embodiment, process module 116 can be configured to perform any suitable wafer-processing operation, such as etching, chemical vapor deposition (CVD), sputtering, thermal oxidation, and the like. Additionally, it should be recognized that tool 100 can be configured with any number of process modules 116. More particularly, as will be described below in conjunction with alternative embodiments and configurations, tool 100 can include multiple process modules 116 performing the same wafer-processing operation or different wafer-processing operations.

In the present embodiment, control module 118 can be configured to control tool 100. More particularly, control module 118 can be configured to control the operations of load module 102, wafer-transfer unit 104, wafer orienter 106, load-lock module 108, and process module 118. Control module 118 can include any suitable computer hardware, such as a processing unit, a data storage unit/medium, a user-interface unit, a data-input/output unit, and the like. Control module 118 can also include any suitable computer program.

Additionally, in accordance with one aspect of the present invention, control module 118 can include a scheduler configured to generate a schedule for the movement of wafers in tool 100. Although the scheduler is depicted and described as being a part of control module 118, the scheduler can also be configured as a separate unit having any suitable computer hardware and/or software.

Having thus described the various components of tool 100, the processing of a wafer within tool 100 will be described below. The following description assumes that tool 100 is operating in a steady-state condition; meaning that there is already one or more wafers being processed somewhere in tool 100 before the unprocessed wafer is removed from load module 102. In other words, the following description does not describe the processing of the first or the last wafer to be processed. Additionally, to assist in distinguishing between different wafers in tool 100, in the following description, a number is assigned to each wafer. It should be recognized, however, that these numbers do not necessarily suggest any particular order or priority.

As alluded to above, wafers can be transported to and from tool 100 in wafer cassettes, which can be mounted on load module 102. As such, to process a wafer in tool 100, wafer-transfer unit 104 first removes an unprocessed wafer (wafer 1) from load module 102. As described above, in one configuration, wafer-transfer unit 104 is configured as a two-arm robot. As such, wafer-transfer unit 104 picks-up the unprocessed wafer (wafer 1) from load module 102 and places a wafer (wafer 2) that has been previously processed into load module 102.

Wafer-transfer unit 104 then transports the unprocessed wafer (wafer 1) to wafer orienter 106. Wafer-transfer unit 104 removes a wafer that was previously oriented (wafer 3) from wafer orienter 106 and places the unprocessed wafer (wafer 1) onto wafer orienter 106. However, as described above, it should be recognized that in some applications the wafer (wafer 1) is not oriented.

Wafer-transfer unit 104 then transports the oriented wafer (wafer 3) to load-lock module 108. Wafer-transfer unit 104 removes a wafer (wafer 4) that was previously processed from first buffer 110 and places the oriented wafer (wafer 3) onto first buffer 110. Wafer-transfer unit 112 then transfers the oriented wafer (wafer 3) onto second buffer 114. As described above, prior to removing the processed wafer (wafer 4) from first buffer 110 and placing the oriented wafer (wafer 3) onto first buffer 110, load-lock module 108 is vented such that the pressure within load-lock module 108 is equal to the pressure within tool 100.

Wafer-transfer unit 112 then transfers the oriented wafer (wafer 3) on second buffer 114 into process module 116. After process module 116 has completed processing the wafer (wafer 3), wafer-transfer unit 112 removes the processed wafer (wafer 3) from process module 116 and transfers it to first buffer 110. As described above, prior to removing a wafer from process module 116 or placing a wafer into process module 116, load-lock module 1108 is sealed and evacuated such that the pressure within load-lock module 108 is equal to the pressure within process module 116.

As described above, wafer-transfer unit 104 picks-up the processed wafer (wafer 3) from first buffer 110 and returns it to load module 102. Wafer-transfer unit 104 then picks-up another unprocessed wafer (wafer 5) from load module 102. This process can be repeated to process any number of wafers within any number of wafer cassettes.

As described above, in accordance with one aspect of the present invention, control system 118 includes a scheduler configured to generate a schedule for the movement of wafers in tool 100. Additionally, control system 118 can include a recipe that specifies processing parameters, such as temperature, pressure, time, chemistries, concentrations, and the like. Furthermore, different batches, group, or sets of wafers can be processed in tool 100 utilizing different recipes. For example, a recipe can specify duration for the processing time in process module 116. For one batch of wafers, the recipe can specify one duration; such as 50 seconds. For another batch of wafers, the recipe can specify a duration, such as 100 seconds. As such, in accordance with one aspect of the present invention, the scheduler can generate a schedule for a batch of wafers to be processed using a recipe for that batch of wafers before processing that batch of wafers.

Figure 2:
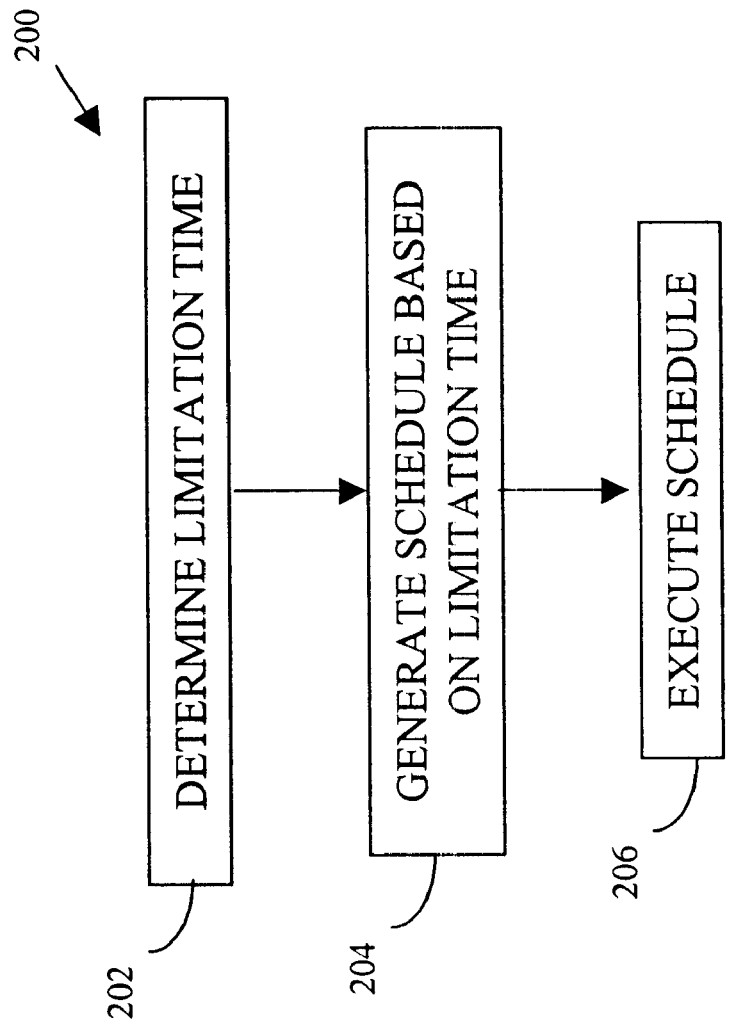
FIG. 2 is a flow chart of a schedule-generation process.

With reference now to FIG. 2, an exemplary schedule-generation process 200 for the scheduler is depicted. It should be recognized that each operation and combination of operations of process 200 and those described below can be stored in a computer-readable storage medium and can be implemented as instructions for a computer. It should also be recognized that each operation and combination of operations can also be implemented by special purpose hardware-based computer systems that perform the specified functions or operations, or combination of special purpose hardware and computer instructions. Additionally, as described earlier, the scheduler can be a component of control module 118 or a separate unit.

With continued reference to FIG. 2, in the present embodiment, in operation 202, a limitation duration is determined. With reference again to FIG. 1, as described above, the processing of wafers in tool 100 can involve a number of operations. In the embodiment described above, these operations can be grouped into a processing cycle that includes operations to be performed by process module 116, an LLM cycle that includes operations to be performed by load-lock module 108, and a provide cycle that includes operations to be performed by wafer-transfer unit 104. As will be described in greater detail below, the duration of each cycle can then be determined. The limitation duration can then be determined based on the duration of these cycles. However, it should be recognized that a schedule can be generated based on the duration of these cycles without determining a limitation duration.

With reference now to FIG. 3, an exemplary process cycle 300 is depicted. In the present embodiment, process cycle 300 includes operations to be performed by process module 116 (FIG. 1). More particularly, in operation 302, with reference to FIG. 1, wafer-transfer unit 112 picks-up an unprocessed wafer from second buffer 114. In operation 304 (FIG. 3), wafer-transfer unit 112 places the unprocessed wafer into process module 116. In operation 306 (FIG. 3), the unprocessed wafer is processed in process module 116. In operation 308 (FIG. 3), wafer-transfer unit 112 picks-up the processed wafer from process module 116. In operation 310 (FIG. 3), wafer-transfer unit 112 places the processed wafer onto first buffer 110.

For the sake of example, assume that operations 302, 304, 308, and 310 each take about 5 seconds and operation 306 takes about 60 seconds. As such, in this example, process cycle 300 takes about 80 seconds. However, it should be recognized that operations 302, 304, 308, and 310 need not take the same amount of time and can vary depending on the configuration of tool 100. It should also be recognized that the duration of operation 306 can vary depending on the particular application. Additionally, it should be recognized that the duration of operations 302 through 310 can be calculated explicitly or determined empirically.

With reference now to FIG. 4, an exemplary LLM cycle 400 is depicted. In the present embodiment, LLM cycle 400 includes operations to be performed by load-lock module 108 (FIG. 1). More particularly, in operation 402, with reference now to FIG. 1, load-lock module 108 is vented such that the pressure within load-lock module 108 is approximately equal to that of tool 100. In operation 404 (FIG. 4), wafer-transfer unit 104 picks-up a processed wafer from first buffer 110. In operation 406 (FIG. 4), wafer-transfer unit 104 places an unprocessed wafer onto first buffer 110. In operation 408 (FIG. 4), load-lock module 108 is sealed and evacuated such that the pressure within load-lock module 108 is equal to that in process module 116. In operation 410 (FIG. 4), wafer-transfer unit 112 picks-up the unprocessed wafer from first buffer 110. In operation 412 (FIG. 4), wafer-transfer unit 112 places the unprocessed wafer onto second buffer 114. As depicted in FIG. 4, in the present embodiment, operations 410 and 412 can be performed concurrently with operation 408.

For the sake of example, assume that operations 402 and 408 each take about 20 seconds. Assume that operations 404, 406, 410, and 412 each take about 5 seconds. As such, in this example, LLM cycle 400 takes about 50 seconds. However, it should be recognized that operations 402 and 408 need not take the same amount of time. Additionally, it should be recognized that operations 404, 406, 410, and 412 need not take the same amount of time. Furthermore, the duration of operations 402 through 412 can vary depending on the particular application. Additionally, it should be recognized that the duration of operations 402 through 412 can be calculated explicitly or determined empirically.

With reference now to FIG. 5, an exemplary provide cycle 500 is depicted. In the present embodiment, provide cycle 500 includes operations to be performed by wafer-transfer unit 104. More particularly, in operation 502, with reference now to FIG. 1, wafer-transfer unit 104 picks-up a wafer to be processed from load module 102. In operation 504 (FIG. 5), wafer-transfer unit 104 picks-up a wafer that has been previously oriented from wafer orienter 106. In operation 506 (FIG. 5), wafer-transfer unit 104 places the wafer to be oriented onto wafer orienter 106. In operation 404 (FIG. 5), wafer-transfer unit 104 picks-up a processed wafer from first buffer 110. In operation 406 (FIG. 5), wafer-transfer unit 104 places an unprocessed wafer onto first buffer 110. In operation 508 (FIG. 5), wafer-transfer unit 104 places the processed. wafer into load module 102. In operation 510 (FIG. 5), wafer orienter 106 orients a wafer. Additionally, as depicted in FIG. 5, in the present embodiment, operation 510 can be performed following operation 506 and concurrently with operations 404, 406, and/or 508. Furthermore, for the sake of clarity and completeness, operations 404 and 406 are shown in both provide cycle 500 and LLM cycle 400 (FIG. 4). However, it should be recognized that operations 404 and 406 are performed once, as either part of provide cycle 500 or LLM cycle 400 (FIG. 4), but not both.

For the sake of example, assume that operations 404, 406, and 502 through 510 each take about 5 seconds. As described above, operation 510 can be performed concurrently with operations 404, 406, and/or 508. As such, in the present example, provide cycle 500 takes about 30 seconds. However, it should be recognized that operations 404, 406, and 502 through 510 need not take the same amount of time. Additionally, the duration of these operations can vary depending on the particular application. Furthermore, the duration of these operations can be calculated explicitly or determined empirically.

In summary, in the example provided above, process cycle 300 (FIG. 3) takes about 80 seconds, LLM cycle 400 (FIG. 4) takes about 50 seconds, and provide cycle 500 (FIG. 5) takes about 30 seconds. As such, in the present example, the process cycle is determined to be the limitation duration.

With reference again to FIG. 2, having determined the limitation duration, in operation 204, a schedule is generated based on the limitation duration. In the present example, with reference now to FIG. 6, an exemplary schedule 600 is generated. However, it should be recognized that the particular operations, order of operations, and duration of operations depicted in FIG. 6 and described herein can vary depending on the particular configuration of tool 100 and the particular application. As such, schedule 600 can also vary depending on the particular configuration of tool 100 and the particular application. For example, as noted earlier, tool 100 can be configured without load-lock module 108. As such, the limitation duration can be determined based on process cycle 300 (FIG. 3) and provide cycle 500 (FIG. 5). Thus, schedule 600 can then be generated without LLM cycle 400 (FIG. 4).

However, in the present example, tool 100 is assumed to include a load-module 108. Moreover, as described above, the duration of process cycle 300 (FIG. 3), LLM cycle 400 (FIG. 4), and provide cycle 500 (FIG. 5) are assumed to be 80 seconds, 50 seconds, and 30 seconds, respectively. As such, process cycle 300 (FIG. 3) is determined to be the limitation duration. Thus, in the present example, schedule 600 is generated based on process cycle 300 (FIG. 3), then LLM cycle 400 (FIG. 4), then provide cycle 500 (FIG. 5). As noted above, it should be recognized that the operation of determining a limitation duration can be omitted. Instead, schedule 600 can be generated based directly on the duration of process cycle 300 (FIG. 3), LLM cycle 400 (FIG. 4), and provide cycle 500 (FIG. 5).

In accordance with one aspect of the present invention, schedule 600 can be generated by aligning process cycle 300 (FIG. 3), LLM cycle 400 (FIG. 4), and provide cycle 500 (FIG. 5). As will be described below in connection with the description of various exemplary schedules, two cycles can be aligned utilizing operations that may be common between the two cycles or an operation in one cycle that precedes or follows an operation in another cycle.

Additionally, in accordance with another aspect of the present invention, the duration of the cycles can determine the order in which the cycles are aligned. Thus, the cycle that is determined to be limitation duration is the cycle to which the remaining cycles are aligned.

Figure 6:
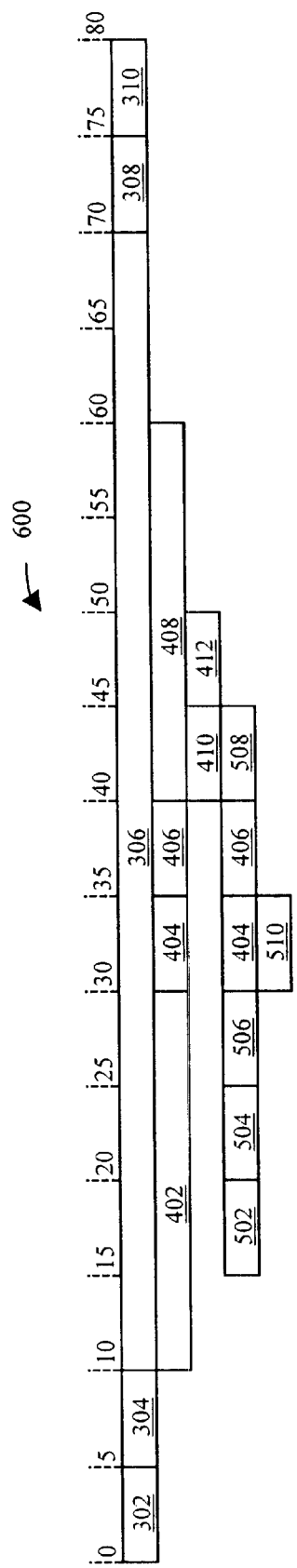

In the present example, as depicted in FIG. 6, LLM cycle 400 (FIG. 4) is aligned to process cycle 300 (FIG. 3), then provide cycle 500 (FIG. 5) is aligned to LLM cycle 400 (FIG. 4). More particularly, LLM cycle 400 (FIG. 4) is aligned to process cycle 300 (FIG. 3) such that operation 402, which corresponds to load-lock module 108 (FIG. 1) being vented, follows operation 304, which corresponds to wafer-transfer unit 112 (FIG. 1) placing a wafer into process module 116 (FIG. 1). Additionally, in the present example, provide cycle 500 (FIG. 5) is aligned to LLM cycle 400 (FIG. 4) such that operation 404, which corresponds to wafer-transfer unit 104 picking-up a processed wafer from first buffer 110 (FIG. 1), follows the completion of operation 402, which again corresponds to load-lock module 108 (FIG. 1) being vented.

However, as alluded to earlier, schedule 600 assumes that tool 100 is operating in a steady state, meaning that the wafer being processed in accordance with schedule 600 is not the first or the last wafer to be processed. Thus, in accordance with one aspect of the present invention, with reference to FIG. 7, schedule 600 can include a start schedule 700.

Figure 7:
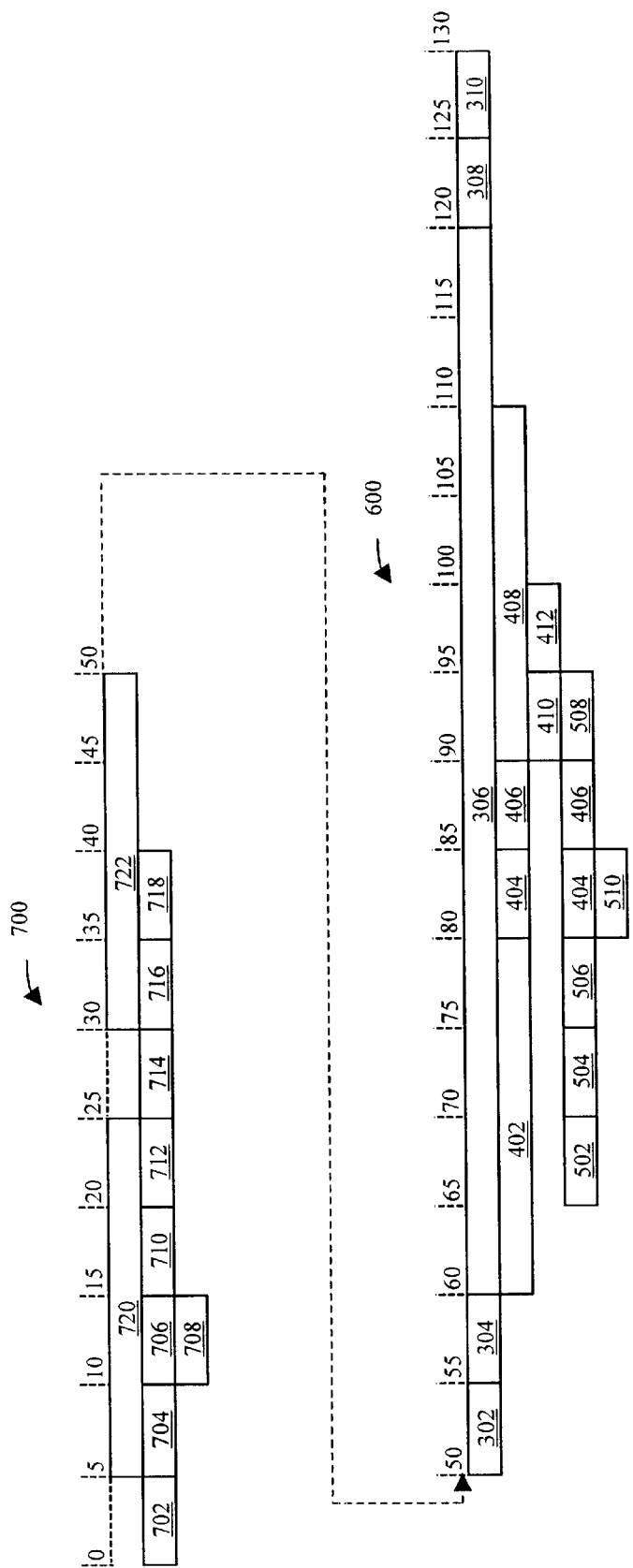

More particularly, in one embodiment, start schedule 700 includes operations 702 through 722. In operation 702, with reference to FIG. 1, wafer-transfer unit 104 picks-up the first wafer from load module 102. In operation 704 (FIG. 7), wafer-transfer unit 104 places the first wafer onto wafer orienter 106. In operation 706 (FIG. 7), wafer-transfer unit 104 picks-up the second wafer from load module 102. In operation 708, wafer orienter 106 orients the first wafer. In operation 710 (FIG. 7), wafer-transfer unit 104 picks-up the first wafer from wafer orienter 106. In operation 712 (FIG. 7), wafer-transfer unit 104 places the second wafer onto wafer orienter 106. In operation 714 (FIG. 7), wafer-transfer unit 104 places the first wafer onto first buffer 110. In operation 716 (FIG. 7), wafer-transfer unit 112 picks-up the first wafer from first buffer 110. In operation 718 (FIG. 7), wafer-transfer unit 112 places the first wafer onto second buffer 114. In operation 720 (FIG. 7), load-lock module 108 is vented. In operation 722 (FIG. 7), load-lock module 108 is sealed and evacuated. Moreover, as depicted in FIG. 7, operation 720 is completed before commencing operation 714, when the wafer is placed onto first buffer 110 (FIG. 1). Additionally, operation 722 begins after operation 714, when the wafer is placed onto first buffer 110 (FIG. 1).

Figure 8:
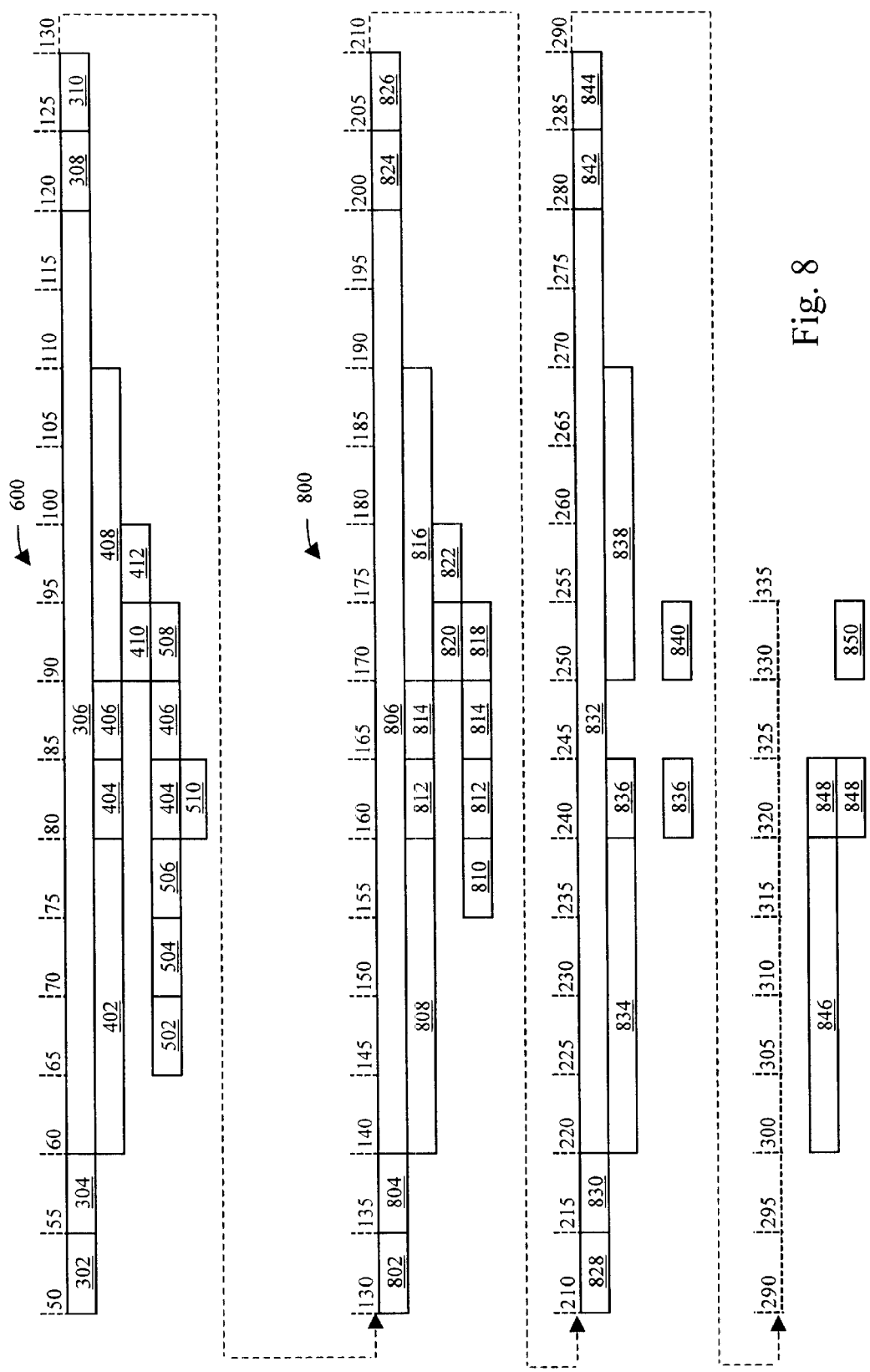

In accordance with another aspect of the present invention, with reference to FIG. 8, schedule 600 can also include an end schedule 800. As will be described in greater detail below, end schedule 800 is generated such that the last wafer processed in tool 100 (FIG. 1) has the same thermal history as the previous wafers that were processed in tool 100 (FIG. 1).

As depicted in FIG. 8, in operations 802 to 826, the next-to-last wafer is processed in process module 116 (FIG. 1) while the last wafer is picked-up from wafer orienter 106 (FIG. 1) and the second-to-last wafer is transported back to load module 102 (FIG. 1). More particularly, with reference to FIG. 1, in operation 802 (FIG. 8), wafer-transfer unit 112 picks-up the next-to-last wafer from second buffer 114. In operation 804 (FIG. 8), wafer-transfer unit 112 places the next-to-last wafer into process module 116. In operation 806 (FIG. 8), the next-to-last wafer is processed in process module 116. In operation 808 (FIG. 8), load-lock module 108 is vented such that the pressure within load-lock module 108 is equal to the pressure within tool 100. In operation 810 (FIG. 8), wafer-transfer unit 104 picks-up the last wafer from wafer orienter 106. In operation 812 (FIG. 8), wafer-transfer unit 104 picks-up the second-to-last wafer from first buffer 110. Note that the second-to-last wafer was placed on first buffer 110 in operation 310 (FIG. 8). In operation 814 (FIG. 8), wafer-transfer unit 104 places the last wafer onto first buffer 110. In operation 816 (FIG. 8), load-lock module 108 is evacuated such that the pressure within load-lock module 108 is equal to the pressure within process module 116. In operation 818 (FIG. 8), wafer-transfer unit 104 places the second-to-last wafer into load module 102. In operation 820 (FIG. 8), wafer-transfer unit 112 picks-up the last wafer from first buffer 110. In operation 822 (FIG. 8), wafer-transfer unit 112 places the last wafer onto second buffer 114. In operation 824 (FIG. 8), wafer-transfer unit 112 picks-up the next-to-last wafer from process module 116. In operation 826 (FIG. 8), wafer-transfer unit 112 places the next-to-last wafer onto first buffer 110.

As depicted in FIG. 8, in operations 828 to 844, the last wafer is processed in process module 116 (FIG. 1) while the next-to-last wafer is transported back to load module 102 (FIG. 1). More particularly, with reference to FIG. 1, in operation 828 (FIG. 8), wafer-transfer unit 112 picks-up the last wafer from second buffer 114. In operation 830 (FIG. 8), wafer-transfer unit 112 places the last wafer into process module 116. In operation 832 (FIG. 8), the last wafer is processed in process module 116. In operation 834 (FIG. 8), load-lock module 108 is vented such that the pressure within load-lock module 108 is equal to the pressure within tool 100. In operation 836 (FIG. 8), wafer-transfer unit 104 picks-up the next-to-last wafer from first buffer 110. Note that the next-last wafer was placed on first buffer 110 in operation 826 (FIG. 8). In operation 838 (FIG. 8), load-lock module 108 is evacuated such that the pressure within load-lock module 108 is equal to the pressure within process module 116. In operation 840 (FIG. 8), wafer-transfer unit 104 places the next-to-last wafer into load module 102. In operation 842 (FIG. 8), wafer-transfer unit 112 picks-up the last wafer from process module 116. In operation 844 (FIG. 8), wafer-transfer unit 112 places the last wafer onto first buffer 110.

As depicted in FIG. 8, in operations 846 to 850, the last wafer is transported back to load module 102 (FIG. 1). More particularly, with reference to FIG. 1, in operation 846 (FIG. 8), load-lock module 108 is vented such that the pressure within load-lock module 108 is equal to the pressure within tool 100. In operation 848 (FIG. 8), wafer-transfer unit 104 picks-up the last wafer from first buffer 110. Note that the last wafer was placed on first buffer 110 in operation 844 (FIG. 8). In operation 850 (FIG. 8), wafer-transfer unit 104 places the last wafer into load module 102.

Thus, in end schedule 600, operations 818, 840, and 850 (corresponding to wafer-transfer unit 104 (FIG. 1) returning the second-to-last wafer, the next-to-last wafer, and the last wafer to load module 102 (FIG. 1), respectively) occur at the same amount of time following processing of the wafers in process module 116 (FIG. 1). As such, as noted earlier, the heat histories for these wafers can be kept uniform.

In the above description, it was assumed that process cycle 300 (FIG. 3) was assumed to be the limitation duration. The following description provides examples of generating schedule 600 in applications where LLM cycle 400 (FIG. 4) or provide cycle 500 (FIG. 5) is determined to be the limitation duration. However, in most applications of the present invention, process cycle 300 (FIG. 3) is likely to be the limitation duration as operation 310 (FIG. 3), which corresponds to processing of the wafer within process module 116 (FIG. 1), likely has the longest duration.

Figure 9:
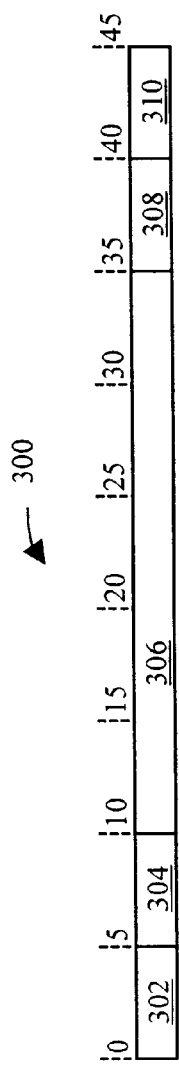

With reference to FIG. 9, for the sake of example, assume that process cycle 300 now takes about 45 seconds to complete. More particularly, in process cycle 300, operation 306 takes about 25 seconds. Also, assume that LLM cycle 400 (FIG. 4) and provide cycle 500 (FIG. 5) take about 50 seconds and about 30 seconds, respectively. Accordingly, in the present example, LLM cycle 400 (FIG. 4) is now the limitation duration.

Figure 10:
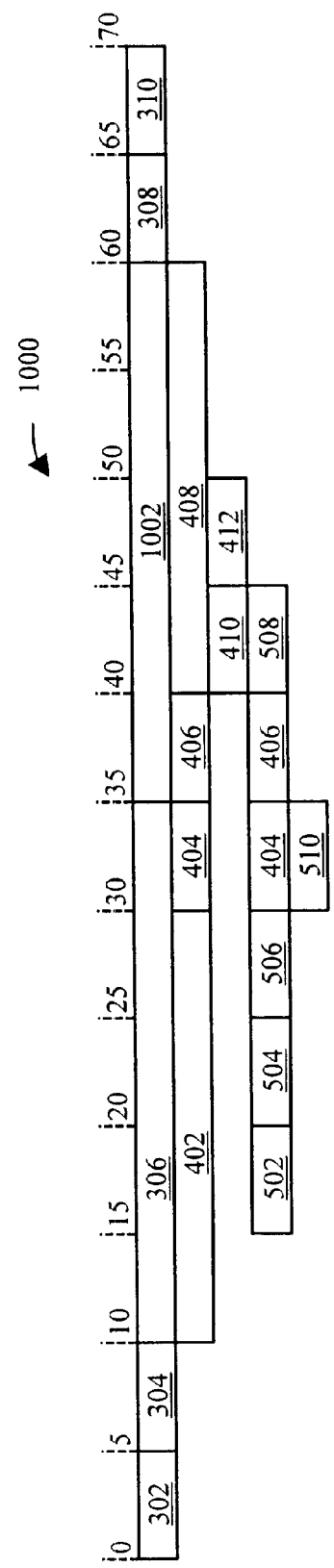

With reference now to FIG. 10, a schedule 1000 can be generated utilizing LLM cycle 400 (FIG. 9) as the limitation duration. More particularly, as depicted in FIG. 10, process cycle 300 (as depicted in FIG. 9) is aligned to LLM cycle 400 (FIG. 4), then provide cycle 500 (FIG. 5) is aligned to LLM cycle 400 (FIG. 4).

In the present example, process cycle 300 (FIG. 9) is aligned to LLM cycle 400 (FIG. 4) such that operation 304, which corresponds to wafer-transfer unit 112 (FIG. 1) placing a wafer into process module 116 (FIG. 1) precedes operation 402, which corresponds to load-lock module 108 (FIG. 1) being vented. Additionally, in the present example, a wait operation 1002 is provided following operation 306 such that operation 308, which corresponds to removing the processed wafer from process module 116 (FIG. 1), follows the completion of operation 408, which corresponds to load-lock module 108 (FIG. 1) being sealed and evacuated. As such, in the present example, wait operation 1002 takes 25 seconds. However, it should be recognized that wait operation 1002 can be any appropriate duration to extend operation 306.

In the present example, provide cycle 500 (FIG. 5) is then aligned to process cycle 300 (FIG. 9) such that operation 404, which corresponds to wafer-transfer unit 104 picking-up a processed wafer from first buffer 110 (FIG. 1) follows the completion of operation 402, which again corresponds to load-lock module 108 (FIG. 1) being vented.

However, schedule 1000 assumes that tool 100 (FIG. 1) is operating in a steady state, meaning that the wafer being processed in accordance with schedule 1000 is not the first or the last wafer to be processed. Thus, in accordance with one aspect of the present invention, with reference to FIG. 11, schedule 1000 can include a start schedule 1100.

Figure 11:
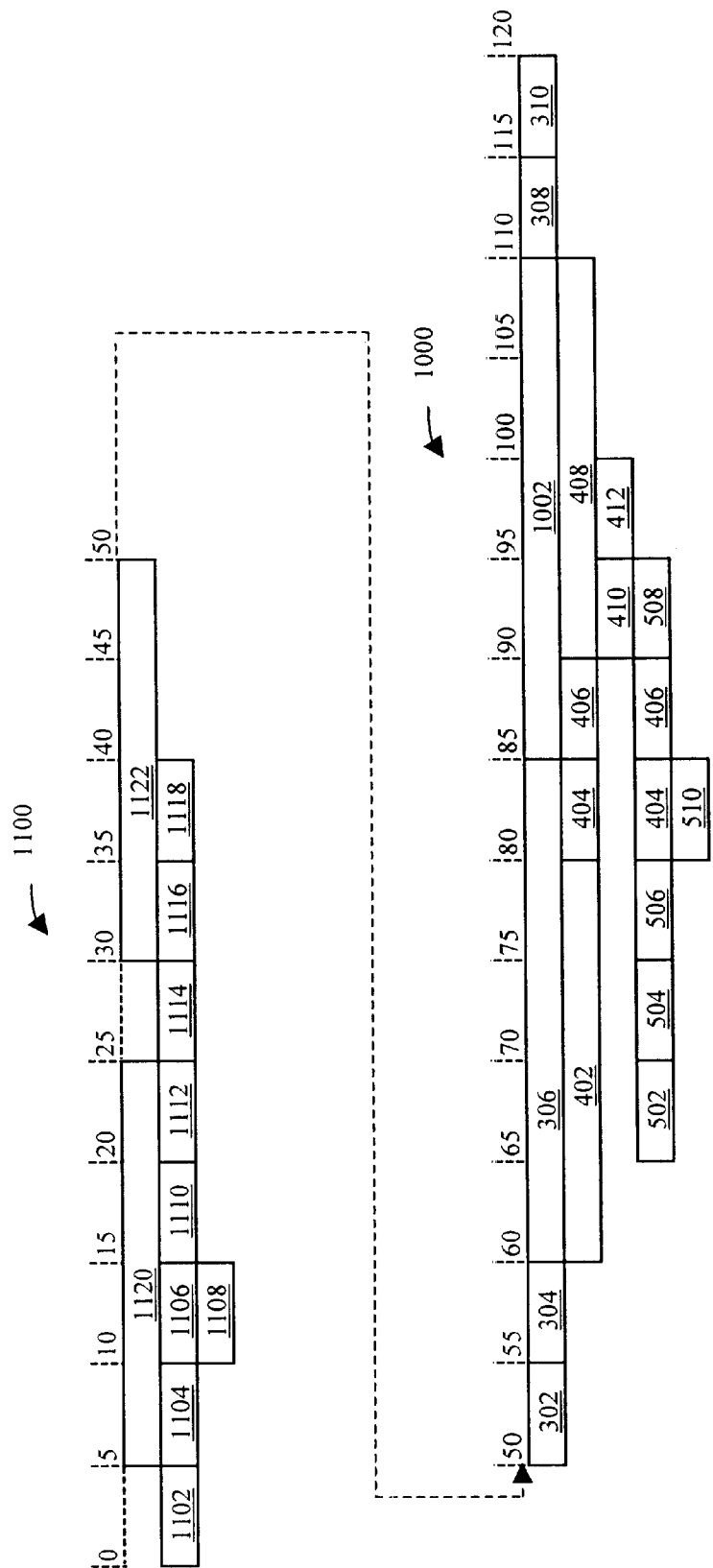

More particularly, in one embodiment, start schedule 1100 includes operations 1102 through 1122. In operation 1102, with reference to FIG. 1, wafer-transfer unit 104 picks-up the first wafer from load module 102. In operation 1104 (FIG. 11), wafer-transfer unit 104 places the first wafer onto wafer orienter 106. In operation 1106 (FIG. 11), wafer-transfer unit 104 picks-up the second wafer from load module 102. In operation 1108 (FIG. 11), wafer orienter 106 orients the first wafer. In operation 1110 (FIG. 11), wafer-transfer unit 104 picks-up the first wafer from wafer orienter 106. In operation 1112 (FIG. 11), wafer-transfer unit 104 places the second wafer onto wafer orienter 106. In operation 1114 (FIG. 11), wafer-transfer unit 104 places the first wafer onto first buffer 110. In operation 1116 (FIG. 11), wafer-transfer unit 112 picks-up the first wafer from first buffer 110. In operation 1118 (FIG. 11), wafer-transfer unit 112 places the first wafer onto second buffer 114. In operation 1120 (FIG. 11), load-lock module 108 is vented. In operation 1122 (FIG. 11), load-lock module 108 is sealed and evacuated. Moreover, as depicted in FIG. 11, operation 1120 is completed before commencing operation 1114, when the wafer is placed onto first buffer 110 (FIG. 1). Additionally, operation 1122 begins after operation 1114, when the wafer is placed onto first buffer 110 (FIG. 1).

Figure 12:
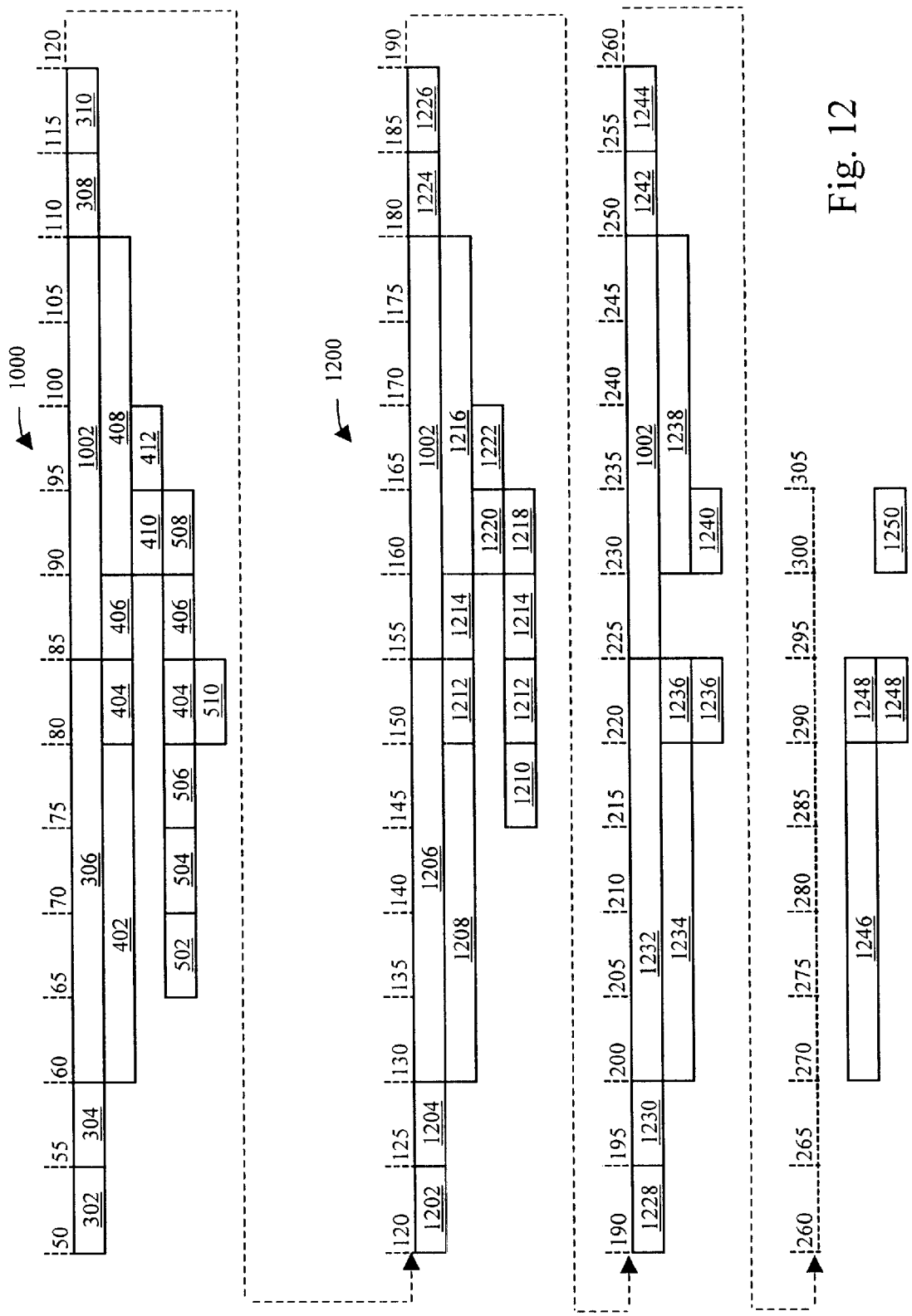

In accordance with another aspect of the present invention, with reference to FIG. 12, schedule 1000 can also include an end schedule 1200. As will be described in greater detail below, end schedule 1200 is generated such that the last wafer processed in tool 100 (FIG. 1) has the same thermal history as the previous wafers that were processed in tool 100 (FIG. 1).

As depicted in FIG. 12, in operations 1202 to 1226, the next-to-last wafer is processed in process module 116 (FIG. 1) while the last wafer is picked-up from wafer orienter 106 (FIG. 1) and the second-to-last wafer is transported back to load module 102 (FIG. 1). More particularly, with reference to FIG. 1, in operation 1202 (FIG. 12), wafer-transfer unit 112 picks-up the next-to-last wafer from second buffer 114. In operation 1204 (FIG. 12), wafer-transfer unit 112 places the next-to-last wafer into process module 116. In operation 1206 (FIG. 12), the next-to-last wafer is processed in process module 116. In operation 1002 (FIG. 12), the next-to-last wafer waits in process module 116. In operation 1208 (FIG. 12), load-lock module 108 is vented such that the pressure within load-lock module 108 is equal to the pressure within tool 100. In operation 1210 (FIG. 12), wafer-transfer unit 104 picks-up the last wafer from wafer orienter 106. In operation 1212 (FIG. 12), wafer-transfer unit 104 picks-up the second-to-last wafer from first buffer 110. Note that the second-to-last wafer was placed on first buffer 110 in operation 310 (FIG. 12). In operation 1214 (FIG. 12), wafer-transfer unit 104 places the last wafer onto first buffer 110. In operation 1216 (FIG. 12), load-lock module 108 is evacuated such that the pressure within load-lock module 108 is equal to the pressure within process module 116. In operation 1218 (FIG. 12), wafer-transfer unit 104 places the second-to-last wafer into load module 102. In operation 1220 (FIG. 12), wafer-transfer unit 112 picks-up the last wafer from first buffer 110. In operation 1222 (FIG. 12), wafer-transfer unit 112 places the last wafer onto second buffer 114. In operation 1224 (FIG. 12), wafer-transfer unit 112 picks-up the next-to-last wafer from process module 116. In operation 1226 (FIG. 12), wafer-transfer unit 112 places the next-to-last wafer onto first buffer 110.

As depicted in FIG. 12, in operations 1228 to 1244, the last wafer is processed in process module 116 (FIG. 1) while the next-to-last wafer is transported back to load module 102

(FIG. 1). More particularly, with reference to FIG. 1, in operation 1228 (FIG. 12), wafer-transfer unit 112 picks-up the last wafer from second buffer 114. In operation 1230 (FIG. 12), wafer-transfer unit 112 places the last wafer into process module 116. In operation 1232 (FIG. 12), the last wafer is processed in process module 116. In operation 1002 (FIG. 12), the last wafer waits in process module 116. In operation 1234 (FIG. 12), load-lock module 108 is vented such that the pressure within load-lock module 108 is equal to the pressure within tool 100. In operation 1236 (FIG. 12), wafer-transfer unit 104 picks-up the next-to-last wafer from first buffer 110. Note that the next-last wafer was placed on first buffer 110 in operation 1226 (FIG. 12). In operation 1238 (FIG. 12), load-lock module 108 is sealed and evacuated such that the pressure within load-lock module 108 is equal to the pressure within process module 116. In operation 1240 (FIG. 12), wafer-transfer unit 104 places the next-to-last wafer into load module 102. In operation 1242 (FIG. 12), wafer-transfer unit 112 picks-up the last wafer from process module 116. In operation 1244 (FIG. 12), wafer-transfer unit 112 places the last wafer onto first buffer 110.

As depicted in FIG. 12, in operations 1246 to 1250, the last wafer is transported back to load module 102 (FIG. 1). More particularly, with reference to FIG. 1, in operation 1246 (FIG. 12), load-lock module 108 is vented such that the pressure within load-lock module 108 is equal to the pressure within tool 100. In operation 1248 (FIG. 12), wafer-transfer unit 104 picks-up the last wafer from first buffer 110. Note that the last wafer was placed on first buffer 110 in operation 1244 (FIG. 12). In operation 1250 (FIG. 12), wafer-transfer unit 104 places the last wafer into load module 102.

Thus, in end schedule 1200, operations 1218, 1240, and 1250 (corresponding to wafer-transfer unit 104 (FIG. 1) returning the second-to-last wafer, the next-to-last wafer, and the last wafer to load module 102 (FIG. 1), respectively) occur at the same amount of time following processing of the wafers in process module 116 (FIG. 1). As such, as noted earlier, the uniformity of the heat histories for these wafers can be maintained.

In the example provided above, process cycle 300 (FIG. 9) had a shorter duration than LLM cycle 400 (FIG. 4). It should be recognized, however, that operation 306 can be followed by an appropriate wait operation 1002 in applications where process cycle 300 (FIG. 9) is equal to or longer than LLM cycle 400 (FIG. 4). For example, assume that operation 306 takes about 30 seconds. As such, process cycle 300 (FIG. 9) now takes about 50 seconds. Although the duration of process cycle 300 (FIG. 9) is now equal to the duration of LLM cycle 400 (FIG. 4), operation 306 is preferably followed by wait operation 1002 such that operation 308 is performed after the completion of operation 408. In this example, waiting operation 1002 would be for about 20 seconds.

Figure 13:
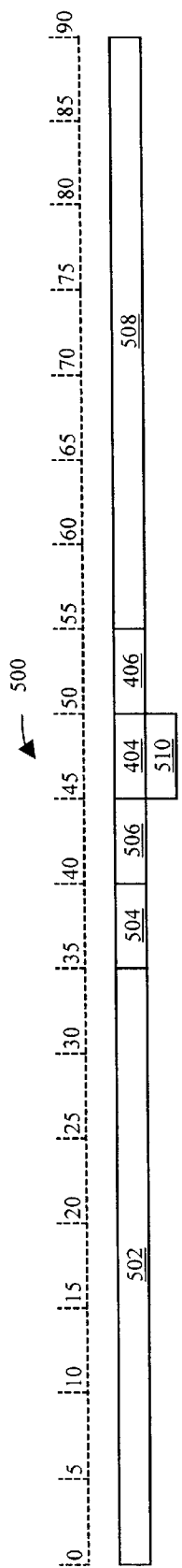

With reference now to FIG. 13, for the sake of example, assume that provide cycle 500 now takes about 90 seconds to complete. More particularly, in provide cycle 500, operations 502 and 508 each take about 35 seconds to complete. Also, assume that process cycle 300 (FIG. 3) and LLM cycle 400 (FIG. 4) take about 70 seconds and about 50 seconds, respectively. Accordingly, in the present example, provide cycle 500 is now determined to be the limitation duration.

Figure 14:
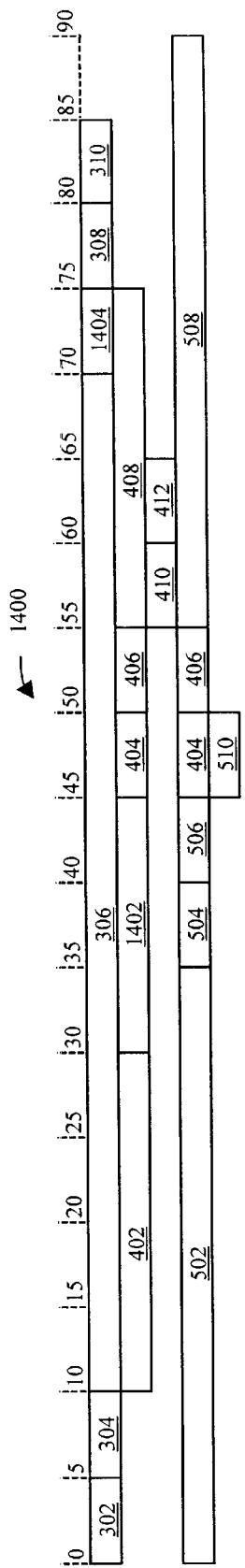

With reference now to FIG. 14, a schedule 1400 can be generated utilizing provide cycle 500 (as depicted in FIG. 13) as the limitation duration. More particularly, as depicted in FIG. 14, process cycle 300 (FIG. 3) is aligned to provide cycle 500 (FIG. 13), then LLM cycle 400 (FIG. 4) is aligned to provide cycle 500 (FIG. 13) and process cycle 300 (FIG. 3).

In the present example, process cycle 300 (FIG. 3) is aligned to provide cycle 500 (FIG. 13) such that operation 502, which corresponds to wafer-transfer unit 104 (FIG. 1) picking-up a wafer from load module 102 (FIG. 1), begins at the same time as operation 302, which corresponds to wafer-transfer unit 112 (FIG. 1) picking-up a wafer from second-buffer 114 (FIG. 1). In the present example, LLM cycle 400 (FIG. 4) is also aligned to process cycle 300 (FIG. 3) such that operation 402, which corresponds to load-lock module 108 (FIG. 1) being vented, follows operation 304, which corresponds to wafer-transfer unit 112 (FIG. 1) placing a wafer into process module 116 (FIG. 1).

Additionally, in the present example, LLM cycle 400 (FIG. 4) is aligned to provide cycle 500 (FIG. 13) such that operation 404, which corresponds to wafer-transfer unit 104 (FIG. 1) placing a wafer onto first buffer 110 (FIG. 1), of LLM cycle 400 (FIG. 4) aligns with operation 404 of provide cycle 500 (FIG. 13). As such, in the present example, a wait operation 1402 is provided following operation 402, which corresponds to load-lock module 108 (FIG. 1) being vented. In the present example, wait operation 1402 takes about 15 seconds. However, it should be recognized that wait operation 1402 can be any appropriate duration.

Furthermore, in the present example, a wait operation 1404 is provided following operation 306 such that operation 308, which corresponds to wafer-transfer unit 112 (FIG. 1) picking-up the processed wafer from process module 116 (FIG. 1), follows the completion of operation 408, which corresponds to load-lock module 108 (FIG. 1) being evacuated. In the present example, wait operation 1404 takes about 5 seconds. However, it should be recognized that wait operation 1404 can be any appropriate duration.

However, schedule 1400 assumes that tool 100 (FIG. 1) is operating in steady state; meaning that the wafer being processed in accordance with schedule 1400 is not the first or the last wafer to be processed. Thus, in accordance with one aspect of the present invention, with reference to FIG. 15, schedule 1400 can include a start schedule 1500.

Figure 15:
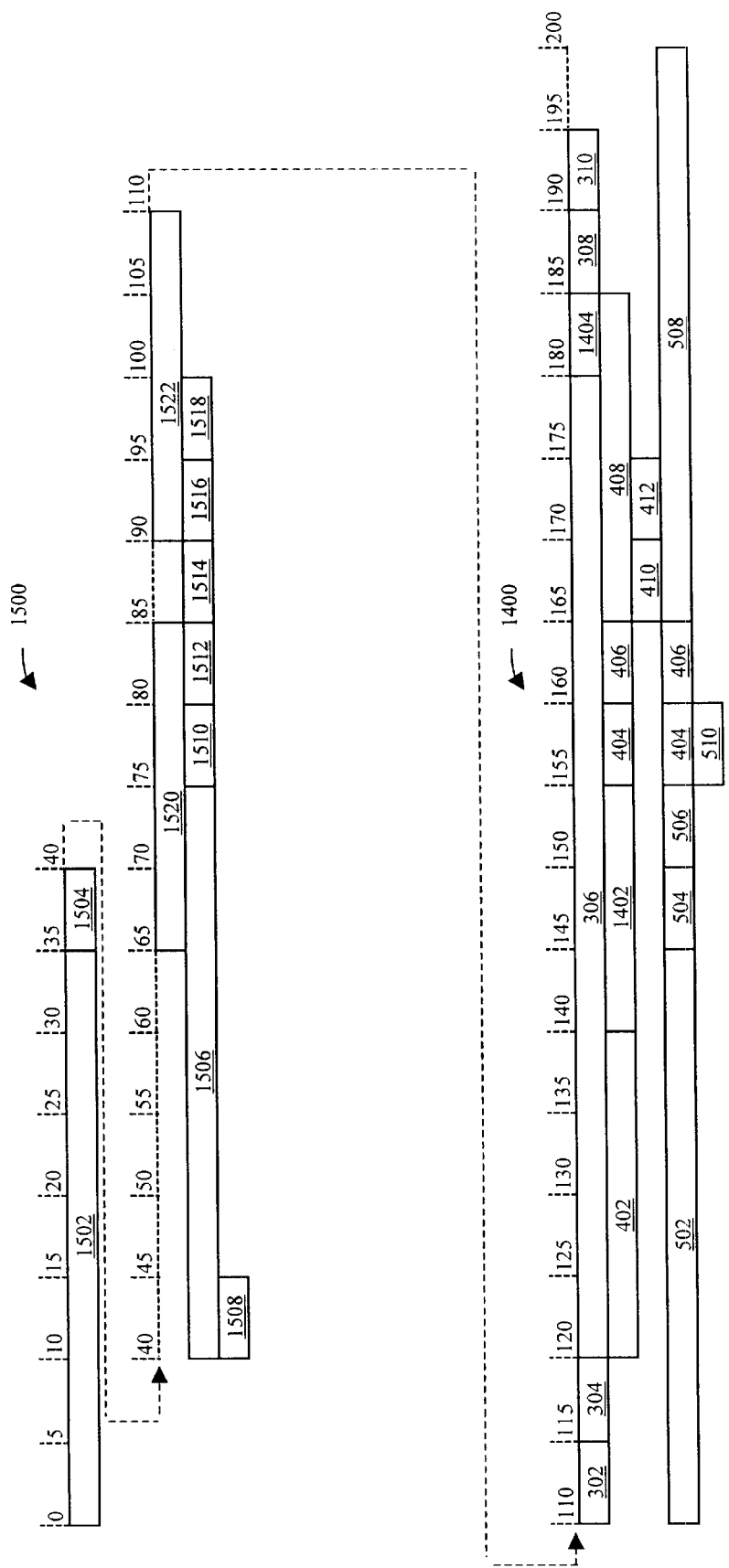

More particularly, in one embodiment, start schedule 1500 includes operations 1502 through 1522. In operation 1502, with reference to FIG. 1, wafer-transfer unit 104 picks-up the first wafer from load module 102. In operation 1504 (FIG. 15), wafer-transfer unit 104 places the first wafer onto wafer orienter 106. In operation 1506 (FIG. 15), wafer-transfer unit 104 picks-up the second wafer from load module 102. In operation 1508 (FIG. 15), wafer orienter 106 orients the first wafer. In operation 1510 (FIG. 15), wafer-transfer unit 104 picks-up the first wafer from wafer orienter 106. In operation 1512 (FIG. 15), wafer-transfer unit 104 places the second wafer onto wafer orienter 106. In operation 1514 (FIG. 15), wafer-transfer unit 104 places the first wafer onto first buffer 110. In operation 1516 (FIG. 15), wafer-transfer unit 112 picks-up the first wafer from first buffer 110. In operation 1518 (FIG. 15), wafer-transfer unit 112 places the first wafer onto second buffer 114. In operation 1520 (FIG. 15), load-lock module 108 is vented. In operation 1522 (FIG. 15), load-lock module 108 is sealed and evacuated. Moreover, as depicted in FIG. 15, operation 1520 is completed before commencing operation 1514, when the wafer is placed onto first buffer 110 (FIG. 1). Additionally, operation 1522 begins after operation 1514, when the wafer is placed onto first buffer 110 (FIG. 1).

Figure 16:
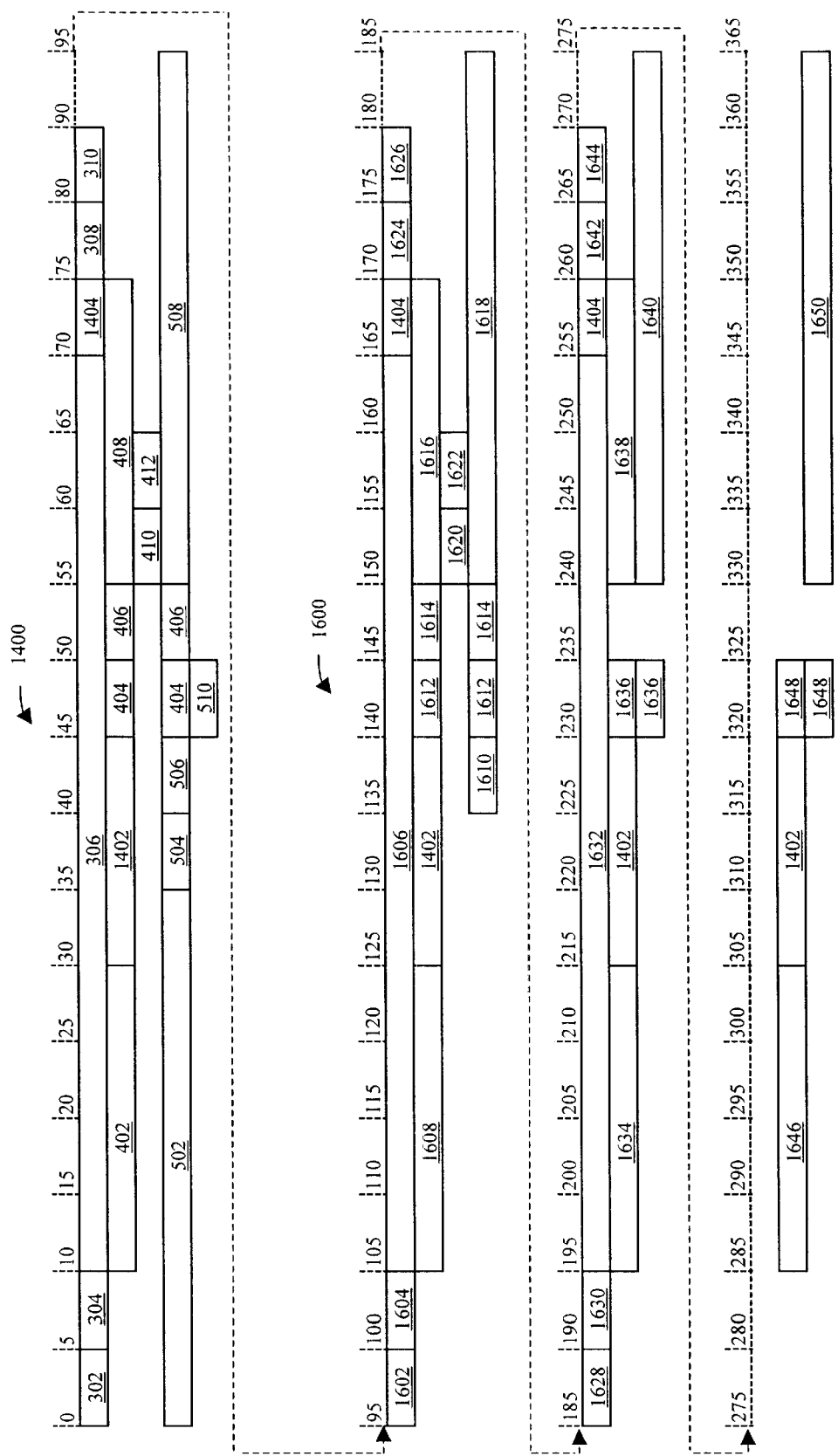

In accordance with another aspect of the present invention, with reference to FIG. 16, schedule 1400 can also include an end schedule 1600. As will be described in greater detail below, end schedule 1600 is generated such that the last wafer processed in tool 100 (FIG. 1) has the same thermal history as the previous wafers that were processed in tool 100 (FIG. 1).

As depicted in FIG. 16, in operations 1602 to 1626, the next-to-last wafer is processed in process module 116 (FIG. 1) while the last wafer is picked-up from wafer orienter 106 (FIG. 1) and the second-to-last wafer is transported back to load module 102 (FIG. 1). More particularly, with reference to FIG. 1, in operation 1602 (FIG. 16), wafer-transfer unit 112 picks-up the next-to-last wafer from second buffer 114. In operation 1604 (FIG. 16), wafer-transfer unit 112 places the next-to-last wafer into process module 116. In operation 1606 (FIG. 16), the next-to-last wafer is processed in process module 116. In operation 1404 (FIG. 16), the next-to-last wafer waits in process module 116. In operation 1608 (FIG. 16), load-lock module 108 is vented such that the pressure within load-lock module 108 is equal to the pressure within tool 100. In operation 1610 (FIG. 16), wafer-transfer unit 104 picks-up the last wafer from wafer orienter 106. In operation 1612 (FIG. 16), wafer-transfer unit 104 picks-up the second-to-last wafer from first buffer 110. Note that the second-to-last wafer was placed on first buffer 110 in operation 310 (FIG. 16). Also note that wait operation 1402 (FIG. 16) extends operation 1608 (FIG. 16) until wafer-transfer unit 104 is in position to pick-up the second-to-last wafer from first buffer 110. In operation 1614 (FIG. 16), wafer-transfer unit 104 places the last wafer onto first buffer 110. In operation 1616 (FIG. 16), load-lock module 108 is evacuated such that the pressure within load-lock module 108 is equal to the pressure within process module 116 and less than the pressure within tool 100. In operation 1618 (FIG. 16), wafer-transfer unit 104 places the second-to-last wafer into load module 102. In operation 1620 (FIG. 16), wafer-transfer unit 112 picks-up the last wafer from first buffer 110. In operation 1622 (FIG. 16), wafer-transfer unit 112 places the last wafer onto second buffer 114. In operation 1624 (FIG. 16), wafer-transfer unit 112 picks-up the next-to-last wafer from process module 116. In operation 1626 (FIG. 16), wafer-transfer unit 112 places the next-to-last wafer onto first buffer 110.

As depicted in FIG. 16, in operations 1628 to 1644, the last wafer is processed in process module 116 (FIG. 1) while the next-to-last wafer is transported back to load module 102 (FIG. 1). More particularly, with reference to FIG. 1, in operation 1628 (FIG. 16), wafer-transfer unit 112 picks-up the last wafer from second buffer 114. In operation 1630 (FIG. 16), wafer-transfer unit 112 places the last wafer into process module 116. In operation 1632 (FIG. 16), the last wafer is processed in process module 116. In operation 1404 (FIG. 16), the next-to-last wafer waits in process module 116. In operation 1634 (FIG. 16), load-lock module 108 is vented such that the pressure within load-lock module 108 is equal to the pressure within tool 100. In operation 1636 (FIG. 16), wafer-transfer unit 104 picks-up the next-to-last wafer from first buffer 110. Note that the next-last wafer was placed on first buffer 110 in operation 1626 (FIG. 16). Also note that wait operation 1402 (FIG. 16) extends operation 1634 (FIG. 16) until wafer-transfer unit 104 is in position to pick-up the next-to-last wafer from first buffer 110. In operation 1638 (FIG. 16), load-lock module 108 is evacuated such that the pressure within load-lock module 108 is equal to the pressure within process module 116. In operation 1640 (FIG. 16), wafer-transfer unit 104 places the next-to-last wafer into load module 102. In operation 1642 (FIG. 16), wafer-transfer unit 112 picks-up the last wafer from process module 116. In operation 1644 (FIG. 16), wafer-transfer unit 112 places the last wafer onto first buffer 110.

As depicted in FIG. 16, in operations 1646 to 1650, the last wafer is transported back to load module 102 (FIG. 1). More particularly, with reference to FIG. 1, in operation 1646 (FIG. 16), load-lock module 108 is vented such that the pressure within load-lock module 108 is equal to the pressure within tool 100. In operation 1648 (FIG. 16), wafer-transfer unit 104 picks-up the last wafer from first buffer 110. Note that the last wafer was placed on first buffer 110 in operation 1644 (FIG. 16). In operation 1650 (FIG. 16), wafer-transfer unit 104 places the last wafer into load module 102.

Thus, in end schedule 1600, operations 1618, 1640, and 1650 (corresponding to wafer-transfer unit 104 (FIG. 1) returning the second-to-last wafer, the next-to-last wafer, and the last wafer to load module 102 (FIG. 1), respectively) occur at the same amount of time following processing of the wafers in process module 116 (FIG. 1). As such, as noted earlier, the uniformity of the heat histories for these wafers can be maintained.

Figure 17:
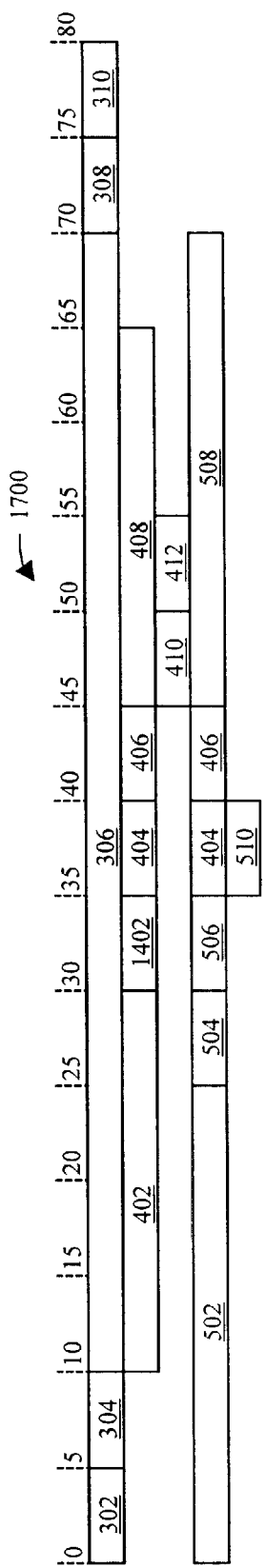

In the example provided above, provide cycle 500 (FIG. 13) had a longer duration than process cycle 300 (FIG. 3). It should be recognized, however, that operation 402 can be followed by an appropriate wait operation 1402 in applications where provide cycle 500 (FIG. 13) is equal to or shorter than process cycle 300 (FIG. 3). For example, with reference to FIG. 17, assume that operation 502 and 508 now each take about 25 seconds. As such, process cycle 300 (FIG. 3) is longer in duration than provide cycle 500 (FIG. 13). However, operation 402 is preferably followed by wait operation 1402 such that wafer-transfer unit 104 (FIG. 1) is in position to perform operation 404. In this example, wait operation 1402 would be for about 5 seconds.

With reference again to FIG. 2, having thus developed a schedule based on the limitation duration, in operation 206, the schedule is then executed. As described above, with reference again to FIG. 1, in one exemplary embodiment, tool 100 can include a control module 118 having appropriate computer hardware and software configured to execute the schedule.

In accordance with one aspect of the present invention, the execution of a schedule can be event-driven, timer-driven, or a combination of event and timer driven. As will be described below, one of these modes of executing a schedule can be preferred depending on the particular schedule to be executed.

In event-driven execution, the operations of a schedule are executed in response to the execution of another operation. For example, with reference to FIG. 6, in schedule 600, the execution of operation 402 can be triggered by the completion of operation 304. More particularly, with reference to FIG. 1, when wafer-transfer unit 112 has placed a wafer in process module 116 (operation 304 in FIG. 6), load-lock module 108 then begins to be vented (operation 402 in FIG. 6). In one exemplary embodiment, sensors can be provided in load-lock module 108 and/or process module 116 to signal control module 118 when wafer-transfer unit 112 has completed placing the wafer in process module 116. Control module 118 can then send an appropriate control signal to load-lock module 108 to begin ventilating.

One advantage of event-driven execution is that it can utilize less computer resources, such as processing time, memory space, and the like. Additionally, when the capability of wafer-transfer unit 104 is the time limitation, then event-driven execution can be faster than timer-driven execution. For example, schedule 1400 depicted in FIG. 14 can be executed utilizing event-driven execution rather than timer-drive execution.

In timer-driven execution, the operations of a schedule are executed at predetermined time settings or intervals. For example, with reference again to FIG. 6, in schedule 600, operations 304 and 402 can be executed at specific time settings, such as 5 seconds and 10 seconds, respectively. Alternatively, operation 404 can be executed 5 seconds after operation 304. As such, control module 118 can include a timing mechanism.

One advantage of timer-driven execution is that it can provide greater uniformity in the thermal histories of the wafers. As such, when the capability of wafer-transfer unit 104 is not the time limitation, then timer-driven execution is preferred over strictly event-driven execution. For example, schedule 600 depicted in FIG. 6 can be executed utilizing timer-driven execution rather than event-driven execution.

As noted above, another alternative is a combination of event-driven and timer-driven execution in which some operations are event-driven executed and others are timer-driven executed. For example, with reference again to FIG. 6, in schedule 600, the execution of operations 402, and 502 can be timer-driven, while the execution of the remaining operations of schedule 600 are event-driven.

More particularly, operation 302 can be triggered by the completion of operation 310 from a previous execution of schedule 600. Thus, with reference to FIG. 1, wafer-transfer unit 112 picks-up an unprocessed wafer from second buffer 114 after having placed a previously processed wafer onto first buffer 110.

With reference again to FIG. 6, operation 402 is executed at a specified time setting or interval. As depicted in FIG. 6, assume that operation 402 executes 10 seconds from the time that schedule 600 first begins to execute. Operation 404 then executes when operation 402 is completed. Thus, with reference to FIG. 1, load-lock module 108 begins to ventilate 10 seconds into the execution of schedule 600. However, wafer-transfer unit 104 picks-up the processed wafer from first buffer 110 only after load-lock module 108 has completed ventilating.

One advantage of combining event-driven and timer-driven execution is that greater uniformity in heat history can be maintained while utilizing less computer resources. As such, schedule 600 depicted in FIG. 6 is preferably executed utilizing a combination of event-driven and timer-driven execution.

With reference to FIG. 1, thus far the generation of schedules for the processing of wafers has been described in conjunction with tool 100 having one load-lock module 108 and process module 116. However, as alluded to earlier, tool 100 can be configured with any number of load-lock modules 108 and process modules 116. As will be illustrated below in connection with alternative exemplary embodiments, the schedule-generation process depicted in FIG. 2 and described above for tool 100 having one load-lock module 108 and process module 116 can be utilized to generate schedules for tool 100 having multiple load-lock modules 108 and process modules 116.

Figure 18:
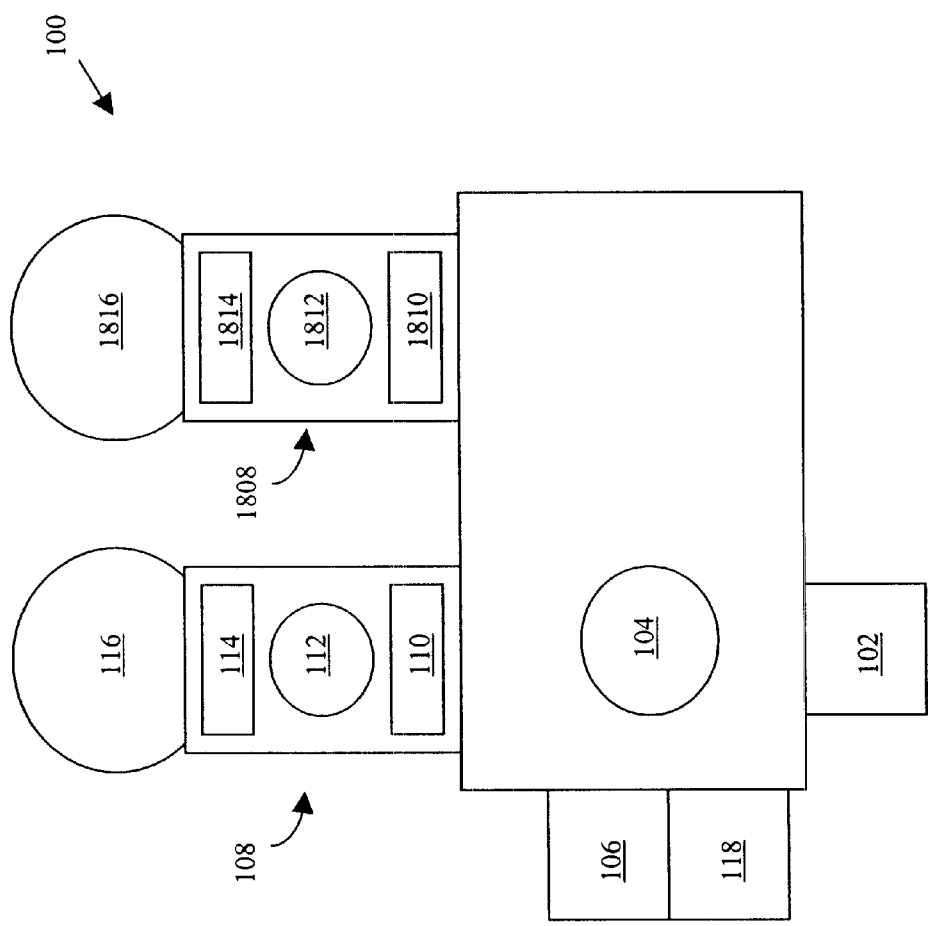
FIG. 18 is a top view of an alternative embodiment of a wafer-processing tool.

With reference to FIG. 18, in one alternative embodiment, tool 100 is shown having an additional load-lock module 1808 and process module 1816. It should be recognized that process modules 116 and 1816 can perform the same or different wafer-processing operations. Additionally, process modules 116 and 1816 can operate in parallel or in series. As will be described in greater detail below, when process modules 116 and 1816 operate in parallel, a wafer is processed in either process module 116 or process module 1816. In contrast, when process modules 116 and 1816 operate in series, a wafer is processed in both process module 116 and process module 1816.

For the sake of convenience and clarity, assume that process cycle 300 (FIG. 3) depicts the process cycle for process module 116 and process module 1816. Similarly, assume that LLM cycle 400 (FIG. 4) and provide cycle 500 depict the LLM cycle and provide cycle for process module 116 and process module 1816. However, it should be recognized that process modules 116 and 1816 can have different process cycles, LLM cycles, and/or provide cycles. Additionally, as described above, the duration of these cycles can be calculated explicitly or determined empirically.

As described above, with reference to FIG. 2, schedule-generation process 200 can be utilized to generate a schedule for the movement of wafers in tool 100 having process modules 116 (FIG. 18) and 1816 (FIG. 18). For the sake of example, now assume that process modules 116 (FIG. 18) and 1816 (FIG. 18) operate in parallel. Thus, a wafer is processed in either process module 116 (FIG. 18) or 1816 (FIG. 18) but not in both.

As depicted in FIG. 2, in operation 202, a limitation duration is determined. As noted above, in the present example, process modules 116 and 1816 are assumed to have process, LLM, and provide cycles as depicted in FIGS. 3, 4, and 5, respectively. As such, as described in conjunction with an earlier embodiment of the present invention, process cycle 300 (FIG. 3) is determined to be the limitation duration.

Figure 19:
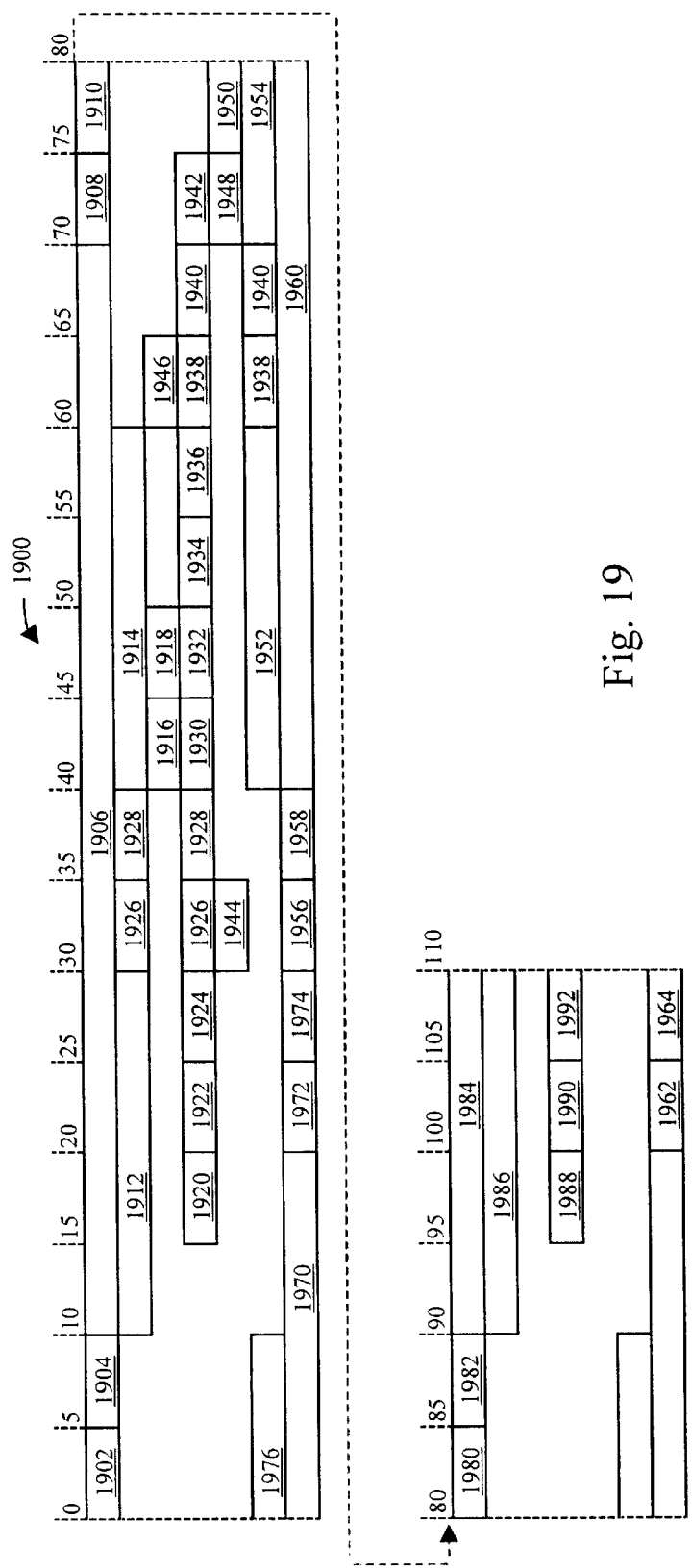
FIGS. 19 through 24 are block diagrams of exemplary schedules.

In operation 202, a schedule is generated based on the limitation duration. With reference now to FIG. 19, an exemplary schedule 1900 is depicted for scheduling the processing of wafers in tool 100 (FIG. 18) having process modules 116 (FIG. 18) and 1816 (FIG. 18). However, it should be recognized that the particular operations, order of operations, and duration of operations depicted in FIG. 19 and described herein can vary depending on the particular configuration of tool 100 (FIG. 18) and the particular application. As such, schedule 1900 can also vary depending on the particular configuration of tool 100 (FIG. 18) can the particular application.

The various operations of schedule 1900 will be described in greater detail below. It should be recognized that a number of wafers are located in tool 100 at any given time. As such, for the sake of clarity, the following description includes numbers in parenthesis to aid in identifying the wafers being processed in tool 100. As such, these numbers are provided to assist in distinguishing one wafer from another and not necessarily to suggest any particular order or priority.

In the present example, with reference to FIG. 18 and with regard to process module 116, in operation 1902 (FIG. 19), wafer-transfer unit 112 picks-up an unprocessed wafer (wafer 1) from second buffer 114. In operation 1904 (FIG. 19), wafer-transfer unit 112 places the unprocessed wafer (wafer 1) into process module 116. In operation 1906 (FIG. 19), the wafer (wafer 1) is processed in process module 116. In operation 1908 (FIG. 19), wafer-transfer unit 112 picks-up the processed wafer (wafer 1) from process module 116. In operation 1910 (FIG. 19), wafer-transfer unit 112 places the processed wafer (wafer 1) onto first buffer 110.

In operation 1912 (FIG. 19), load-lock module 108 is vented such that the pressure within load-lock module 108 is equal to the pressure within tool 100. In operation 1920 (FIG. 19), wafer-transfer unit 104 picks-up an unprocessed wafer (wafer 2) from load module 102. In operation 1922 (FIG. 19), wafer-transfer unit 104 picks-up an oriented wafer (wafer 3) from wafer orienter 106. In operation 1924 (FIG. 19), wafer-transfer unit 104 places the unprocessed wafer (wafer 2) onto wafer orienter 106. In operation 1944 (FIG. 19), the wafer (wafer 2) is oriented. In operation 1926 (FIG. 19), wafer-transfer unit 104 picks-up from first buffer 110 a wafer (wafer 4) that was processed in process module 116 in an earlier process cycle. In operation 1928 (FIG. 19), wafer-transfer unit 104 places the unprocessed wafer (wafer 3) onto first buffer 110. In operation 1914 (FIG. 19), load-lock module 108 is sealed and evacuated such that the pressure within load-lock module 108 is equal to the pressure with process module 116. In operation 1916 (FIG. 19), wafer-transfer unit 112 picks-up the unprocessed wafer (wafer 3) from first buffer 110. In operation 1918 (FIG. 19), wafer-transfer unit 112 places the unprocessed wafer (wafer 3) onto second buffer 114. In operation 1930 (FIG. 19), wafer-transfer unit 104 places the processed wafer (wafer 4) into load module 102.

With regard now to process module 1816, in operation 1956 (FIG. 19), wafer-transfer unit 1812 picks-up an unprocessed wafer (wafer 5) from second buffer 1814. In operation 1958 (FIG. 19), wafer-transfer unit 1812 places the unprocessed wafer (wafer 5) in process module 1816. In operation 1960 (FIG. 19), the wafer (wafer 5) is processed in process module 1816. In operation 1962 (FIG. 19), wafer-transfer unit 1812 picks-up the processed wafer (wafer 5) from process module 1816. In operation 1964 (FIG. 19), wafer-transfer unit 1812 places the processed wafer (wafer 5) onto first buffer 1810.

In operation 1952 (FIG. 19), load-lock modules 1808 is vented such that the pressure within load-lock module 1808 is equal to the pressure within tool 100. In operation 1932 (FIG. 19), wafer-transfer unit 104 picks-up an unprocessed wafer (wafer 6) from load module 102. In operation 1934 (FIG. 19), wafer-transfer unit 104 picks-up an oriented wafer (wafer 2) from wafer orienter 106. In operation 1936 (FIG. 19), wafer-transfer unit 104 places the unprocessed wafer (wafer 6) onto wafer orienter 106. In operation 1946 (FIG. 19), the wafer (wafer 6) is oriented. In operation 1938 (FIG. 19), wafer-transfer unit 104 picks-up from first buffer 1810 a wafer (wafer 7) that was processed in process module 1816 in an earlier process cycle. In operation 1940 (FIG. 19), wafer-transfer unit 104 places the unprocessed wafer (wafer 2) onto first buffer 1810. In operation 1954 (FIG. 19), load-lock module 1808 is sealed and evacuated such that the pressure within load-lock module 1808 is equal to the pressure within process module 1816. In operation 1948 (FIG. 19), wafer-transfer unit 1812 picks-up the unprocessed wafer (wafer 2) from first buffer 1810. In operation 1950 (FIG. 19), wafer-transfer unit 1812 places the unprocessed wafer (wafer 2) onto second buffer 1814. In operation 1942 (FIG. 19), wafer-transfer unit 104 places the processed wafer (wafer 7) into load module 102.

With reference again to FIG. 19, operations 1980 through 1992 are associated with the beginning of another process cycle for process module 116. More particularly, with reference again to FIG. 18, in operation 1980 (FIG. 19), wafer-transfer unit 112 picks-up an unprocessed wafer (wafer 2) from second buffer 114. In operation 1982 (FIG. 19), wafer-transfer unit 112 places the unprocessed wafer (wafer 2) into process module 116. In operation 1984 (FIG. 19), the wafer (wafer 2) is processed in process module 116. In operation 1988 (FIG. 19), wafer-transfer unit 104 picks-up an unprocessed wafer (wafer 8) from load module 102. In operation 1990 (FIG. 19), wafer-transfer unit 104 picks-up an oriented wafer (wafer 6) from wafer orienter 106. In operation 1992 (FIG. 19), wafer-transfer unit 104 places the unprocessed wafer (wafer 8) onto wafer orienter 106.

With reference again to FIG. 19, operations 1970 through 1976 are associated with the completion of a previous process cycle for process module 1816. More particularly, with reference again to FIG. 18, in operation 1970 (FIG. 19), a wafer (wafer 7) is processed in process module 1816. In operation 1972 (FIG. 19), wafer-transfer unit 1812 picks-up the processed wafer (wafer 7) from process module 1816. In operation 1974 (FIG. 19), wafer-transfer unit 1812 places the processed wafer (wafer 7) onto first buffer 1810. In operation 1976, load-lock module 1808 is in the process of being sealed and evacuated.

Schedule 1900 assumes that tool 100 is operating in a steady state; meaning that the wafer being processed in accordance with schedule 1900 is not the first or the last wafer to be processed. Thus, in accordance with one aspect of the present invention, with reference to FIG. 20, schedule 1900 can include a start schedule 2000.

More particularly, in one embodiment, start schedule 2000 includes operations 2002 through 20104. In operation 2002, with reference to FIG. 18 and with regard to process module 116, wafer-transfer unit 104 picks-up the first wafer from load module 102. In operation 2004 (FIG. 20), wafer-transfer unit 104 places the first wafer onto wafer orienter 106. In operation 2006 (FIG. 20), wafer-transfer unit 104 picks-up the second wafer from load module 102. In operation 20 32 (FIG. 20), wafer orienter 106 orients the first wafer. In operation 2008 (FIG. 20), wafer-transfer unit 104 picks-up the first wafer from wafer orienter 106. In operation 2010 (FIG. 20), wafer-transfer unit 104 places the second wafer onto wafer orienter 106. In operation 2022 (FIG. 20), load-lock module 108 is vented. In operation 2012 (FIG. 20), wafer-transfer unit 104 places the first wafer onto first buffer 110. In operation 2024 (FIG. 20), load-lock module 108 is sealed and evacuated. In operation 2026 (FIG. 20), wafer-transfer unit 112 picks-up the first wafer from first buffer 110. In operation 2028 (FIG. 20), wafer-transfer unit 112 places the first wafer onto second buffer 114. In operation 2036 (FIG. 20), wafer-transfer unit 112 picks-up the first wafer from second buffer 114. In operation 2038 (FIG. 20), wafer-transfer unit 112 places the first wafer in process module 116. In operation 2040 (FIG. 20), the first wafer is processed in process module 116. In operation 2042 (FIG. 20), wafer-transfer unit 112 picks-up the first wafer from process module 116. In operation 2044 (FIG. 20), wafer-transfer unit 112 places the first wafer onto first buffer 110.

With regard to process module 1816, in operation 2014 (FIG. 20), wafer-transfer unit 104 picks-up the third wafer from load module 102. In operation 2016 (FIG. 20), wafer-transfer unit 104 picks-up the second wafer from wafer orienter 106. In operation 2018 (FIG. 20), wafer-transfer unit 104 places the third wafer onto wafer orienter 106. In operation 2030 (FIG. 20), wafer orienter 106 orients the third wafer. In operation 2034 (FIG. 20), load-lock module 1808 is vented. In operation 2020 (FIG. 20), wafer-transfer unit 104 places the second wafer onto first buffer 1810. In operation 2094 (FIG. 20), load-lock module 1808 is sealed and evacuated. In operation 2072 (FIG. 20), wafer-transfer unit 1812 picks-up the second wafer from first buffer 1810. In operation 2074 (FIG. 20), wafer-transfer unit 1812 places the second wafer onto second buffer 1814. In operation 2096

(FIG. 20), wafer-transfer unit 1812 picks-up the first wafer from second buffer 1814. In operation 2098 (FIG. 20), wafer-transfer unit 1812 places the first wafer in process module 1816. In operation 20104 (FIG. 20), the second wafer is processed in process module 1816.

Figure 20:
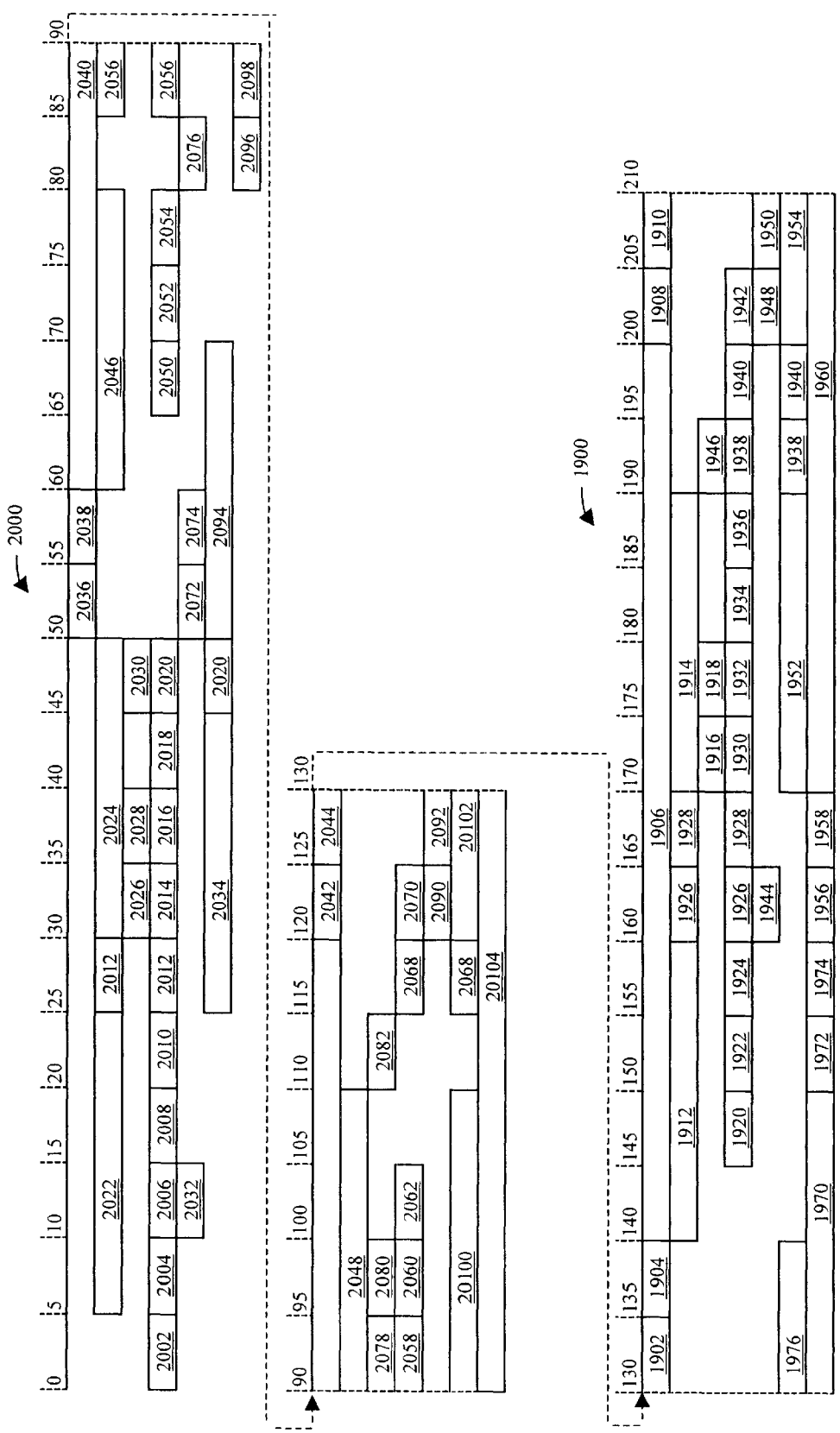

With reference to FIG. 20, note that operation 20104 continues as operation 1970 in schedule 1900. As such, with reference again to FIG. 18, in operation 1972 (FIG. 20), wafer-transfer unit 1812 picks-up the second wafer from process module 1816. In operation 1974 (FIG. 20), wafer-transfer unit 1812 places the second wafer onto first buffer 1810.

With regard again to process module 116, in operation 2050 (FIG. 20), wafer-transfer unit 104 picks-up the fourth wafer from load module 102. In operation 2052 (FIG. 20), wafer-transfer unit 104 picks-up the third wafer from wafer orienter 106. In operation 2054 (FIG. 20), wafer-transfer unit 104 places the fourth wafer onto wafer orienter 106. In operation 2076 (FIG. 20), wafer orienter 106 orients the fourth wafer. In operation 2046 (FIG. 20), load-lock module 108 is vented. In operation 2056 (FIG. 20), wafer-transfer unit 104 places the third wafer onto first buffer 110. In operation 2048 (FIG. 20), the load-lock module 108 is sealed and evacuated. In operation 2078 (FIG. 20), wafer-transfer unit 112 picks-up the third wafer from first buffer 110. In operation 2080 (FIG. 20), wafer-transfer unit 112 places the third wafer onto second buffer 114. In operation 1902 (FIG. 20), wafer-transfer unit 112 picks-up the third wafer from second buffer 114. In operation 1904 (FIG. 20), wafer-transfer unit 112 places the third wafer into process module 116. In operation 1906 (FIG. 20), the third wafer is processed in process module 116.

With regard again to process module 1816, in operation 2058 (FIG. 20), wafer-transfer unit 104 picks-up the fifth wafer from load module 102. In operation 2060 (FIG. 20), wafer-transfer unit 104 picks-up the fourth wafer from wafer orienter 106. In operation 2062 (FIG. 20), wafer-transfer unit 104 places the fifth wafer onto wafer orienter 106. In operation 2082 (FIG. 20), wafer orienter 106 orients the fifth wafer. In operation 20100 (FIG. 20), load-lock module 1808 is vented. In operation 2068 (FIG. 20), wafer-transfer unit 104 places the fourth wafer onto first buffer 1810. In operation 20102 (FIG. 20), load-lock module 1808 is sealed and evacuated.

With reference to FIG. 20, note that operation 20102 continues as operation 1976 in schedule 1900. With reference again to FIG. 18, in operation 2090 (FIG. 20), wafer-transfer unit 1812 picks-up the fourth wafer from first buffer 1810. In operation 2092 (FIG. 20), wafer-transfer unit 1812 places the fourth wafer onto second buffer 1814. In operation 1956 (FIG. 20), wafer-transfer unit 1812 picks-up the fourth wafer from second buffer 1814. In operation 1958 (FIG. 20), wafer-transfer unit 1812 places the fourth wafer into process module 1816. In operation 1960 (FIG. 20), the fourth wafer is processed in process module 1816.

Figure 21:
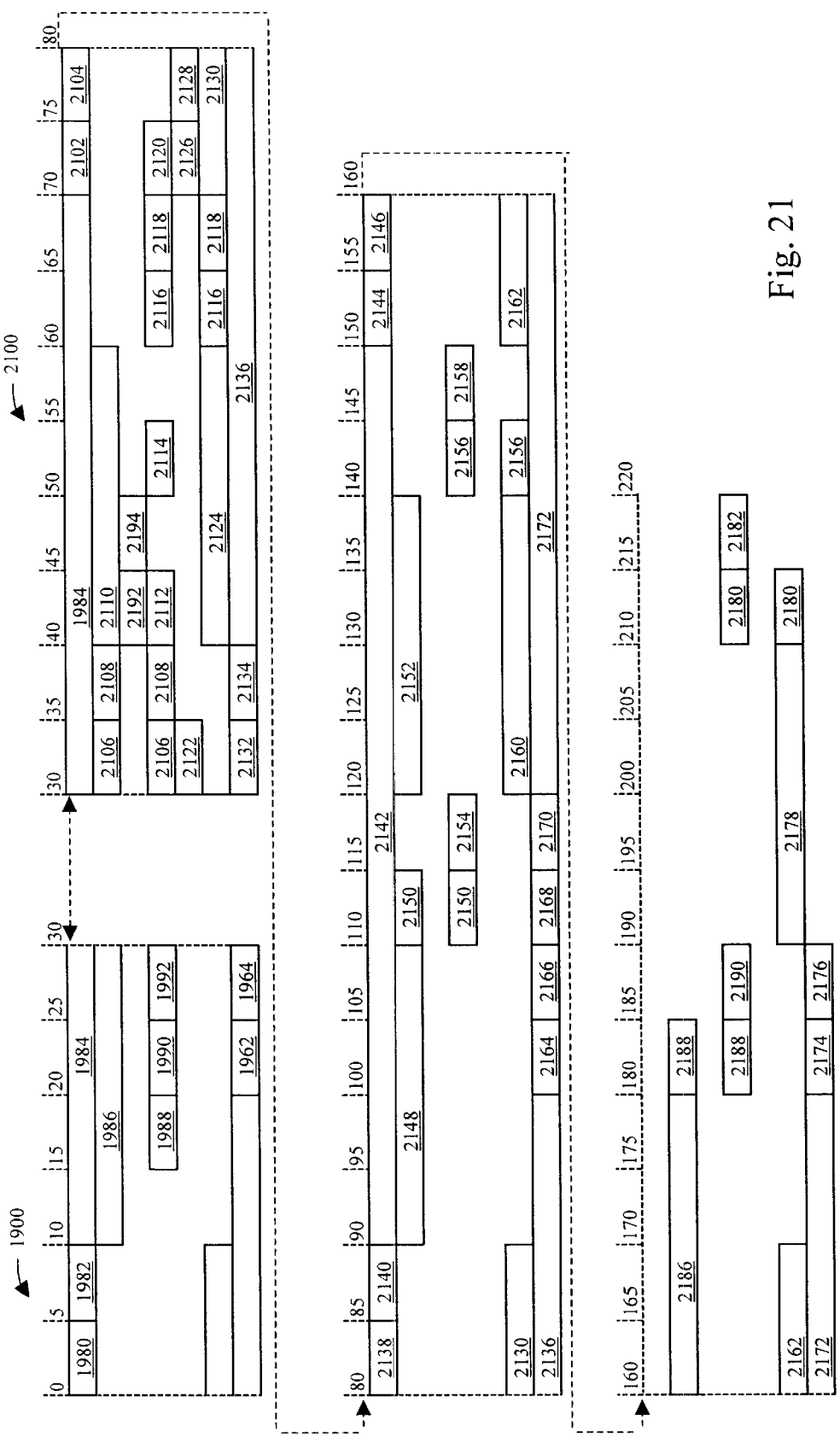

In accordance with another aspect of the present invention, with reference to FIG. 21, schedule 1900 can also include an end schedule 2100. As will be described in greater detail below, end schedule 2100 is generated such that the last wafer processed in tool 100 (FIG. 18) has the same thermal history as the previous wafers that were processed in tool 100 (FIG. 18).

With regard to process module 116 (FIG. 18), as depicted in FIG. 21, the fourth-to-last wafer is processed in operation 1984. With reference to FIG. 18, in operation 2102 (FIG. 21), wafer-transfer unit 112 picks-up the fourth-to-last wafer from process module 116. In operation 2104 (FIG. 21), wafer-transfer unit 112 places the fourth-to-last wafer onto first buffer 110.

In operation 1988 (FIG. 21), wafer-transfer unit 104 picks-up the last wafer from load module 102. In operation 1990 (FIG. 21), wafer-transfer unit 104 picks-up the second-to-last wafer from wafer orienter 106. In operation 1992 (FIG. 21), wafer-transfer unit 104 places the last wafer onto wafer orienter 106. In operation 2122 (FIG. 21), wafer orienter 106 orients the last wafer. In operation 2106 (21), wafer-transfer unit 104 places the second-to-last wafer onto first buffer 110. In operation 2108 (FIG. 21), wafer-transfer unit 104 picks-up the sixth-to-last wafer from first buffer 110. In operation 2112 (FIG. 21), wafer-transfer unit places the sixth-to-last wafer in load module 102. In operation 2110 (FIG. 21), load-lock module 108 is sealed and evacuated. In operation 2192 (FIG. 21), wafer-transfer unit 112 picks-up the second-to-last wafer from first buffer 110. In operation 2194 (FIG. 21), wafer-transfer unit 112 places the second-to-last wafer onto second buffer 114.

With regard to process module 1816, in operation 2132 (FIG. 21), wafer-transfer unit 1812 picks-up the third-to-last wafer from second buffer 1814. In operation 2134 (FIG. 21), wafer-transfer unit 1812 places the third-to-last wafer in process module 1816. In operation 2136 (FIG. 21), the third-to-last wafer is processed in process module 1816. In operation 2164 (FIG. 21), wafer-transfer unit 1812 picks-up the third-to-last wafer from process module 1816. In operation 2166 (FIG. 21), wafer-transfer unit 1812 places the third-to-last wafer onto first buffer 1810.

In operation 2114 (FIG. 21), wafer-transfer unit 104 picks-up the last wafer from wafer orienter 106. In operation 2124 (FIG. 21), load-lock module 1808 is vented. In operation 2116 (FIG. 21), wafer-transfer unit 104 picks-up the fifth-to-last wafer from first buffer 1810. Note that the fifth-to-last wafer was removed from process module 1816 in operation 1962 (FIG. 21) and placed on first buffer 1810 in operation 1964 (FIG. 21). In operation 2118 (FIG. 21), wafer-transfer unit 104 places the last wafer onto first buffer 1810. In operation 2120 (FIG. 21), wafer-transfer unit 104 places the fifth-to-last wafer in load module 102. In operation 2130 (FIG. 21), load-lock module 1808 is sealed and evacuated. In operation 2126 (FIG. 21), wafer-transfer unit 1812 picks-up the last wafer from first buffer 1810. In operation 2128 (FIG. 21), wafer-transfer unit 1812 places the last wafer onto second buffer 1814.

With regard to process module 116, in operation 2138 (FIG. 21), wafer-transfer unit 112 picks-up the second-to-last wafer from second buffer 114. In operation 2140 (FIG. 21), wafer-transfer unit 112 places the second-to-last wafer in process module 116. In operation 2142 (FIG. 21), the second-to-last wafer is processed in process module 116. In operation 2144 (FIG. 21), wafer-transfer unit 112 picks-up the second-to-last wafer from process module 116. In operation 2146 (FIG. 21), wafer-transfer unit 112 places the second-to-last wafer onto first buffer 110.

In operation 2148 (FIG. 21), load-lock module 108 is vented. In operation 2150 (FIG. 21), wafer-transfer unit 104 picks-up the fourth-to-last wafer from first buffer 110. In operation 2154 (FIG. 21), wafer-transfer unit 104 places the fourth-to-last wafer in load module 102. In operation 2152 (FIG. 21), load-lock module 108 is sealed and evacuated.

With regard to process module 1816, in operation 2168 (FIG. 21), wafer-transfer unit 1812 picks-up the last wafer from second buffer 1814. In operation 2170 (FIG. 21), wafer-transfer unit 1812 places the last wafer into process module 1816. In operation 2172 (FIG. 21), the last wafer is processed in process module 1816. In operation 2174 (FIG. 21), wafer-transfer unit 1812 picks-up the last wafer from process module 1816. In operation 2176 (FIG. 21), wafer-transfer unit 1812 places the last wafer onto first buffer 1810.

In operation 2160 (FIG. 21), load-lock module 1808 is vented. In operation 2156 (FIG. 21), wafer-transfer unit 104 picks-up the third-to-last wafer from first buffer 1810. In operation 2158 (FIG. 21), wafer-transfer unit 104 places the third-to-last wafer in load module 102. In operation 2162 (FIG. 21), load-lock module 1808 is sealed and evacuated.

With regard again to process module 116, in operation 2186 (FIG. 21), load-lock module 108 is vented. In operation 2188 (FIG. 21), wafer-transfer unit 104 picks-up the second-to-last wafer from first buffer 110. In operation 2190 (FIG. 21), wafer-transfer unit 104 places the second-to-last wafer in load module 102.

With regard again to process module 1816, in operation 2178 (FIG. 21), load-lock module 1808 is vented. In operation 2180 (FIG. 21), wafer-transfer unit 1804 picks-up the last wafer from first buffer 1810. In operation 2182 (FIG. 21), wafer-transfer unit 104 places the last wafer in load module 102.

Thus, in end schedule 2100, operations 2112, 2120, 2154, 2158, 2190, and 2182 (corresponding to wafer-transfer unit 104 (FIG. 18) returning the sixth-to-last wafer, the fifth-to-last wafer, the fourth-to-last wafer, the third-to-last wafer, the second-to-last wafer, and the last wafer, respectively, to load module 102 (FIG. 18)) occur at the same amount of time following the processing of the wafers in process modules 116 (FIG. 18) and 1816 (FIG. 18). As such, as alluded to earlier, the uniformity of the heat histories of these wafers can be maintained.

With reference again to FIG. 2, having developed a schedule based on the limitation duration, in operation 206, the schedule is then executed. As described in greater detail above, with reference again to FIG. 1, in one exemplary embodiment, tool 100 can include a control module 118 having suitable hardware and software configured to execute the schedule. Alternatively, the scheduler can be configured as a separate unit having suitable hardware and software configured to execute the schedule.

With reference to FIG. 18, in the above description, the duration of the wafer-processing operation in process modules 116 and 1816 were assumed to be the same. Additionally, as described above, the schedule for process modules 116 and 1816 were generated together. It should be recognized, however, that the duration of the wafer-processing operations in process modules 116 and 1816 can vary depending on the particular application. It should also be recognized that a schedule that utilizes either process module 116 or 1816 can already be running on tool 100 when a schedule that utilizes both process modules 116 and 1816 is to be generated and executed on tool 100.

For the sake of example, assume that the duration of the process cycles in process modules 116 and 1816 are now about 80 seconds and about 110 seconds, respectively. However, it should be recognized that the duration of the process cycle for process module 116 can be longer than that in process module 1816.

For the sake of example, assume also that schedule 600 (FIG. 6) has already been generated and running for process module 116 when a schedule that utilizes both process modules 116 and 1816 is to be generated and executed. However, it should be recognized that process module 1816 can be operating when process module 116 is to be utilized.

Now assume that the process cycle in process module 1816 is preferred over that in process module 116. For example, in some applications, it may be more desirable to quickly process wafers in process module 1816 than to maintain uniformity of the heat histories of the wafers being processed in process module 116. In such applications, as described below, a wait period is provided between the process cycles of the process module 116 having the shorter process cycle.

Figure 22:
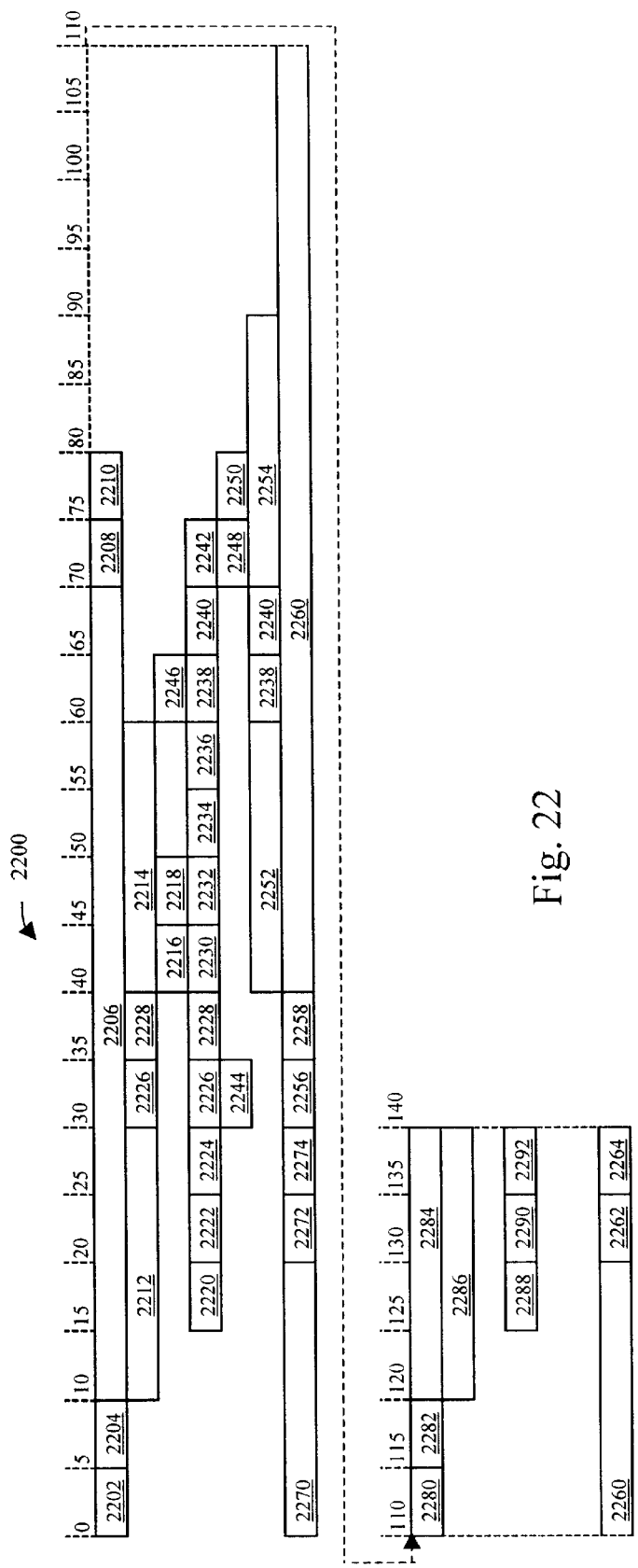

For example, with reference now to FIG. 22, in a schedule 2200, the process cycle for process module 1816 (FIG. 18) is assumed to be preferred, and the duration of the process cycles for process modules 116 (FIG. 18) and 1816 (FIG. 18) are about 80 seconds and about 110 seconds, respectively. As such, in schedule 2200, a wait period is provided between process cycles in process module 116 (FIG. 18) that is equal to the difference in duration of the process cycles in process module 1816 (FIG. 18) and process module 116 (FIG. 18), which in this example is about 30 seconds.

The various operations of schedule 2200 will now be described in greater detail below. It should be recognized that a number of wafers are located in tool 100 (FIG. 18) at any given time. As such, for the sake of clarity, the following description includes numbers in parenthesis to aid in identifying the wafers being processed in tool 100 (FIG. 18). As such, these numbers are provided to assist in distinguishing one wafer from another and not necessarily to suggest any particular order or priority.

In the present example, with reference to FIG. 18 and with regard to process module 116, in operation 2202 (FIG. 22), wafer-transfer unit 112 picks-up an unprocessed wafer (wafer 1) from second buffer 114. In operation 2204 (FIG. 22), wafer-transfer unit 112 places the unprocessed wafer (wafer 1) into process module 116. In operation 2206 (FIG. 22), the wafer (wafer 1) is processed in process module 116. In operation 2208 (FIG. 22), wafer-transfer unit 112 picks-up the processed wafer (wafer 1) from process module 116. In operation 2210 (FIG. 22), wafer-transfer unit 112 places the processed wafer (wafer 1) onto first buffer 110.

In operation 2212 (FIG. 22), load-lock module 108 is vented such that the pressure within load-lock module 108 is equal to the pressure within tool 100. In operation 2220 (FIG. 22), wafer-transfer unit 104 picks-up an unprocessed wafer (wafer 2) from load module 102. In operation 2222 (FIG. 22), wafer-transfer unit 104 picks-up an oriented wafer (wafer 3) from wafer orienter 106. In operation 2224 (FIG. 22), wafer-transfer unit 104 places the unprocessed wafer (wafer 2) onto wafer orienter 106. In operation 2244 (FIG. 22), the wafer (wafer 2) is oriented. In operation 2226 (FIG. 22), wafer-transfer unit 104 picks-up from first buffer 110 a wafer (wafer 4) that was processed in process module 116 in an earlier process cycle. In operation 2228 (FIG. 22), wafer-transfer unit 104 places the unprocessed wafer (wafer 3) onto first buffer 110. In operation 2214 (FIG. 22), load-lock module 108 is sealed and evacuated such that the pressure within load-lock module 108 is equal to the pressure within process module 116. In operation 2216 (FIG. 22), wafer-transfer unit 112 picks-up the unprocessed wafer (wafer 3) from first buffer 110. In operation 2218 (FIG. 22), wafer-transfer unit 112 places the unprocessed wafer (wafer 3) onto second buffer 114. In operation 2230 (FIG. 22), wafer-transfer unit 104 places the processed wafer (wafer 4) into load module 102.

With regard now to process module 1816, in operation 2256 (FIG. 22), wafer-transfer unit 1812 picks-up an unprocessed wafer (wafer 5) from second buffer 1814. In operation 2258 (FIG. 22), wafer-transfer unit 1812 places the unprocessed wafer (wafer 5) in process module 1816. In operation 2260 (FIG. 22), the wafer (wafer 5) is processed in process module 1816. In operation 2262 (FIG. 22), wafer-transfer unit 1812 picks-up the processed wafer (wafer 5) from process module 1816. In operation 2264 (FIG. 22), wafer-transfer unit 1812 places the processed wafer (wafer 5) onto first buffer 1810.

In operation 2252 (FIG. 22), load-lock modules 1808 is vented such that the pressure within load-lock module 1808 is equal to the pressure within tool 100. In operation 2232 (FIG. 22), wafer-transfer unit 104 picks-up an unprocessed wafer (wafer 6) from load module 102. In operation 2234, (FIG. 22), wafer-transfer unit 104 picks-up an oriented wafer (wafer 2) from wafer orienter 106. In operation 2236 (FIG. 22), wafer-transfer unit 104 places the unprocessed wafer (wafer 6) onto wafer orienter 106. In operation 2246 (FIG. 22), the wafer (wafer 6) is oriented. In operation 2238 (FIG. 22), wafer-transfer unit 104 picks-up from first buffer 1810 a wafer (wafer 7) that was processed in process module 1816 in an earlier process cycle. In operation 2240 (FIG. 22), wafer-transfer unit 104 places the unprocessed wafer (wafer 2) onto first buffer 1810. In operation 2254 (FIG. 22), load-lock module 1808 is sealed and evacuated such that the pressure within load-lock module 1808 is equal to the pressure within process module 1816. In operation 2248 (FIG. 22), wafer-transfer unit 1812 picks-up the unprocessed wafer (wafer 2) from first buffer 1810. In operation 2250 (FIG. 22), wafer-transfer unit 1812 places the unprocessed wafer (wafer 2) onto second buffer 1814. In operation 2242 (FIG. 22), wafer-transfer unit 104 places the processed wafer (wafer 7) into load module 102.

With reference again to FIG. 22, operations 2280 through 2292 are associated with the beginning of another process cycle for process module 116. More particularly, with reference again to FIG. 18, in operation 2280 (FIG. 22), wafer-transfer unit 112 picks-up an unprocessed wafer (wafer 2) from second buffer 114. In operation 2282 (FIG. 22), wafer-transfer unit 112 places the unprocessed wafer (wafer 2) into process module 116. In operation 2284 (FIG. 22), the wafer (wafer 2) is processed in process module 116. In operation 2286 (FIG. 22), load-lock module 108 is vented such that the pressure within load-lock module 108 is equal to the pressure within tool 100. In operation 2288 (FIG. 22), wafer-transfer unit 104 picks-up an unprocessed wafer (wafer 8) from load module 102. In operation 2290 (FIG. 22), wafer-transfer unit 104 picks-up an oriented wafer (wafer 6) from wafer orienter 106. In operation 2292 (FIG. 22), wafer-transfer unit 104 places the unprocessed wafer (wafer 8) onto wafer orienter 106.

With reference again to FIG. 22, operations 2270 through 2274 are associated with the completion of a previous process cycle for process module 1816. More particularly, with reference again to FIG. 18, in operation 2270 (FIG. 22), a wafer (wafer 7) is processed in process module 1816. In operation 2272 (FIG. 22), wafer-transfer unit 1812 picks-up the processed wafer (wafer 7) from process module 1816. In operation 2274 (FIG. 22), wafer-transfer unit 1812 places the processed wafer (wafer 7) onto first buffer 1810.

As noted earlier and as depicted in FIG. 22, the process cycles for process module 116 include a wait period that is equal to the difference in the duration of the process cycle for process module 1816 and process cycle for process module 116. As depicted in FIG. 22, in the present example, the duration of the wait period is about 30 seconds.

With reference again to FIG. 18, now assume that the process cycle for process module 116 is preferred over the process cycle for process module 1816. For example, in some applications, it may be desirable to maintain the thermal histories of the wafers that were being processed in process module 116. In such applications, as described below, if the duration of the preferred process cycle is shorter than the other process cycle, then the preferred process cycle is repeated and a wait period is provided between the preferred process cycle and the other process cycle.

Figure 23:
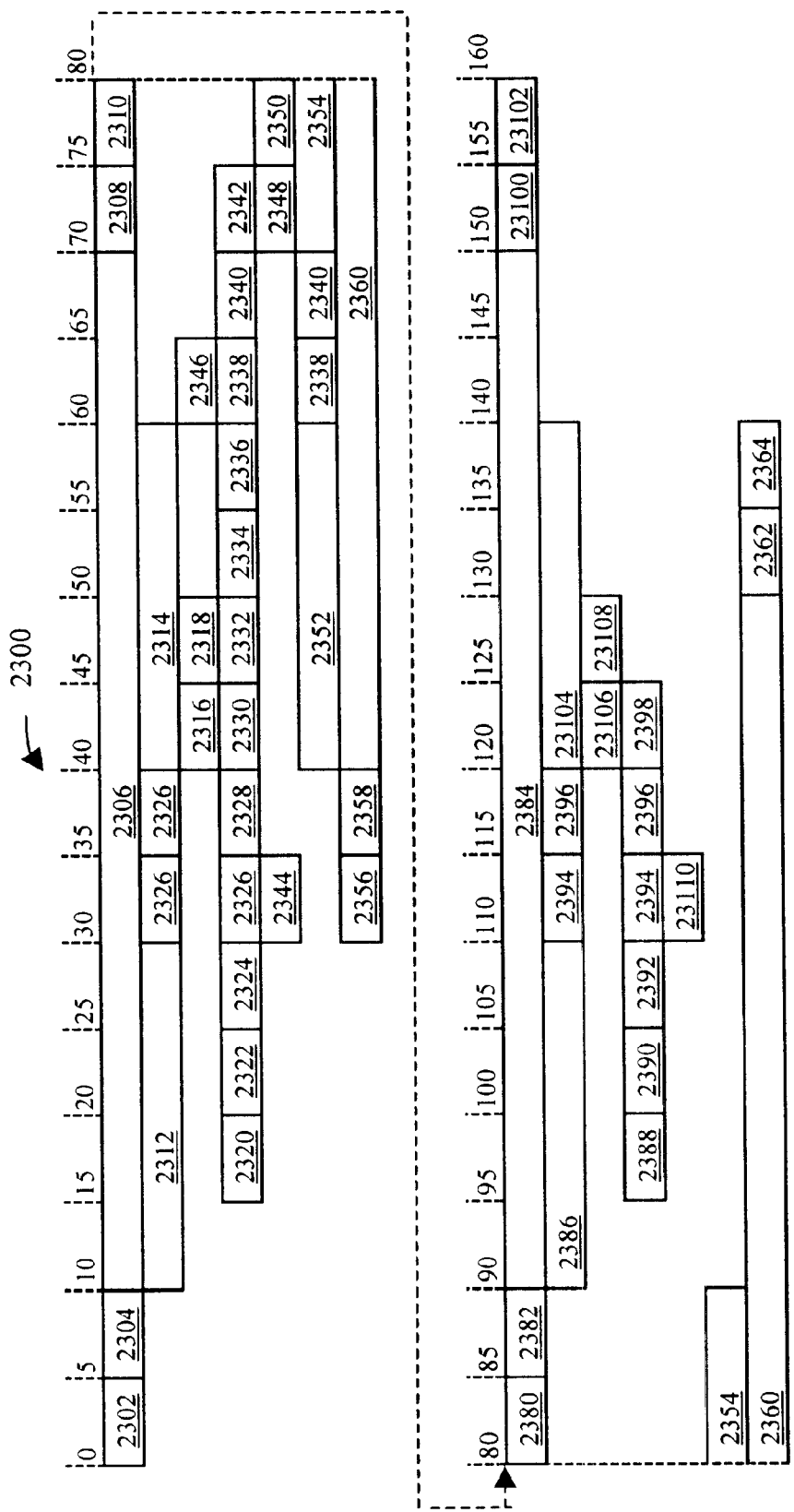

For example, with reference now to FIG. 23, in a schedule 2300, the processing cycle for process module 116 (FIG. 18) is assumed to be preferred, and the duration of the process cycles for process modules 116 (FIG. 18) and 1816 (FIG. 18) are about 80 seconds and about 110 seconds, respectively. As such, in schedule 2300 the process cycle in process module 116 (FIG. 18) is repeated and a wait period is provided between process cycles in process module 1816 (FIG. 18) equal to the difference between twice the duration of the process cycle in process module 116 (FIG. 18) and the process cycle in process module 1816 (FIG. 18), which in this example is about 30 seconds.

The various operations of schedule 2300 will now be described in greater detail below. It should be recognized that a number of wafers are located in tool 100 (FIG. 18) at any given time. As such, for the sake of clarity, the following description includes numbers in parenthesis to aid in identifying the wafers being processed in tool 100 (FIG. 18). As such, these numbers are provided to assist in distinguishing one wafer from another and not necessarily to suggest any particular order or priority.

In the present example, with reference to FIG. 18 and with regard to process module 116, in operation 2302 (FIG. 23), wafer-transfer unit 112 picks-up an unprocessed wafer (wafer 1) from second buffer 114. In operation 2304 (FIG. 23), wafer-transfer unit 112 places the unprocessed wafer (wafer 1) into process module 116. In operation 2306 (FIG. 23), the wafer (wafer 1) is processed in process module 116. In operation 2308 (FIG. 23), wafer-transfer unit 112 picks-up the processed wafer (wafer 1) from process module 116. In operation 2310 (FIG. 23), wafer-transfer unit 112 places the processed wafer (wafer 1) onto first buffer 110.

In operation 2312 (FIG. 23), load-lock module 108 is vented such that the pressure within load-lock module 108 is equal to the pressure within tool 100. In operation 2320 (FIG. 23), wafer-transfer unit 104 picks-up an unprocessed wafer (wafer 2) from load module 102. In operation 2322 (FIG. 23), wafer-transfer unit 104 picks-up an oriented wafer (wafer 3) from wafer orienter 106. In operation 2324 (FIG. 23), wafer-transfer unit 104 places the unprocessed wafer (wafer 2) onto wafer orienter 106. In operation 2344 (FIG. 23), the wafer (wafer 2) is oriented. In operation 2326 (FIG. 23), wafer-transfer unit 104 picks-up from first buffer 110 a wafer (wafer 4) that was processed in process module 116 in an earlier process cycle. In operation 2328 (FIG. 23), wafer-transfer unit 104 places the unprocessed wafer (wafer 3) onto first buffer 110. In operation 2314 (FIG. 23), load-lock module 108 is sealed and evacuated such that the pressure within load-lock module 108 is equal to the pressure within process module 116. In operation 2316 (FIG. 23), wafer-transfer unit 112 picks-up the unprocessed wafer (wafer 3) from first buffer 110. In operation 2318 (FIG. 23), wafer-transfer unit 112 places the unprocessed wafer (wafer 3) onto second buffer 114. In operation 2330 (FIG. 23), wafer-transfer unit 104 places the processed wafer (wafer 4) into load module 102.

With regard now to process module 1816, in operation 2356 (FIG. 23), wafer-transfer unit 1812 picks-up an unprocessed wafer (wafer 5) from second buffer 1814. In operation 2358 (FIG. 23), wafer-transfer unit 1812 places the unprocessed wafer (wafer 5) in process module 1816. In operation 2360 (FIG. 23), the wafer (wafer 5) is processed in process module 1816. In operation 2362 (FIG. 23), wafer-transfer unit 1812 picks-up the processed wafer (wafer 5) from process module 1816. In operation 2364 (FIG. 23), wafer-transfer unit 1812 places the processed wafer (wafer 5) onto first buffer 1810.

In operation 2352 (FIG. 23), load-lock modules 1808 is vented such that the pressure within load-lock module 1808 is equal to the pressure within tool 100. In operation 2332 (FIG. 23), wafer-transfer unit 104 picks-up an unprocessed wafer (wafer 6) from load module 102. In operation 2334 (FIG. 23), wafer-transfer unit 104 picks-up an oriented wafer (wafer 2) from wafer orienter 106. In operation 2336 (FIG. 23), wafer-transfer unit 104 places the unprocessed wafer (wafer 6) onto wafer orienter 106. In operation 2346 (FIG. 23), the wafer (wafer 6) is oriented. In operation 2338 (FIG. 23), wafer-transfer unit 104 picks-up from first buffer 1810 a wafer (wafer 7) that was processed in process module 1816 in an earlier process cycle. In operation 2340 (FIG. 23), wafer-transfer unit 104 places the unprocessed wafer (wafer 2) onto first buffer 1810. In operation 2354 (FIG. 23), load-lock module 1808 is sealed and evacuated such that the pressure within load-lock module 1808 is equal to the pressure within process module 1816. In operation 2348 (FIG. 23), wafer-transfer unit 1812 picks-up the unprocessed wafer (wafer 2) from first buffer 1810. In operation 2350 (FIG. 23), wafer-transfer unit 1812 places the unprocessed wafer (wafer 2) onto second buffer 1814. In operation 2342 (FIG. 23), wafer-transfer unit 104 places the processed wafer (wafer 7) into load module 102.

With reference again to FIG. 23, operations 2380 through 23110 are associated with another process cycle for process module 116 (FIG. 18). More particularly, with reference again to FIG. 18, in operation 2380 (FIG. 23), wafer-transfer unit 112 picks-up an unprocessed wafer (wafer 3) from second buffer 114. In operation 2382 (FIG. 23), wafer-transfer unit 112 places the unprocessed wafer (wafer 3) into process module 116. In operation 2384 (FIG. 23), the wafer (wafer 3) is processed in process module 116. In operation 23100, wafer-transfer unit 112 picks-up the processed wafer (wafer 3) from process module 116. In operation 23102, wafer-transfer unit 112 places the processed wafer (wafer 3) onto first buffer 110.

Additionally, in operation 2386, load-lock module 108 is vented such that the pressure within load-lock module 108 is equal to the pressure within tool 100. In operation 2388 (FIG. 23), wafer-transfer unit 104 picks-up an unprocessed wafer (wafer 8) from load module 102. In operation 2390 (FIG. 23), wafer-transfer unit 104 picks-up an oriented wafer (wafer 6) from wafer orienter 106. In operation 2392 (FIG. 23), wafer-transfer unit 104 places the unprocessed wafer (wafer 8) onto wafer orienter 106. In operation 23110 (FIG. 23), the wafer (wafer 8) is oriented. In operation 2394 (FIG. 23), wafer-transfer unit 104 picks-up from first buffer 110 a wafer (wafer 1) that was processed in process module 116 in an earlier process cycle. In operation 2396 (FIG. 23), wafer-transfer unit 104 places the unprocessed wafer (wafer 6) onto first buffer 110. In operation 23104 (FIG. 23), load-lock module 108 is sealed and evacuated such that the pressure within load-lock module 108 is equal to the pressure within process module 116. In operation 23106 (FIG. 23), wafer-transfer unit 112 picks-up the unprocessed wafer (wafer 6) from first buffer 110. In operation 23108 (FIG. 23), wafer-transfer unit 112 places the unprocessed wafer (wafer 6) onto second buffer 114. In operation 2398 (FIG. 23), wafer-transfer unit 104 places the processed wafer (wafer 1) into load module 102.

As noted earlier and as depicted in FIG. 23, the process cycles for process module 1816 (FIG. 18) include a wait period that is equal to the difference in twice the duration of the process cycle for process module 116 (FIG. 18) and the duration of the process cycle for process module 1816 (FIG. 18). As depicted in FIG. 23, in the present example, the duration of the wait period is about 50 seconds.

With reference again to FIG. 18, as noted earlier, process modules 116 and 1816 of tool 100 can be configured to operate in series. For example, a wafer can be processed first in process module 116 then processed in process module 1816. It should be recognized that the wafer can also be processed first in process module 1816 then processed in process module 116.

Figure 24:
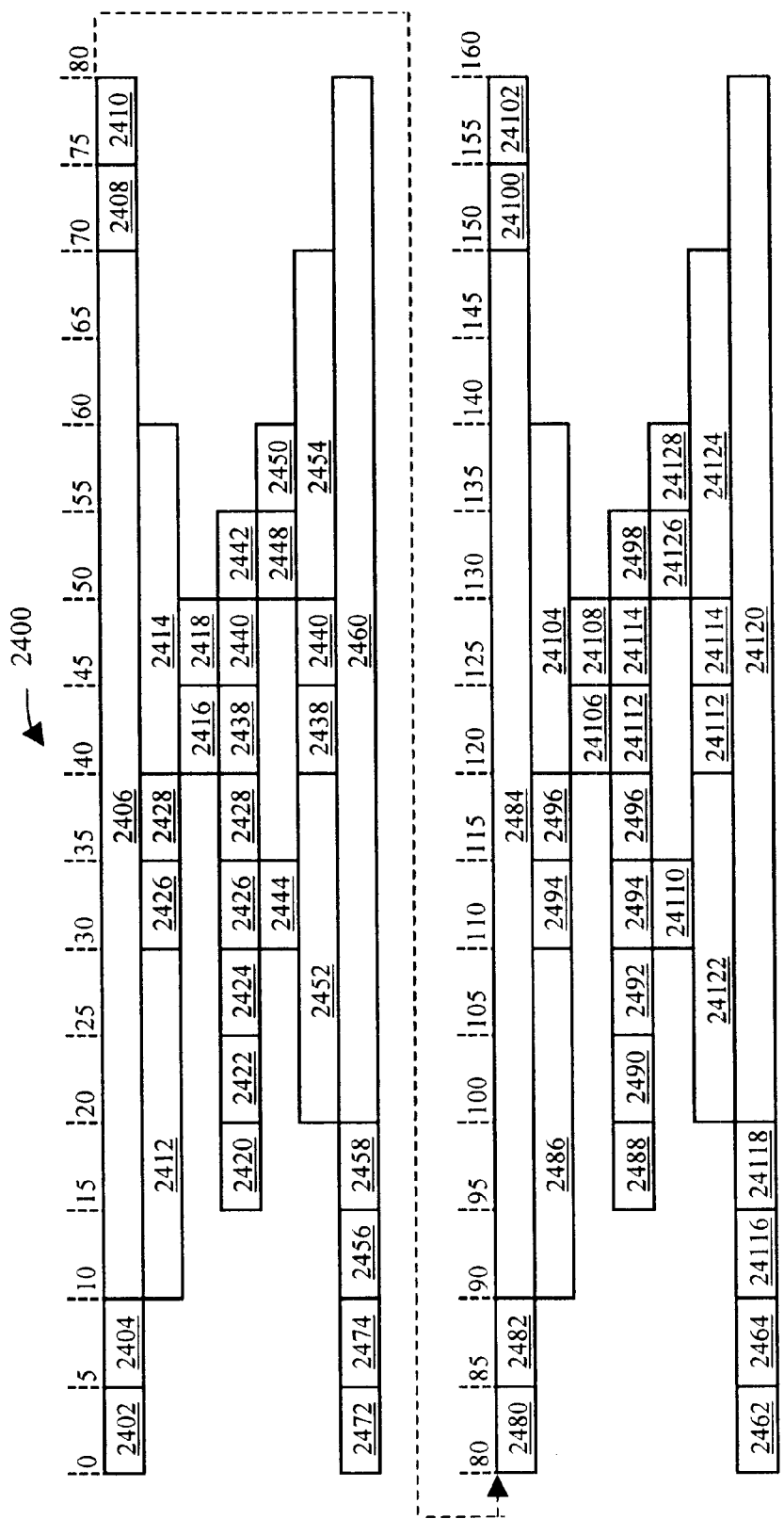

With reference now to FIG. 24, an exemplary schedule 2400 is depicted for scheduling the serial processing of wafers in process modules 116 (FIG. 18) and 1816 (FIG. 18). More particularly, in the present example, wafers are first processed in process module 116 (FIG. 18) then processed in process module 1816 (FIG. 18). It should be recognized that the particular operations, order of operations, and duration of operations depicted in FIG. 24 and described herein can vary depending on the particular configuration of tool 100 (FIG. 18) and the particular application. As such, schedule 2400 can also vary depending on the particular configuration of tool 100 (FIG. 18) and the particular application.

The various operations of schedule 2400 will be described in greater detail below. It should be recognized that a number of wafers are located in tool 100 (FIG. 18) at any given time. As such, for the sake of clarity, the following description includes numbers in parenthesis to aid in identifying the wafers being processed in tool 100 (FIG. 18). As such, these numbers are provided to assist in distinguishing one wafer from another and not necessarily to suggest any particular order or priority.

In the present example, with reference to FIG. 18 and with regard to process module 116, in operation 2402 (FIG. 24), wafer-transfer unit 112 picks-up an unprocessed wafer (wafer 1) from second buffer 114. In operation 2404 (FIG. 24), wafer-transfer unit 112 places the unprocessed wafer (wafer 1) into process module 116. In operation 2406 (FIG. 24), the wafer (wafer 1) is processed in process module 116. In operation 2408 (FIG. 24), wafer-transfer unit 112 picks-up the processed wafer (wafer 1) from process module 116. In operation 2410 (FIG. 24), wafer-transfer unit 112 places the processed wafer (wafer 1) onto first buffer 110.

In operation 2412 (FIG. 24), load-lock module 108 is vented such that the pressure within load-lock module 108 is equal to the pressure within tool 100. In operation 2420 (FIG. 24), wafer-transfer unit 104 picks-up an unprocessed wafer (wafer 2) from load module 102. In operation 2422 (FIG. 24), wafer-transfer unit 104 picks-up an oriented wafer (wafer 3) from wafer orienter 106. In operation 2424 (FIG. 24), wafer-transfer unit 104 places the unprocessed wafer (wafer 2) onto wafer orienter 106. In operation 2444 (FIG. 24), the wafer (wafer 2) is oriented. In operation 2426 (FIG. 24), wafer-transfer unit 104 picks-up from first buffer 110 a wafer (wafer 4) that was processed in process module 116 in an earlier process cycle. In operation 2428 (FIG. 24), wafer-transfer unit 104 places the unprocessed wafer (wafer 3) onto first buffer 110. In operation 2414 (FIG. 24), load-lock module 108 is sealed and evacuated such that the pressure within load-lock module 108 is equal to the pressure within process module 116. In operation 2416 (FIG. 24), wafer-transfer unit 112 picks-up the unprocessed wafer (wafer 3) from first buffer 110. In operation 2418 (FIG. 24), wafer-transfer unit 112 places the unprocessed wafer (wafer 3) onto second buffer 114.

With regard now to process module 1816, in operation 2456 (FIG. 24), wafer-transfer unit 1812 picks-up a wafer that was previously processed in process module 116 but not yet processed in process module 1816 (wafer 5) from second buffer 1814. In operation 2458 (FIG. 24), wafer-transfer unit 1812 places this wafer (wafer 5) in process module 1816. In operation 2460 (FIG. 24), the wafer (wafer 5) is processed in process module 1816. In operation 2462 (FIG. 24), wafer-transfer unit 1812 picks-up the processed wafer (wafer 5) from process module 1816. In operation 2464 (FIG. 24), wafer-transfer unit 1812 places the processed wafer (wafer 5) onto first buffer 1810.

In operation 2452 (FIG. 24), load-lock modules 1808 is vented such that the pressure within load-lock module 1808 is equal to the pressure within tool 100. In operation 2438 (FIG. 24), wafer-transfer unit 104 picks-up from first buffer 1810 a wafer (wafer 6) that was processed in process module 1816 in an earlier process cycle. In operation 2440 (FIG. 24), wafer-transfer unit 104 places the wafer that was earlier processed in process module 116 (wafer 4) onto first buffer 1810. In operation 2454 (FIG. 24), load-lock module 1808 is sealed and evacuated such that the pressure within load-lock module 1808 is equal to the pressure within process module 1816. B In operation 2448 (FIG. 24), wafer-transfer unit 1812 picks-up the unprocessed wafer (wafer 4) from first buffer 1810. In operation 2450 (FIG. 24), wafer-transfer unit 1812 places the unprocessed wafer (wafer 4) onto second buffer 1814. In operation 2442 (FIG. 24), wafer-transfer unit 104 places the processed wafer (wafer 6) into load module 102.

With reference again to FIG. 24, operations 2480 through 24110 are associated with another process cycle for process module 116 (FIG. 18). More particularly, with reference again to FIG. 18, in operation 2480 (FIG. 24), wafer-transfer unit 112 picks-up an unprocessed wafer (wafer 3) from second buffer 114. In operation 2482 (FIG. 24), wafer-transfer unit 112 places the unprocessed wafer (wafer 3) into process module 116. In operation 2484 (FIG. 24), the wafer (wafer 3) is processed in process module 116. In operation 24100, wafer-transfer unit 112 picks-up the processed wafer (wafer 3) from process module 116. In operation 24102, wafer-transfer unit 112 places the processed wafer (wafer 3) onto first buffer 110.

Additionally, in operation 2486, load-lock module 108 is vented such that the pressure within load-lock module 108 is equal to the pressure within tool 100. In operation 2488 (FIG. 24), wafer-transfer unit 104 picks-up an unprocessed wafer (wafer 7) from load module 102. In operation 2490 (FIG. 24), wafer-transfer unit 104 picks-up an oriented wafer (wafer 2) from: wafer orienter 106. In operation 2492 (FIG. 24), wafer-transfer unit 104 places the unprocessed wafer (wafer 7) onto wafer orienter 106. In operation 24110 (FIG. 24), the wafer (wafer 7) is oriented. In operation 2494 (FIG. 24), wafer-transfer unit 104 picks-up from first buffer 110 a wafer (wafer 1) that was processed in process module 116 in an earlier process cycle. In operation 2496 (FIG. 24), wafer-transfer unit 104 places the unprocessed wafer (wafer 2) onto first buffer 110. In operation 24104 (FIG. 24), load-lock module 108 is sealed and evacuated such that the pressure within load-lock module 108 is equal to the pressure within process module 116. In operation 24106 (FIG. 24), wafer-transfer unit 112 picks-up the unprocessed wafer (wafer 2) from first buffer 110. In operation 24108 (FIG. 24), wafer-transfer unit 112 places the unprocessed wafer (wafer 2) onto second buffer 114.

With reference again to FIG. 24, operations 24116 through 24128 are associated with another process cycle for process module 1816 (FIG. 18). More particularly, with reference again to FIG. 18, in operation 24116 (FIG. 24), wafer-transfer unit 1812 picks-up a wafer that was previously processed in process module 116 but not yet processed in process module 1816 (wafer 4) from second buffer 1814. In operation 24118 (FIG. 24), wafer-transfer unit 1812 places this wafer (wafer 4) in process module 1816. In operation 24120 (FIG. 24), the wafer (wafer 4) is processed in process module 1816.

In operation 24122 (FIG. 24), load-lock modules 1808 is vented such that the pressure within load-lock module 1808 is equal to the pressure within tool 100. In operation 24112 (FIG. 24), wafer-transfer unit 104 picks-up from first buffer 1810 a wafer (wafer 5) that was processed in process module 1816 in an earlier process cycle. In operation 24114 (FIG. 24), wafer-transfer unit 104 places the wafer that was earlier processed in process module 116 (wafer 1) onto first buffer 1810. In operation 24124 (FIG. 24), load-lock module 1808 is sealed and evacuated such that the pressure within load-lock module 1808 is equal to the pressure within process module 1816. In operation 24126 (FIG. 24), wafer-transfer unit 1812 picks-up the unprocessed wafer (wafer 1) from first buffer 1810. In operation 24128 (FIG. 24), wafer-transfer unit 1812 places the unprocessed wafer (wafer 1) onto second buffer 1814. In operation 2498 (FIG. 24), wafer-transfer unit 104 places the processed wafer (wafer 5) into load module 102.

With reference again to FIG. 24, operations 2472 and 2474 are associated with the completion of previous process cycle for process module 1816 (FIG. 18). More particularly, with reference again to FIG. 18, in operation 2472 (FIG. 24), wafer-transfer unit 1812 picks-up the processed wafer (wafer 6) from process module 1816. In operation 2474 (FIG. 24), wafer-transfer unit 1812 places the processed wafer (wafer 6) onto first buffer 1810.

In the following description and related drawings figures, alternative embodiments of the present invention will be described and shown in connection with tool 100 (FIGS. 25 and 27) having 3 and 4 process modules. However, it should be recognized that tool 100 (FIGS. 25 and 27) can include any number of process modules.

Figure 25:
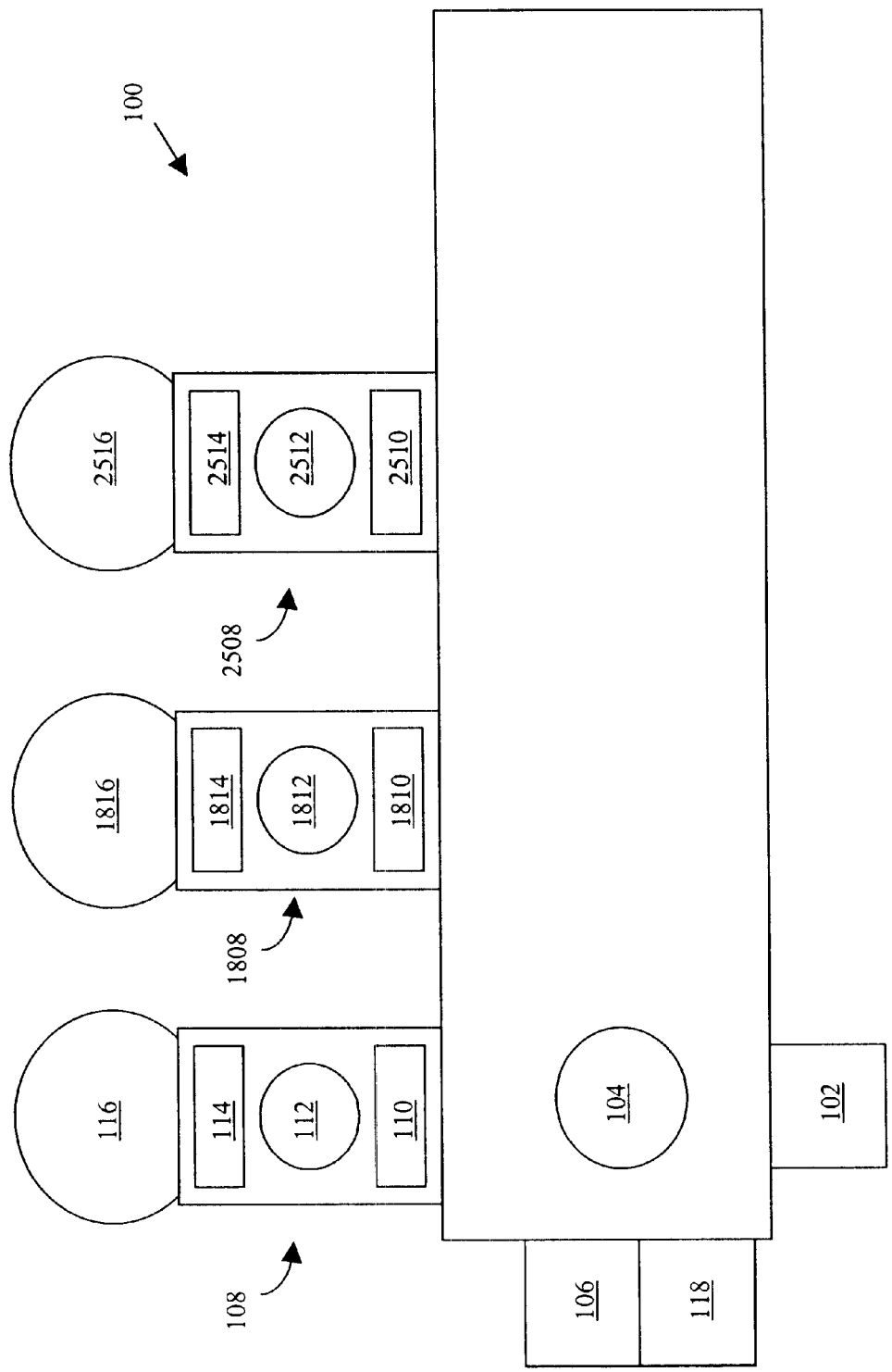
FIG. 25 is a top view of another alternative embodiment of a wafer-processing tool.
Figure 26:
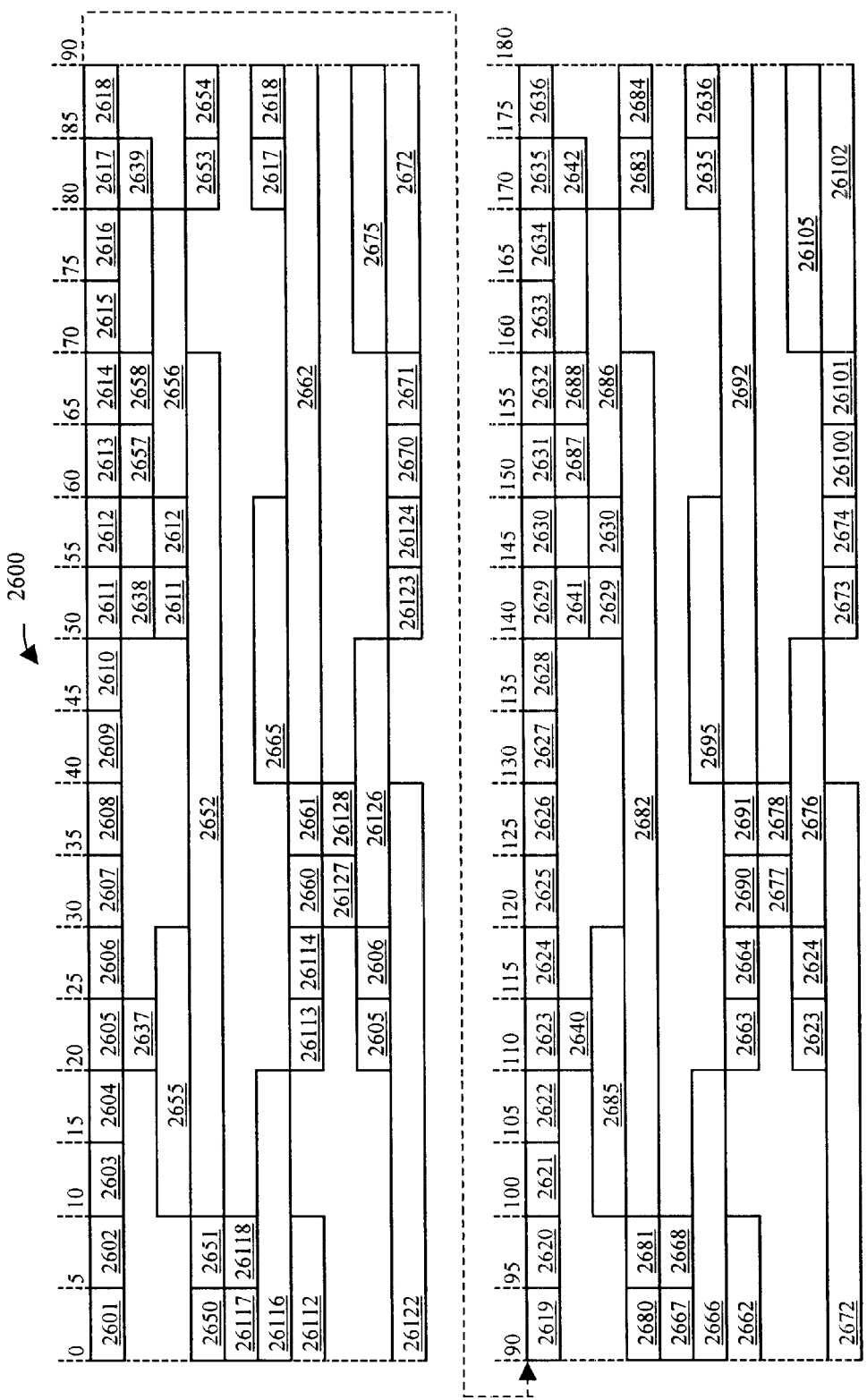
FIG. 26 is a block diagram of another exemplary schedule.

With reference now to FIG. 25, tool 100 is depicted having load-lock modules 108, 1808, and 2508, and process modules 116, 1816, and 2516. With reference now to FIG. 26, an exemplary schedule 2600 is depicted for scheduling the processing of wafers in tool 100 depicted in FIG. 25. However, it should be recognized that the particular operations, order of operations, and duration of operations depicted in FIG. 26 and described herein can vary depending on the particular configuration of tool 100 (FIG. 25) and the particular application. As such, schedule 2600 can also vary depending on the particular configuration of tool 100 (FIG. 25) can the particular application.

The various operations of schedule 2600 will be described in greater detail below. It should be recognized that a number of wafers are located in tool 100 (FIG. 25) at any given time. As such, for the sake of clarity, the following description includes numbers in parenthesis to aid in identifying the wafers being processed in tool 100 (FIG. 25). As such, these numbers are provided to assist in distinguishing one wafer from another and not necessarily to suggest any particular order or priority.

In the present example, with reference to FIG. 25 and with regard to process module 116, in operation 2650 (FIG. 26), wafer-transfer unit 112 picks-up an unprocessed wafer (wafer 1) from second buffer 114. In operation 2651 (FIG. 26), wafer-transfer unit 112 places the unprocessed wafer (wafer 1) into process module 116. In operation 2652 (FIG. 26), the wafer (wafer 1) is processed in process module 116. In operation 2653 (FIG. 26), wafer-transfer unit 112 picks-up the processed wafer (wafer 1) from process module 116. In operation 2654 (FIG. 26), wafer-transfer unit 112 places the processed wafer (wafer 1) onto first buffer 110.

In operation 2655 (FIG. 26), load-lock module 108 is vented such that the pressure within load-lock module 108 is equal to the pressure within tool 100. In operation 2608 (FIG. 26), wafer-transfer unit 104 picks-up an unprocessed wafer (wafer 2) from load module 102. In operation 2609 (FIG. 26), wafer-transfer unit 104 picks-up an oriented wafer (wafer 3) from wafer orienter 106. In operation 2610 (FIG. 26), wafer-transfer unit 104 places the unprocessed wafer (wafer 2) onto wafer orienter 106. In operation 2638 (FIG. 26), wafer orienter 106 orients the wafer (wafer 2). In operation 2611 (FIG. 26), wafer-transfer unit 104 picks-up from first buffer 110 a wafer (wafer 4) that was processed in process module 116 in an earlier process cycle. In operation 2612 (FIG. 26), wafer-transfer unit 104 places the unprocessed wafer (wafer 3) onto first buffer 110. In operation 2656 (FIG. 26), load-lock module 108 is sealed and evacuated such that the pressure within load-lock module 108 is equal to the pressure within process module 116. In operation 2657 (FIG. 26), wafer-transfer unit 112 picks-up the unprocessed wafer (wafer 3) from first buffer 110. In operation 2658 (FIG. 26), wafer-transfer unit 112 places the unprocessed wafer (wafer 3) onto second buffer 114. In operation 2613 (FIG. 26), wafer-transfer unit 104 places the processed wafer (wafer 4) into load module 102.

With regard now to process module 1816, in operation 2660 (FIG. 26), wafer-transfer unit 1812 picks-up an unprocessed wafer (wafer 5) from second buffer 1814. In operation 2661 (FIG. 26), wafer-transfer unit 112 places the unprocessed wafer (wafer 5) in process module 1816. In operation 2662 (FIG. 26), the wafer (wafer 5) is processed in process module 1816. In operation 2663 (FIG. 26), wafer-transfer unit 1812 picks-up the processed wafer (wafer 5) from process module 1816. In operation 2664 (FIG. 26), wafer-transfer unit 1812 places the processed wafer (wafer 5) onto first buffer 1810.

In operation 2665 (FIG. 26), load-lock module 1808 is vented such that the pressure within load-lock module 1808 is equal to the pressure within tool 100. In operation 2614 (FIG. 26), wafer-transfer unit 104 picks-up an unprocessed wafer (wafer 6) from load module 102. In operation 2615 (FIG. 26), wafer-transfer unit 104 picks-up an oriented wafer (wafer 2) from wafer orienter 106. In operation 2616 (FIG. 26), wafer-transfer unit 104 places the unprocessed wafer (wafer 6) onto wafer orienter 106. In operation 2639 (FIG. 26), wafer orienter 106 orients the wafer (wafer 6). In operation 2617 (FIG. 26), wafer-transfer unit 104 picks-up from first buffer 1810 a wafer (wafer 7) that was processed in process module 1816 in an earlier process cycle. In operation 2618 (FIG. 26), wafer-transfer unit 104 places the unprocessed wafer (wafer 2) onto first buffer 1810. In operation 2666 (FIG. 26), load-lock module 1808 is sealed and evacuated such that the pressure within load-lock module 1808 is equal to the pressure within process module 1816. In operation 2667 (FIG. 26), wafer-transfer unit 1812 picks-up the unprocessed wafer (wafer 2) from first buffer 1810. In operation 2668 (FIG. 26), wafer-transfer unit 1812 places the unprocessed wafer (wafer 2) onto second buffer 1814. In operation 2619 (FIG. 26), wafer-transfer unit 104 places the processed wafer (wafer 7) into load module 102.

With regard now to process module 2516, in operation 2670 (FIG. 26), wafer-transfer unit 2512 picks-up an unprocessed wafer (wafer 8) from second buffer 2514. In operation 2671 (FIG. 26), wafer-transfer unit 2512 places the unprocessed wafer (wafer 8) in process module 2516. In operation 2672 (FIG. 26), the wafer (wafer 8) is processed in process module 2516. In operation 2673 (FIG. 26), wafer-transfer unit 2512 picks-up the processed wafer (wafer 8) from process module 2516. In operation 2674 (FIG. 26), wafer-transfer unit 2512 places the processed wafer (wafer 8) onto first buffer 2510.

In operation 2675 (FIG. 26), load-lock module 2508 is vented such that the pressure within load-lock module 2508 is equal to the pressure within tool 100. In operation 2620 (FIG. 26), wafer-transfer unit 104 picks-up an unprocessed wafer (wafer 9) from load module 102. In operation 2621 (FIG. 26), wafer-transfer unit 104 picks-up an oriented wafer (wafer 6) from wafer orienter 106. In operation 2622 (FIG. 26), wafer-transfer unit 104 places the unprocessed wafer (wafer 9) onto wafer orienter 106. In operation 2640 (FIG. 26), wafer orienter 106 orients the wafer (wafer 9). In operation 2623 (FIG. 26), wafer-transfer unit 104 picks-up from first buffer 2510 a wafer (wafer 10) that was processed in process module 2516 in an earlier process cycle. In operation 2624 (FIG. 26), wafer-transfer unit 104 places the unprocessed wafer (wafer 6) onto first buffer 2510. In operation 2676 (FIG. 26), load-lock module 2508 is sealed and evacuated such that the pressure within load-lock module 2508 is equal to the pressure within process module 2516. In operation 2677 (FIG. 26), wafer-transfer unit 2512 picks-up the unprocessed wafer (wafer 6) from first buffer 2510. In operation 2678 (FIG. 26), wafer-transfer unit 2512 places the unprocessed wafer (wafer 6) onto second buffer 2514. In operation 2625 (FIG. 26), wafer-transfer unit 104 places the processed wafer (wafer 10) into load module 102.

With reference again to FIG. 26, operations 2680 through 2688 are associated with another process cycle for process module 116. More particularly, with reference again to FIG. 25, in operation 2680 (FIG. 26), wafer-transfer unit 112 picks-up an unprocessed wafer (wafer 3) from second buffer 114. In operation 2681 (FIG. 26), wafer-transfer unit 112 places the unprocessed wafer (wafer 3) into process module 116. In operation 2682 (FIG. 26), the wafer (wafer 3) is processed in process module 116. In operation 2683 (FIG. 26), wafer-transfer unit 112 picks-up the processed wafer (wafer 3) from process module 116. In operation 2684 (FIG. 26), wafer-transfer unit 112 places the processed wafer (wafer 3) onto first buffer 110.

In operation 2685 (FIG. 26), load-lock module 108 is vented such that the pressure within load-lock module 108 is equal to the pressure within tool 100. In operation 2626 (FIG. 26), wafer-transfer unit 104 picks-up an unprocessed wafer (wafer 11) from load module 102. In operation 2627 (FIG. 26), wafer-transfer unit 104 picks-up an oriented wafer (wafer 9) from wafer orienter 106. In operation 2628 (FIG. 26), wafer-transfer unit 104 places the unprocessed wafer (wafer 11) onto wafer orienter 106. In operation 2641 (FIG. 26), wafer orienter 106 orients the wafer (wafer 11). In operation 2629 (FIG. 26), wafer-transfer unit 104 picks-up from first buffer 110 a wafer (wafer 1) that was processed in process module 116 in an earlier process cycle. In operation 2630 (FIG. 26), wafer-transfer unit 104 places the unprocessed wafer (wafer 9) onto first buffer 110. In operation 2686 (FIG. 26), load-lock module 108 is sealed and evacuated such that the pressure within load-lock module 108 is equal to the pressure within process module 116. In operation 2687 (FIG. 26), wafer-transfer unit 112 picks-up the unprocessed wafer (wafer 9) from first buffer 110. In operation 2688 (FIG. 26), wafer-transfer unit 112 places the unprocessed wafer (wafer 9) onto second buffer 114. In operation 2631 (FIG. 26), wafer-transfer unit 104 places the processed wafer (wafer 1) into load module 102.

With reference again to FIG. 26, operations 2690 through 2695 are associated with the beginning of another process cycle for process module 1816. More particularly, with reference again to FIG. 25, in operation 2690 (FIG. 26), wafer-transfer unit 1812 picks-up an unprocessed wafer (wafer 2) from second buffer 1814. In operation 2691 (FIG. 26), wafer-transfer unit 1812 places the unprocessed wafer (wafer 2) in process module 1816. In operation 2692 (FIG. 26), the wafer (wafer 2) is processed in process module 1816.

In operation 2695 (FIG. 26), load-lock module 1808 is vented such that the pressure within load-lock module 1808 is equal to the pressure within tool 100. In operation 2632 (FIG. 26), wafer-transfer unit 104 picks-up an unprocessed wafer (wafer 12) from load module 102. In operation 2633 (FIG. 26), wafer-transfer unit 104 picks-up an oriented wafer (wafer 11) from wafer orienter 106. In operation 2634 (FIG. 26), wafer-transfer unit 104 places the unprocessed wafer (wafer 12) onto wafer orienter 106. In operation 2642 (FIG. 26), wafer orienter 106 orients the wafer (wafer 12). In operation 2635 (FIG. 26), wafer-transfer unit 104 picks-up from first buffer 1810 a wafer (wafer 5) that was processed in process module 1816 in an earlier process cycle. In operation 2636 (FIG. 26), wafer-transfer unit 104 places the unprocessed wafer (wafer 11) onto first buffer 1810.

With reference again to FIG. 26, operations 26100 through 26105 are associated with the beginning of another process cycle for process module 2516. More particularly, with reference again to FIG. 25, in operation 26100 (FIG. 26), wafer-transfer unit 2512 picks-up an unprocessed wafer (wafer 6) from second buffer 2514. In operation 26101 (FIG. 26), wafer-transfer unit 2512 places the unprocessed wafer (wafer 6) in process module 2516. In operation 26102 (FIG. 26), the wafer (wafer 6) is processed in process module 2516. In operation 26105 (FIG. 26), load-lock module 2508 is vented such that the pressure within load-lock module 2508 is equal to the pressure within tool 100.

With reference again to FIG. 26, operations 26112 through 26118 are associated with the ending of a previous process cycle for process module 1816. More particularly, with reference again to FIG. 18, in operation 26112, the wafer (wafer 7) is processed in process module 1816. In operation 26113 (FIG. 26), wafer-transfer unit 1812 picks-up the processed wafer (wafer 7) from process module 1816. In operation 26114 (FIG. 26), wafer-transfer unit 1812 places the processed wafer (wafer 7) onto first buffer 1810. In operation 26116 (FIG. 26), load-lock module 1808 is sealed and evacuated such that the pressure within process module 1816. In operation 26117 (FIG. 26), wafer-transfer unit 1812 picks-up an unprocessed wafer (wafer 5) from first buffer 1810. In operation 26118 (FIG. 26), wafer-transfer unit 1812 places the unprocessed wafer (wafer 5) onto second buffer 1814. In operation 2601 (FIG. 26), wafer-transfer unit 104 places a wafer (wafer 13) that was previously processed in process module 1816 in an earlier process cycle into load module 102.

With reference again to FIG. 26, operations 26122 through 26128 are associated with the ending of a previous process cycle for process module 2516. More particularly, with reference again to FIG. 25, in operation 26122 (FIG. 26), the wafer (wafer 10) is processed in process module 2516. In operation 26123 (FIG. 26), wafer-transfer unit 2512 picks-up the processed wafer (wafer 10) from process module 2516. In operation 26124 (FIG. 26), wafer-transfer unit 2512 places the processed wafer (wafer 10) onto first buffer 2510.

In operation 2602 (FIG. 26), wafer-transfer unit 104 picks-up an unprocessed wafer (wafer 3) from load module 102. In operation 2603 (FIG. 26), wafer-transfer unit 104 picks-up an oriented wafer (wafer 8) from wafer orienter 106. In operation 2604 (FIG. 26), wafer-transfer unit 104 places the unprocessed wafer (wafer 3) onto wafer orienter 106. In operation 2637 (FIG. 26), wafer orienter 106 orients the wafer (wafer 3). In operation 2605 (FIG. 26), wafer-transfer unit 104 picks-up from first buffer 2510 a wafer (wafer 14) that was processed in process module 2516 in an earlier process cycle. In operation 2606 (FIG. 26), wafer-transfer unit 104 places the unprocessed wafer (wafer 8) onto first buffer 2510. In operation 26126 (FIG. 26), load-lock module 2508 is sealed and evacuated such that the pressure within load-lock module 2508 is equal to the pressure within process module 2516. In operation 26127 (FIG. 26), wafer-transfer unit 2512 picks-up the unprocessed wafer (wafer 8) from first buffer 2510. In operation 26128 (FIG. 26), wafer-transfer unit 2512 places the processed wafer (wafer 8) onto second buffer 2512. In operation 2607 (FIG. 26), wafer-transfer unit 104 places the processed wafer (wafer 14) into load module 102.

Figure 27:
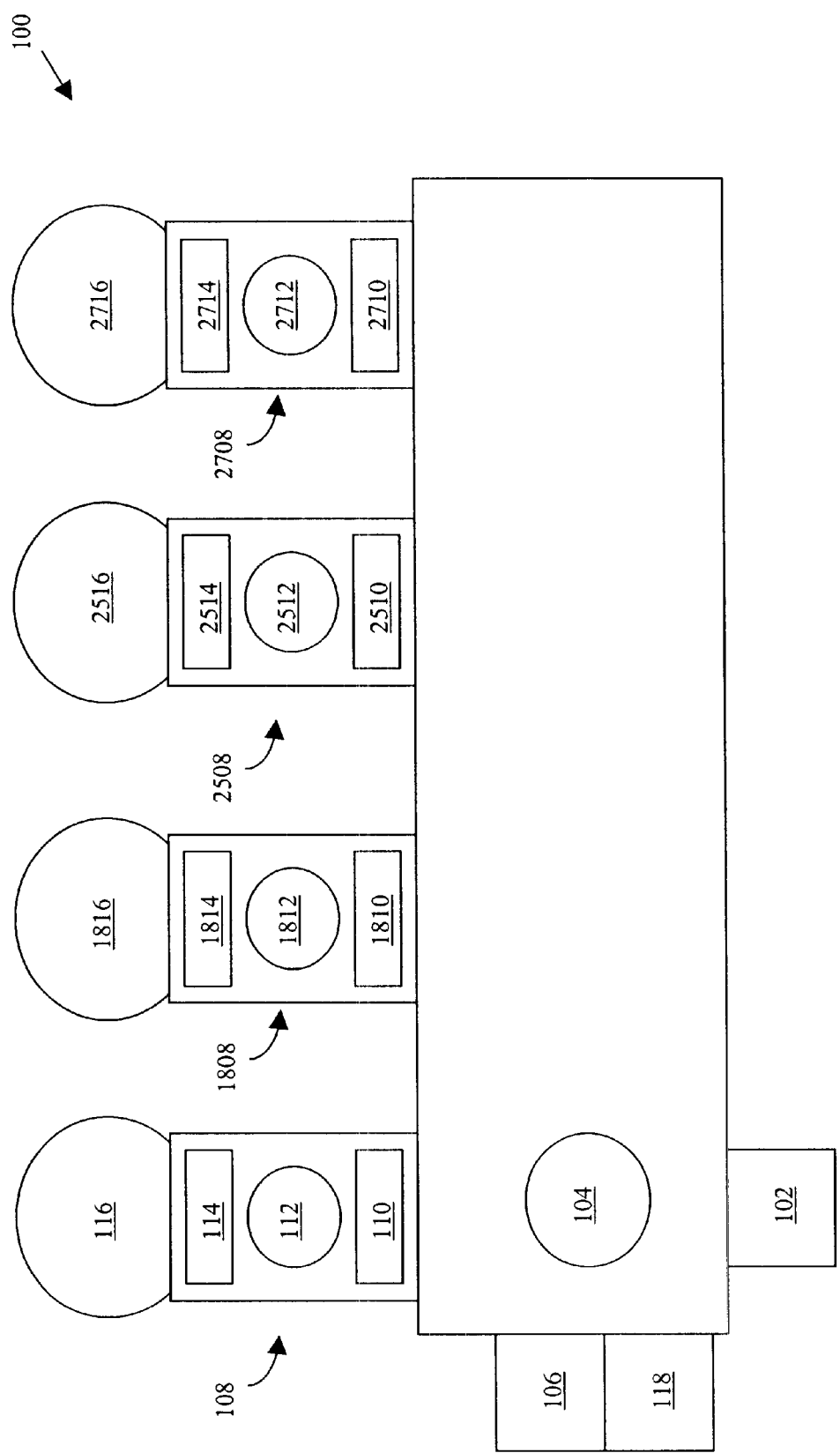
FIG. 27 is a top view of still another alternative embodiment of the wafer-processing tool.
Figure 28:
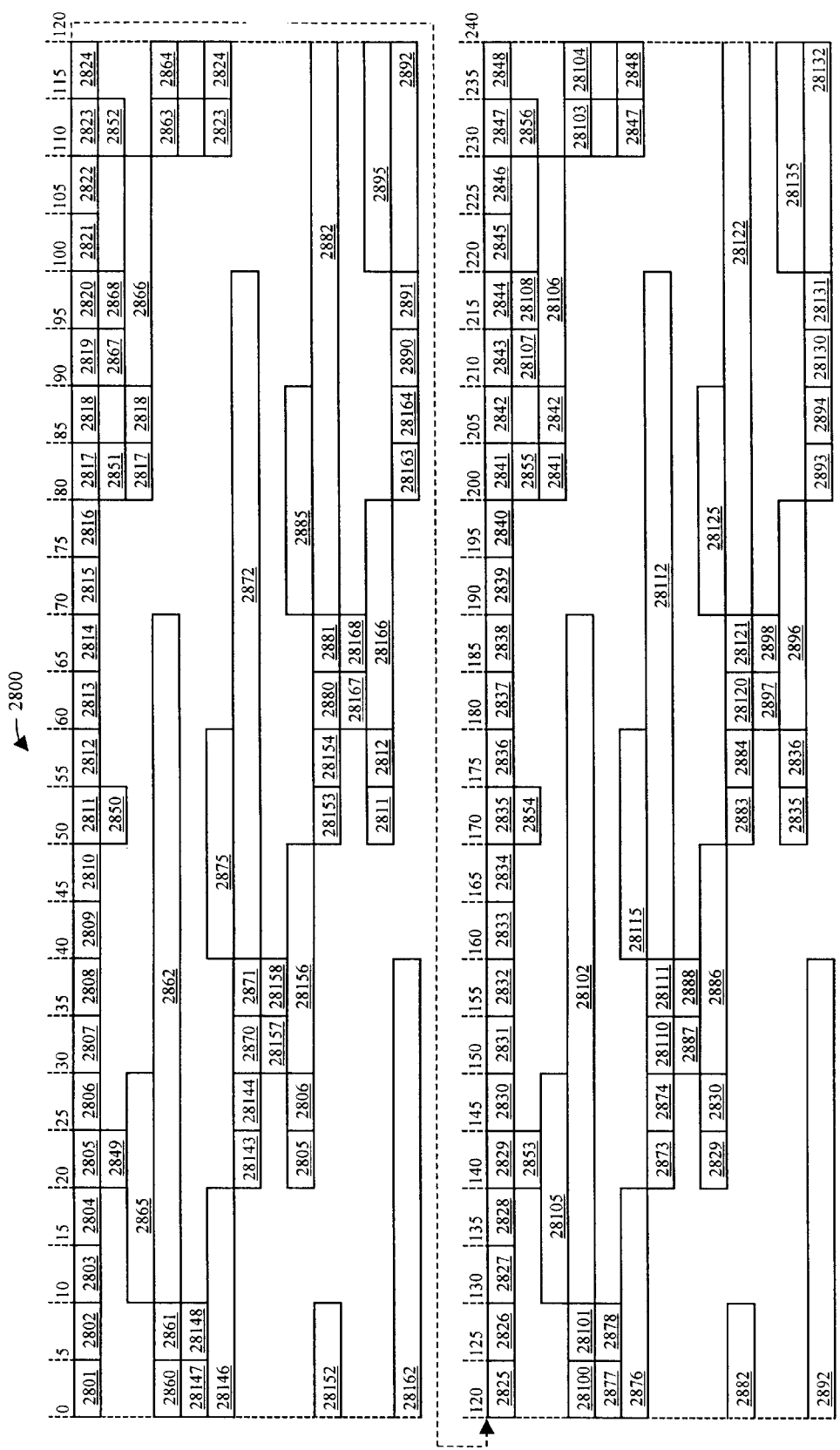
FIG. 28 is a block diagram of still another exemplary schedule.

With reference now to FIG. 27, tool 100 is depicted having load-lock modules 108, 1808, 2508, and 2708, and process modules 116, 1816, 2516, and 2716. With reference now to FIG. 28, an exemplary schedule 2800 is depicted for scheduling the processing of wafers in tool 100 depicted in FIG. 27. However, it should be recognized that the particular operations, order of operations, and duration of operations depicted in FIG. 28 and described herein can vary depending on the particular configuration of tool 100 (FIG. 27) and the particular application. As such, schedule 2800 can also vary depending on the particular configuration of tool 100 (FIG. 27) can the particular application.

The various operations of schedule 2800 will be described in greater detail below. It should be recognized that a number of wafers are located in tool 100 (FIG. 27) at any given time. As such, for the sake of clarity, the following description includes numbers in parenthesis to aid in identifying the wafers being processed in tool 100 (FIG. 27). As such, these numbers are provided to assist in distinguishing one wafer from another and not necessarily to suggest any particular order or priority.

In the present example, with reference to FIG. 27 and with regard to process module 116, in operation 2860 (FIG. 28), wafer-transfer unit 112 picks-up an unprocessed wafer (wafer 1) from second buffer 114. In operation 2861 (FIG. 28), wafer-transfer unit 112 places the unprocessed wafer (wafer 1) into process module 116. In operation 2862 (FIG. 28), the wafer (wafer 1) is processed in process module 116. In operation 2863 (FIG. 28), wafer-transfer unit 112 picks-up the processed wafer (wafer 1) from process module 116. In operation 2864 (FIG. 28), wafer-transfer unit 112 places the processed wafer (wafer 1) onto first buffer 110.

In operation 2865 (FIG. 28), load-lock module 108 is vented such that the pressure within load-lock module 108 is equal to the pressure within tool 100. In operation 2814 (FIG. 28), wafer-transfer unit 104 picks-up an unprocessed wafer (wafer 2) from load module 102. In operation 2815 (FIG. 28), wafer-transfer unit 104 picks-up an oriented wafer (wafer 3) from wafer orienter 106. In operation 2816 (FIG. 28), wafer-transfer unit 104 places the unprocessed wafer (wafer 2) onto wafer orienter 106. In operation 2851 (FIG. 28), wafer orienter 106 orients the wafer (wafer 2). In operation 2817 (FIG. 28), wafer-transfer unit 104 picks-up from first buffer 110 a wafer (wafer 4) that was processed in process module 116 in an earlier process cycle. In operation 2818 (FIG. 28), wafer-transfer unit 104 places the unprocessed wafer (wafer 3) onto first buffer 110. In operation 2866 (FIG. 28), load-lock module 108 is sealed and evacuated such that the pressure within load-lock module 108 is equal to the pressure within process module 116. In operation 2867 (FIG. 28), wafer-transfer unit 112 picks-up the unprocessed wafer (wafer 3) from first buffer 110. In operation 2868 (FIG. 28), wafer-transfer unit 112 places the unprocessed wafer (wafer 3) onto second buffer 114. In operation 2819 (FIG. 28), wafer-transfer unit 104 places the processed wafer (wafer 4) into load module 102.

With regard now to process module 1816, in operation 2870 (FIG. 28), wafer-transfer unit 1812 picks-up an unprocessed wafer (wafer 5) from second buffer 1814. In operation 2871 (FIG. 28), wafer-transfer unit 112 places the unprocessed wafer (wafer 5) in process module 1816. In operation 2872 (FIG. 28), the wafer (wafer 5) is processed in process module 1816. In operation 2873 (FIG. 28), wafer-transfer unit 1812 picks-up the processed wafer (wafer 5) from process module 1816. In operation 2874 (FIG. 28), wafer-transfer unit 1812 places the processed wafer (wafer 5) onto first buffer 1810.

In operation 2875 (FIG. 28), load-lock module 1808 is vented such that the pressure within load-lock module 1808 is equal to the pressure within tool 100. In operation 2820 (FIG. 28), wafer-transfer unit 104 picks-up an unprocessed wafer (wafer 6) from load module 102. In operation 2821 (FIG. 28), wafer-transfer unit 104 picks-up an oriented wafer (wafer 2) from wafer orienter 106. In operation 2822 (FIG. 28), wafer-transfer unit 104 places the unprocessed wafer (wafer 6) onto wafer orienter 106. In operation 2852 (FIG. 28), wafer orienter 106 orients the wafer (wafer 6). In operation 2823 (FIG. 28), wafer-transfer unit 104 picks-up from first buffer 1810 a wafer (wafer 7) that was processed in process module 1816 in an earlier process cycle. In operation 2824 (FIG. 28), wafer-transfer unit 104 places the unprocessed wafer (wafer 2) onto first buffer 1810. In operation 2876 (FIG. 28), load-lock module 1808 is sealed and evacuated such that the pressure within load-lock module 1808 is equal to the pressure within process module 1816. In operation 2877 (FIG. 28), wafer-transfer unit 1812 picks-up the unprocessed wafer (wafer 2) from first buffer 1810. In operation 2878 (FIG. 28), wafer-transfer unit 1812 places the unprocessed wafer (wafer 2) onto second buffer 1814. In operation 2825 (FIG. 28), wafer-transfer unit 104 places the processed wafer (wafer 7) into load module 102.

With regard now to process module 2516, in operation 2880 (FIG. 28), wafer-transfer unit 2512 picks-up an unprocessed wafer (wafer 8) from second buffer 2514. In operation 2881 (FIG. 28), wafer-transfer unit 2512 places the unprocessed wafer (wafer 8) in process module 2516. In operation 2882 (FIG. 28), the wafer (wafer 8) is processed in process module 2516. In operation 2883 (FIG. 28), wafer-transfer unit 2512 picks-up the processed wafer (wafer 8) from process module 2516. In operation 2884 (FIG. 28), wafer-transfer unit 2512 places the processed wafer (wafer 8) onto first buffer 2510.

In operation 2885 (FIG. 28), load-lock module 2508 is vented such that the pressure within load-lock module 2508 is equal to the pressure within tool 100. In operation 2826 (FIG. 28), wafer-transfer unit 104 picks-up an unprocessed wafer (wafer 9) from load module 102. In operation 2827 (FIG. 28), wafer-transfer unit 104 picks-up an oriented wafer (wafer 6) from wafer orienter 106. In operation 2828 (FIG. 28), wafer-transfer unit 104 places the unprocessed wafer (wafer 9) onto wafer orienter 106. In operation 2853 (FIG. 28), wafer orienter 106 orients the wafer (wafer 9). In operation 2829 (FIG. 28), wafer-transfer unit 104 picks-up from first buffer 2510 a wafer (wafer 10) that was processed in process module 2516 in an earlier process cycle. In operation 2830 (FIG. 28), wafer-transfer unit 104 places the unprocessed wafer (wafer 6) onto first buffer 2510. In operation 2886 (FIG. 28), load-lock module 2508 is sealed and evacuated such that the pressure within load-lock module 2508 is equal to the pressure within process module 2516. In operation 2887 (FIG. 28), wafer-transfer unit 2512 picks-up the unprocessed wafer (wafer 6) from first buffer 2510. In operation 2888 (FIG. 28), wafer-transfer unit 2512 places the unprocessed wafer (wafer 6) onto second buffer 2514. In operation 2831 (FIG. 28), wafer-transfer unit 104 places the processed wafer (wafer 10) into load module 102.

With regard now to process module 2716, in operation 2890 (FIG. 28), wafer-transfer unit 2712 picks-up an unprocessed wafer (wafer 11) from second buffer 2714. In operation 2891 (FIG. 28), wafer-transfer unit 112 places the unprocessed wafer (wafer 11) in process module 2716. In operation 2892 (FIG. 28), the wafer (wafer 11) is processed in process module 2716. In operation 2893 (FIG. 28), wafer-transfer unit 2712 picks-up the processed wafer (wafer 11) from process module 2716. In operation 2894 (FIG. 28), wafer-transfer unit 2712 places the processed wafer (wafer 11) onto first buffer 2710.

In operation 2895 (FIG. 28), load-lock module 2708 is vented such that the pressure within load-lock module 2708 is equal to the pressure within tool 100. In operation 2832 (FIG. 28), wafer-transfer unit 104 picks-up an unprocessed wafer (wafer 12) from load module 102. In operation 2833 (FIG. 28), wafer-transfer unit 104 picks-up an oriented wafer (wafer 9) from wafer orienter 106. In operation 2834 (FIG. 28), wafer-transfer unit 104 places the unprocessed wafer (wafer 12) onto wafer orienter 106. In operation 2854 (FIG. 28), wafer orienter 106 orients the wafer (wafer 12). In operation 2835 (FIG. 28), wafer-transfer unit 104 picks-up from first buffer 2710 a wafer (wafer 13) that was processed in process module 2716 in an earlier process cycle. In operation 2836 (FIG. 28), wafer-transfer unit 104 places the unprocessed wafer (wafer 9) onto first buffer 2710. In operation 2896 (FIG. 28), load-lock module 2708 is sealed and evacuated such that the pressure within load-lock module 2708 is equal to the pressure within process module 2716. In operation 2897 (FIG. 28), wafer-transfer unit 2712 picks-up the unprocessed wafer (wafer 9) from first buffer 2710. In operation 2898 (FIG. 28), wafer-transfer unit 2712 places the unprocessed wafer (wafer 9) onto second buffer 2714. In operation 2837 (FIG. 28), wafer-transfer unit 104 places the processed wafer (wafer 13) into load module 102.

With reference again to FIG. 28, operations 28100 through 28108 are associated with another process cycle for process module 116. More particularly, with reference again to FIG. 27, in operation 28100 (FIG. 28), wafer-transfer unit 112 picks-up an unprocessed wafer (wafer 3) from second buffer 114. In operation 28101 (FIG. 28), wafer-transfer unit 112 places the unprocessed wafer (wafer 3) into process module 116. In operation 28102 (FIG. 28), the wafer (wafer 3) is processed in process module 116. In operation 28103 (FIG. 28), wafer-transfer unit 112 picks-up the processed wafer (wafer 3) from process module 116. In operation 28104 (FIG. 28), wafer-transfer unit 112 places the processed wafer (wafer 3) onto first buffer 110.

In operation 28105 (FIG. 28), load-lock module 108 is vented such that the pressure within load-lock module 108 is equal to the pressure within tool 100. In operation 2838 (FIG. 28), wafer-transfer unit 104 picks-up an unprocessed wafer (wafer 14) from load module 102. In operation 2839 (FIG. 28), wafer-transfer unit 104 picks-up an oriented wafer (wafer 12) from wafer orienter 106. In operation 2840 (FIG. 28), wafer-transfer unit 104 places the unprocessed wafer (wafer 14) onto wafer orienter 106. In operation 2855 (FIG. 28), wafer orienter 106 orients the wafer (wafer 14). In operation 2841 (FIG. 28), wafer-transfer unit 104 picks-up from first buffer 110 a wafer (wafer 1) that was processed in process module 116 in an earlier process cycle. In operation 2842 (FIG. 28), wafer-transfer unit 104 places the unprocessed wafer (wafer 12) onto first buffer 110. In operation 28106 (FIG. 28), load-lock module 108 is sealed and evacuated such that the pressure within load-lock module 108 is equal to the pressure within process module 116. In operation 28107 (FIG. 28), wafer-transfer unit 112 picks-up the unprocessed wafer (wafer 12) from first buffer 110. In operation 28108 (FIG. 28), wafer-transfer unit 112 places the unprocessed wafer (wafer 12) onto second buffer 114. In operation 2843 (FIG. 28), wafer-transfer unit 104 places the processed wafer (wafer 1) into load module 102.

With reference again to FIG. 28, operations 28110 through 28115 are associated with the beginning of another process cycle for process module 1816. More particularly, with reference again to FIG. 27, in operation 28110 (FIG. 28), wafer-transfer unit 1812 picks-up an unprocessed wafer (wafer 2) from second buffer 1814. In operation 28111 (FIG. 28), wafer-transfer unit 1812 places the unprocessed wafer (wafer 2) in process module 1816. In operation 28112 (FIG. 28), the wafer (wafer 2) is processed in process module 1816.

In operation 28115 (FIG. 28), load-lock module 1808 is vented such that the pressure within load-lock module 1808 is equal to the pressure within tool 100. In operation 2844 (FIG. 28), wafer-transfer unit 104 picks-up an unprocessed wafer (wafer 15) from load module 102. In operation 2845 (FIG. 28), wafer-transfer unit 104 picks-up an oriented wafer (wafer 12) from wafer orienter 106. In operation 2846 (FIG. 28), wafer-transfer unit 104 places the unprocessed wafer (wafer 15) onto wafer orienter 106. In operation 2856 (FIG. 28), wafer orienter 106 orients the wafer (wafer 15). In operation 2847 (FIG. 28), wafer-transfer unit 104 picks-up from first buffer 1810 a wafer (wafer 5) that was processed in process module 1816 in an earlier process cycle. In operation 2848 (FIG. 28), wafer-transfer unit 104 places the unprocessed wafer (wafer 12) onto first buffer 1810.

With reference again to FIG. 28, operations 28120 through 28125 are associated with the beginning of another process cycle for process module 2516. More particularly, with reference again to FIG. 27, in operation 28120 (FIG. 28), wafer-transfer unit 2512 picks-up an unprocessed wafer (wafer 6) from second buffer 2514. In operation 28121 (FIG. 28), wafer-transfer unit 2512 places the unprocessed wafer (wafer 6) in process module 2516. In operation 28122 (FIG. 28), the wafer (wafer 6) is processed in process module 2516. In operation 28125 (FIG. 28), load-lock module 2508 is vented such that the pressure within load-lock module 2508 is equal to the pressure within tool 100.

With reference again to FIG. 28, operations 28130 through 28135 are associated with the beginning of another process cycle for process module 2716. More particularly, with reference again to FIG. 27, in operation 28130 (FIG. 28), wafer-transfer unit 2712 picks-up an unprocessed wafer (wafer 9) from second buffer 2714. In operation 28131 (FIG. 28), wafer-transfer unit 2712 places the unprocessed wafer (wafer 9) in process module 2716. In operation 28132 (FIG. 28), the wafer (wafer 9) is processed in process module 2716. In operation 28135 (FIG. 28), load-lock module 2708 is vented such that the pressure within load-lock module 2708 is equal to the pressure within tool 100.

With reference again to FIG. 28, operations 28143 through 28148 are associated with the ending of a previous process cycle for process module 1816. More particularly, with reference again to FIG. 27, in operation 28143 (FIG. 28), wafer-transfer unit 1812 picks-up the processed wafer (wafer 7) from process module 1816. In operation 28144 (FIG. 28), wafer-transfer unit 1812 places the processed wafer (wafer 7) onto first buffer 1810. In operation 28146 (FIG. 28), load-lock module 1808 is sealed and evacuated such that the pressure within load-lock module 1808 is equal to the pressure within process module 1816. In operation 28147 (FIG. 28), wafer-transfer unit 1812 picks-up an unprocessed wafer (wafer 5) from first buffer 1810. In operation 28148 (FIG. 28), wafer-transfer unit 1812 places the unprocessed wafer (wafer 5) onto second buffer 1814. In operation 2801 (FIG. 28), wafer-transfer unit 104 places a wafer (wafer 16) that was previously processed in process module 1816 in an earlier process cycle into load module 102.

With reference again to FIG. 28, operations 28152 through 28158 are associated with the ending of a previous process cycle for process module 2516. More particularly, with reference again to FIG. 27, in operation 28152 (FIG. 28), the wafer (wafer 10) is processed in process module 2516. In operation 28153 (FIG. 28), wafer-transfer unit 2512 picks-up the processed wafer (wafer 10) from process module 2516. In operation 28154 (FIG. 28), wafer-transfer unit 2512 places the processed wafer (wafer 10) onto first buffer 2510.

In operation 2802 (FIG. 28), wafer-transfer unit 104 picks-up an unprocessed wafer (wafer 11) from load module 102. In operation 2803 (FIG. 28), wafer-transfer unit 104 picks-up an oriented wafer (wafer 8) from wafer orienter 106. In operation 2804 (FIG. 28), wafer-transfer unit 104 places the unprocessed wafer (wafer 11) onto wafer orienter 106. In operation 2849 (FIG. 28), wafer orienter 106 orients the wafer (wafer 11). In operation 2805 (FIG. 28), wafer-transfer unit 104 picks-up from first buffer 2510 a wafer (wafer 17) that was processed in process module 2516 in an earlier process cycle. In operation 2806 (FIG. 28), wafer-transfer unit 104 places the unprocessed wafer (wafer 8) onto first buffer 2510. In operation 28156 (FIG. 28), load-lock module 2508 is sealed and evacuated such that the pressure within load lock module 2508 is equal to the pressure within process module 2516. In operation 28157 (FIG. 28), wafer-transfer unit 2512 picks-up the unprocessed wafer (wafer 8) from first buffer 2510. In operation 28158 (FIG. 28), wafer-transfer unit 2512 places the processed wafer (wafer 8) onto second buffer 2512. In operation 2807 (FIG. 28), wafer-transfer unit 104 places the processed wafer (wafer 17) into load module 102.

With reference again to FIG. 28, operations 28162 through 28168 are associated with the ending of a previous process cycle for process module 2716. More particularly, with reference again to FIG. 27, in operation 28162 (FIG.

28), the wafer (wafer 13) is processed in process module 2716. In operation 28163 (FIG. 28), wafer-transfer unit 2712 picks-up the processed wafer (wafer 13) from process module 2716. In operation 28164 (FIG. 28), wafer-transfer unit 2712 places the processed wafer (wafer 13) onto first buffer 2710.

In operation 2808 (FIG. 28), wafer-transfer unit 104 picks-up an unprocessed wafer (wafer 3) from load module 102. In operation 2809 (FIG. 28), wafer-transfer unit 104 picks-up an oriented wafer (wafer 11) from wafer orienter 106. In operation 2810 (FIG. 28), wafer-transfer unit 104 places the unprocessed wafer (wafer 3) onto wafer orienter 106. In operation 2850 (FIG. 28), wafer orienter 106 orients the wafer (wafer 3). In operation 2811 (FIG. 28), wafer-transfer unit 104 picks-up from first buffer 2710 a wafer (wafer 18) that was processed in process module 2716 in an earlier process cycle. In operation 2812 (FIG. 28), wafer-transfer unit 104 places the unprocessed wafer (wafer 11) onto first buffer 2710. In operation 28166 (FIG. 28), load-lock module 2708 is sealed and evacuated such that the pressure within load lock module 2708 is equal to the pressure within process module 2716. In operation 28167 (FIG. 28), wafer-transfer unit 2712 picks-up the unprocessed wafer (wafer 11) from first buffer 2710. In operation 28168 (FIG. 28), wafer-transfer unit 2712 places the processed wafer (wafer 11) onto second buffer 2712. In operation 2813 (FIG. 28), wafer-transfer unit 104 places the processed wafer (wafer 18) into load module 102.

Although the present invention has been described in conjunction with particular embodiments illustrated in the appended drawing figures, various modifications can be made without departing from the spirit and scope of the invention. For example, tool 100 (FIG. 1) can include any number of load modules 102 (FIG. 1). Therefore, the present invention should not be construed as limited to the specific forms shown in the drawings and described above.

We claim:

1. A system for processing wafers in a wafer-processing tool, said system comprising:
   a load module that operates to receive wafers;
   a process module that operates to process wafers;
   a wafer-transfer unit that operates to transfer wafers between said load module and said process module; and
   a scheduler configured to generate a schedule for the movement of wafers in the wafer-processing tool, wherein said scheduler is configured to generate said schedule based on the duration of the operations to be performed by said process module and said wafer-transfer unit.

2. The system of claim 1, wherein said scheduler is configured to determine:
   a provide cycle that includes operations to be performed by said wafer-transfer unit; and
   a process cycle that includes operations to be performed by said process module.

3. The system of claim 2, wherein said scheduler is configured to determine the duration of said provide cycle and said process cycle.

4. The system of claim 3, wherein said scheduler is configured to determine a limitation duration and to generate said schedule based on said limitation duration.

5. The system of claim 1, wherein said scheduler is configured to generate said schedule for a batch of wafers before processing said batch.

6. The system of claim 5, wherein said scheduler is configured to generate said schedule based on a recipe for said batch of wafers.

7. The system of claim 5, wherein said scheduler is configured to generate a schedule that maintains uniformity of heat histories of the wafers within said batch.

8. The system of claim 1, wherein said scheduler is configured to generate a begin schedule.

9. The system of claim 1, wherein said scheduler is configured to generate an end schedule.

10. The system of claim 1 further comprising a load-lock module connected to said process module, wherein said load-lock module operates to transfer wafers between said wafer-transfer unit and said process module.

11. The system of claim 10, wherein said scheduler is configured to determine:
    a provide cycle that includes operations to be performed by said wafer-transfer unit;
    a process cycle that includes operations to be performed by said process module; and
    a Load-Lock Module (LLM) cycle that includes operations to be performed by said load-lock module.

12. The system of claim 11, wherein said scheduler is configured to determine a limitation duration based on said provide cycle, said process cycle, and said LLM cycle, and wherein said scheduler is configured to generate said schedule based on said limitation duration.

13. The system of claim 1, wherein said process module comprises:
    a first process module; and
    a second process module.

14. The system of claim 13, wherein said scheduler is configured to generate a schedule to process wafers in series in said first and second process modules.

15. The system of claim 13, wherein said scheduler is configured to generate a schedule to process wafers in parallel in said first and second process modules.

16. The system of claim 15, wherein said scheduler is configured to generate a schedule to process a first batch of wafers in said first process module, and wherein said scheduler is configured to modify said schedule to process a second batch of wafers in said second process module.

17. The system of claim 16, wherein said scheduler is configured to determine:
    a first process cycle that includes operations to be performed by said first process module; and
    a second process cycle that includes operations to be performed by said second process module, wherein said second process cycle has a longer duration than said first process cycle.

18. The system of claim 17, wherein said scheduler is configured to modify said schedule to include a wait period equal to the difference in the duration of said first and said second process cycles.

19. The system of claim 17, wherein said scheduler is configured to modify said schedule to repeat said first process cycle until the duration of said repeated first process cycles is equal to or longer than said second process cycle, and to include a wait period equal to the difference in duration of said repeated first process cycles and said second process cycle.

20. The system of claim 1, wherein said process module is a chemical vapor deposition (CVD) chamber.

21. The system of claim 20, wherein said scheduler is configured to generate a schedule that maintains uniformity of heat histories of the wafers processed in said CVD chamber.

22. The system of claim 1, wherein said process module is an etch chamber.

23. A computer-readable storage medium containing computer executable code to schedule the movement of wafers in a wafer-processing tool by instructing a computer to operate as follows:
- determine a provide cycle that includes operations to be performed by a wafer-transfer unit;
- determine a process cycle that includes operations to be performed by a process module;
- determine a duration for said provide cycle and a duration for said process cycle; and
- generate a schedule for the movement of wafers in the wafer-processing tool based on the duration of said provide cycle and said process cycle.

24. The computer-readable storage medium of claim 23, wherein the computer is further instructed to align said process cycle to said provide cycle when the duration of said process cycle is longer than said provide cycle.

25. The computer-readable storage medium of claim 23, wherein the computer is further instructed to align said provide cycle to said process cycle when the duration of said provide cycle is longer than said process cycle.

26. The computer-readable storage medium of claim 23, wherein the computer is further instructed to operate as follows:
- determine a first process cycle that includes operations to be performed by a first process module;
- determine a second process cycle that includes operations to be performed by a second process module; and
- determine a duration for said first process cycle and said second process cycle.

27. The computer-readable storage medium of claim 26, wherein the computer is further instructed to add a wait period to said schedule equal to the difference in the duration of said first process cycle and said second process cycle.

28. The computer-readable storage medium of claim 26, wherein the computer is further instructed to repeat said first process cycle until the duration of said repeated first process cycle is equal to or longer than said second process cycle, and to add a wait period equal to the difference in the duration of said repeated first process cycles and said second process cycle.

29. The computer-readable storage medium of claim 23, wherein the computer is further instructed to operate as follows:
- determine a load-lock module (LLM) cycle that includes operations to be performed by a load-lock module;
- determine a duration for said LLM cycle; and
- generate said schedule based on the duration of said provide cycle, said process cycle, and said LLM cycle.

30. A system for processing wafers in a wafer-processing tool, said system comprising:
- a process module that operates to process wafers;
- a wafer-transfer unit that operates to transfer wafers; and
- a scheduler configured to generate a schedule based on the operations of the process module and the wafer-transfer unit.

31. The system of claim 30, wherein said scheduler is configured to determine:
- a provide cycle that includes operations to be performed by said wafer-transfer unit; and
- a process cycle that includes operations to be performed by said process module.

32. The system of claim 31, wherein said scheduler is configured to determine the duration of said provide cycle and said process cycle.

33. The system of claim 32, wherein said scheduler is configured to determine a limitation duration and to generate said schedule based on said limitation duration.

34. The system of claim 30, wherein said scheduler is configured to generate said schedule for a batch of wafers before processing said batch.

35. The system of claim 34, wherein said scheduler is configured to generate said schedule based on a recipe for said batch of wafers.

36. The system of claim 34, wherein said scheduler is configured to generate a schedule that maintains uniformity of heat histories of the wafers within said batch.

37. The system of claim 30, wherein said scheduler is configured to generate a begin schedule and an end schedule.

38. The system of claim 30 further comprising a load-lock module connected to said process module, wherein said load-lock module operates to transfer wafers between said wafer-transfer unit and said process module.

39. The system of claim 38, wherein said scheduler is configured to determine:
- a provide cycle that includes operations to be performed by said wafer-transfer unit;
- a process cycle that includes operations to be performed by said process module; and
- a Load-Lock Module (LLM) cycle that includes operations to be performed by said load-lock module.

40. The system of claim 30, wherein said process module comprises:
- a first process module; and
- a second process module.

41. The system of claim 40, wherein said scheduler is configured to generate a schedule to process wafers in series in said first and second process modules.

42. The system of claim 40, wherein said scheduler is configured to generate a schedule to process wafers in parallel in said first and second process modules.

43. The system of claim 42, wherein said scheduler is configured to generate a schedule to process a first batch of wafers in said first process module, and wherein said scheduler is configured to modify said schedule to process a second batch of wafers in said second process module.

44. A system for processing wafers in a wafer-processing tool, said system comprising:
- a process module that operates to process wafers;
- a wafer-transfer unit that operates to transfer wafers; and
- a scheduler configured to automatically generate a schedule for the movement of wafers in the wafer-processing tool based on the duration of the operations to be performed by said process module.

45. The system of claim 44, wherein said scheduler is configured to determine:
- a provide cycle that includes operations to be performed by said wafer-transfer unit; and
- a process cycle that includes operations to be performed by said process module.

46. The system of claim 45, wherein said scheduler is configured to determine the duration of said provide cycle and said process cycle.

47. The system of claim 46, wherein said scheduler is configured to determine a limitation duration and to generate said schedule based on said limitation duration.

48. The system of claim 44, wherein said scheduler is configured to generate said schedule for a batch of wafers before processing said batch.

49. The system of claim 48, wherein said scheduler is configured to generate said schedule based on a recipe for said batch of wafers.

50. The system of claim 48, wherein said scheduler is configured to generate a schedule that maintains uniformity of heat histories of the wafers within said batch.

51. The system of claim 50, wherein said scheduler is configured to generate a begin schedule and an end schedule while maintaining uniformity of heat histories of the wafers within said batch.

52. The system of claim 44, further comprising a load-lock module connected to said process module, wherein said load-lock module operates to transfer wafers between said wafer-transfer unit and said process module.

53. The system of claim 52, wherein said scheduler is configured to determine:

a provide cycle that includes operations to be performed by said wafer-transfer unit;

a process cycle that includes operations to be performed by said process module; and a Load-Lock Module (LLM) cycle that includes operations to be performed by said load-lock module wherein said scheduler is configured to determine a limitation duration based on said provide cycle, said process cycle, and said LLM cycle, and wherein said scheduler is configured to generate said schedule based on said limitation duration.

54. The system of claim 44, wherein said process module comprises:

a first process module; and a second process module.

55. The system of claim 54, wherein said scheduler is configured to generate a schedule to process wafers in series in said first and second process modules.

56. The system of claim 54, wherein said scheduler is configured to generate a schedule to process wafers in parallel in said first and second process modules.

57. The system of claim 56, wherein said scheduler is configured to generate a schedule to process a first batch of wafers in said first process module, and wherein said scheduler is configured to modify said schedule to process a second batch of wafers in said second process module.

58. The system of claim 57, wherein said scheduler is configured to determine:

a first process cycle that includes operations to be performed by said first process module; and a second process cycle that includes operations to be performed by said second process module, wherein said second process cycle has a longer duration than said first process cycle.

59. The system of claim 58, wherein said scheduler is configured to modify said schedule to include a wait period equal to the difference in the duration of said first and said second process cycles.

60. The system of claim 59, wherein said scheduler is configured to modify said schedule to repeat said first process cycle until the duration of said repeated first process cycles is equal to or longer than said second process cycle, and to include a wait period equal to the difference in duration of said repeated first process cycles and said second process cycle.

* * * * *